(12) United States Patent
Tucker et al.

(10) Patent No.: US 12,466,037 B2
(45) Date of Patent: Nov. 11, 2025

(54) NUT RUNNER ACCESSORY FOR POWER TOOL

(71) Applicant: Black & Decker Inc., New Britain, CT (US)

(72) Inventors: Benjamin Tucker, Ellicott City, MD (US); Thomas R. Kaye, Jr., Fallston, MD (US); Marco Lourenco, Baltimore, MD (US); Aland Santamarina, Woodbine, MD (US)

(73) Assignee: Black & Decker Inc., New Britain, CT (US)

( * ) Notice: Subject to any disclaimer, the term of this patent is extended or adjusted under 35 U.S.C. 154(b) by 133 days.

(21) Appl. No.: 18/462,959

(22) Filed: Sep. 7, 2023

(65) Prior Publication Data

US 2023/0415311 A1    Dec. 28, 2023

Related U.S. Application Data

(63) Continuation-in-part of application No. 18/046,753, filed on Oct. 14, 2022.

(Continued)

(51) Int. Cl.
*B25B 21/00* (2006.01)
*B25B 21/02* (2006.01)
(Continued)

(52) U.S. Cl.
CPC ........ *B25B 21/007* (2013.01); *B25B 23/0028* (2013.01); *B25F 3/00* (2013.01); *B25B 21/02* (2013.01); *B25F 5/006* (2013.01)

(58) Field of Classification Search
CPC ... B25B 21/007; B25B 23/0028; B25B 21/02; B25F 3/00; B25F 5/006
See application file for complete search history.

(56) References Cited

U.S. PATENT DOCUMENTS

| 1,624,508 A | 4/1927 | Reilly |
| 2,808,749 A | 10/1957 | Lampke |

(Continued)

FOREIGN PATENT DOCUMENTS

| CN | 203141397 U | 8/2013 |
| CN | 103962997 A | 8/2014 |

(Continued)

OTHER PUBLICATIONS

Extended European Search Report, EP Application No. 23206986.4, Apr. 12, 2024, 5 pages, EPO.

(Continued)

*Primary Examiner* — Michelle Lopez
(74) *Attorney, Agent, or Firm* — Brake Hughes Bellermann LLP

(57) ABSTRACT

A nut runner accessory for a power-driven tool is provided. The nut runner accessory can include a gear assembly received in a housing. The gear assembly transfers an externally generated force to a driver head of the nut runner accessory. The nut runner accessory can include an alignment device that can be automatically or manually operated to align an open ended slot of the gear assembly and driver head with an open ended slot of the housing. The alignment of respective open end portions of the open ended slots defined by the gear assembly, driver head, and housing allows a nut/threaded rod to be inserted into and removed from an engagement portion of the nut runner accessory.

20 Claims, 49 Drawing Sheets

Related U.S. Application Data

(60) Provisional application No. 63/263,115, filed on Oct. 27, 2021.

(51) Int. Cl.
  B25B 23/00 (2006.01)
  B25F 3/00 (2006.01)
  B25F 5/00 (2006.01)

(56) References Cited

U.S. PATENT DOCUMENTS

| | | | |
|---|---|---|---|
| 2,842,995 | A | 7/1958 | Johnson |
| 3,083,599 | A | 4/1963 | Slagle |
| 3,257,877 | A | 6/1966 | Philip et al. |
| 3,535,960 | A | 10/1970 | Borries |
| 3,602,071 | A | 8/1971 | Juhasz |
| 3,620,105 | A | 11/1971 | Batten |
| D246,567 | S | 12/1977 | Bricker |
| 4,064,772 | A | 12/1977 | Boyd et al. |
| 4,318,315 | A | 3/1982 | Washburn |
| 4,622,870 | A | 11/1986 | Shirley |
| 5,107,729 | A | 4/1992 | Makhlouf |
| 5,339,710 | A | 8/1994 | Deadmond et al. |
| 5,454,283 | A | 10/1995 | Di |
| 5,460,062 | A | 10/1995 | Wilson |
| 5,522,285 | A | 6/1996 | Wilson et al. |
| 5,522,286 | A | 6/1996 | Wilson et al. |
| 5,537,897 | A | 7/1996 | Wilson |
| 5,544,553 | A * | 8/1996 | Galat ............... B25B 13/481 81/57.3 |
| 5,697,266 | A | 12/1997 | Wilson |
| 6,035,745 | A * | 3/2000 | Kather ............... B25B 21/002 81/57.13 |
| 6,131,492 | A | 10/2000 | Mai |
| 6,810,773 | B2 | 11/2004 | Trucchio |
| 7,311,025 | B1 | 12/2007 | Wilson |
| 7,513,179 | B2 | 4/2009 | Wilson |
| 7,631,580 | B2 | 12/2009 | Lu et al. |
| 7,942,084 | B2 | 5/2011 | Wilson et al. |
| 8,006,590 | B2 | 8/2011 | Light et al. |
| 8,166,849 | B2 | 5/2012 | Chan |
| 8,291,791 | B2 | 10/2012 | Light et al. |
| 8,353,230 | B2 | 1/2013 | Cole |
| 8,438,955 | B2 | 5/2013 | Wilson et al. |
| 8,590,431 | B2 | 11/2013 | Cook |
| 9,056,389 | B2 | 6/2015 | Buchanan |
| 9,205,542 | B2 | 12/2015 | Dedrickson et al. |
| 9,751,196 | B2 | 9/2017 | Hu et al. |
| 9,802,296 | B2 | 10/2017 | Hielscher et al. |
| 10,549,410 | B2 | 2/2020 | Hu et al. |
| 10,625,402 | B2 | 4/2020 | Jensen |
| 10,926,381 | B2 | 2/2021 | Wilson |
| 11,161,226 | B2 | 11/2021 | Sawa et al. |
| 11,192,220 | B2 | 12/2021 | Abunameh et al. |
| 11,759,925 | B2 * | 9/2023 | Sawa ............... B25B 13/107 81/57.13 |
| 2004/0163499 | A1 | 8/2004 | Gammon |
| 2006/0236816 | A1 | 10/2006 | Picou |
| 2008/0245193 | A1 | 10/2008 | Lipka |
| 2009/0229425 | A1 | 9/2009 | Riggio et al. |
| 2010/0257979 | A1 | 10/2010 | Zhan |
| 2011/0113930 | A1 | 5/2011 | Liao |
| 2011/0162486 | A1 | 7/2011 | Lee et al. |
| 2012/0103142 | A1 * | 5/2012 | Sroka ............... B25B 17/02 81/57.3 |
| 2014/0251091 | A1 | 9/2014 | Hui |
| 2015/0314427 | A1 | 11/2015 | Carlsson et al. |
| 2016/0023289 | A1 | 1/2016 | Moss et al. |
| 2016/0031067 | A1 * | 2/2016 | Batt ............... B25B 13/08 81/57.29 |
| 2016/0221163 | A1 | 8/2016 | Trucchio |
| 2017/0057057 | A1 * | 3/2017 | Wilson, Jr. ............... B25B 17/02 |
| 2019/0247984 | A1 | 8/2019 | Sawa et al. |
| 2020/0130150 | A1 | 4/2020 | Nick et al. |
| 2020/0262034 | A1 | 8/2020 | Hoppe et al. |
| 2021/0187708 | A1 | 6/2021 | Beguin |
| 2022/0024004 | A1 | 1/2022 | Sawa et al. |
| 2022/0118588 | A1 | 4/2022 | Stewart |

FOREIGN PATENT DOCUMENTS

| | | | |
|---|---|---|---|
| CN | 104889919 | A | 9/2015 |
| CN | 106392978 | A | 2/2017 |
| CN | 206393529 | U | 8/2017 |
| CN | 109079694 | A | 12/2018 |
| CN | 114516007 | A | 5/2022 |
| DE | 3219980 | A1 | 6/1983 |
| DE | 8613789 | U1 | 7/1986 |
| EP | 4212281 | A1 | 7/2023 |
| GB | 2548390 | A | 9/2017 |
| JP | 6041035 | B1 | 11/2016 |
| WO | 2019160868 | A1 | 8/2019 |
| WO | 2020086449 | A1 | 4/2020 |
| WO | 2020222230 | A1 | 11/2020 |

OTHER PUBLICATIONS

Extended European Search Report for Application No. 22203608.9 mailed Jun. 20, 2023, 10 pages.

* cited by examiner

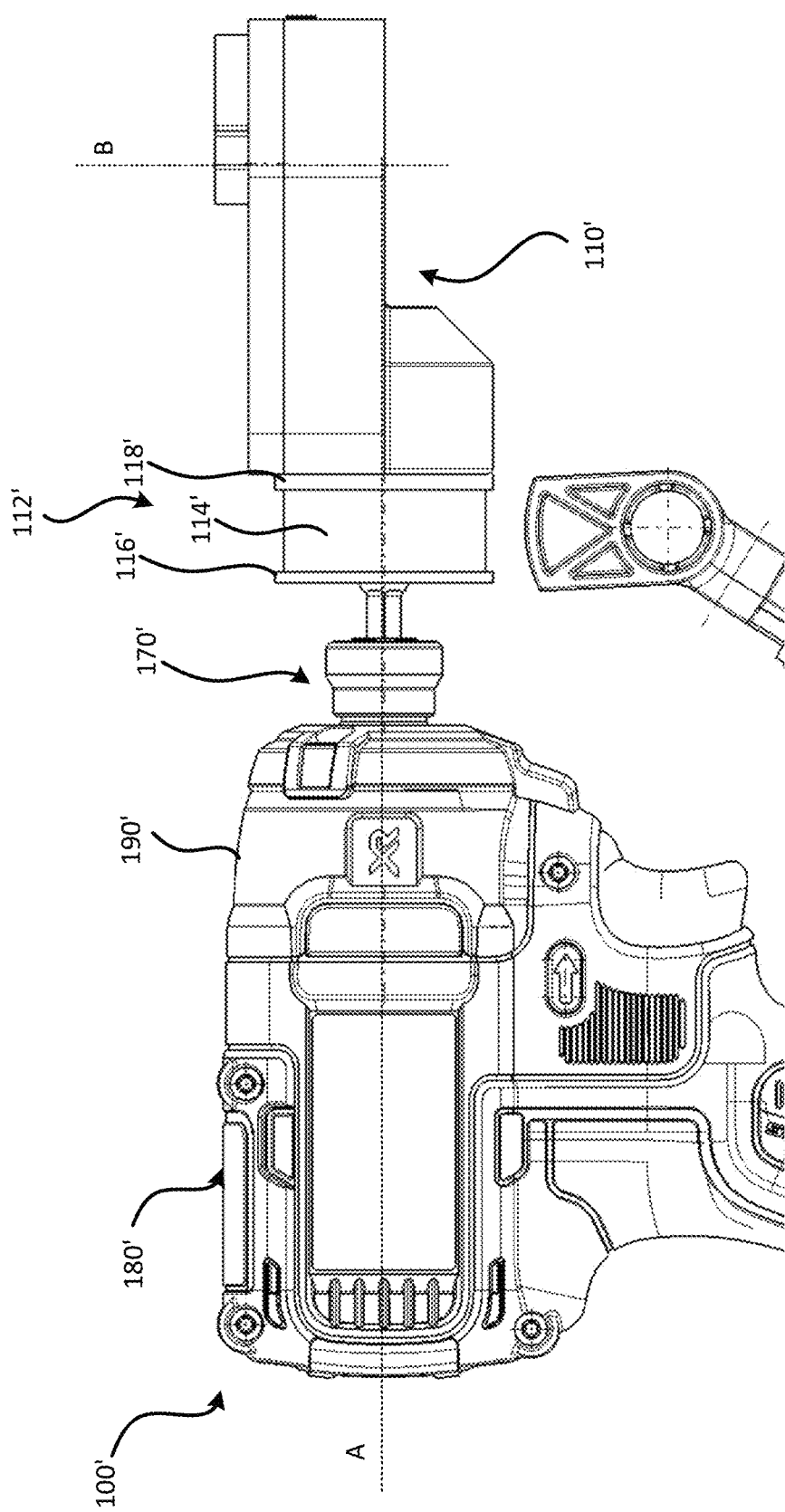

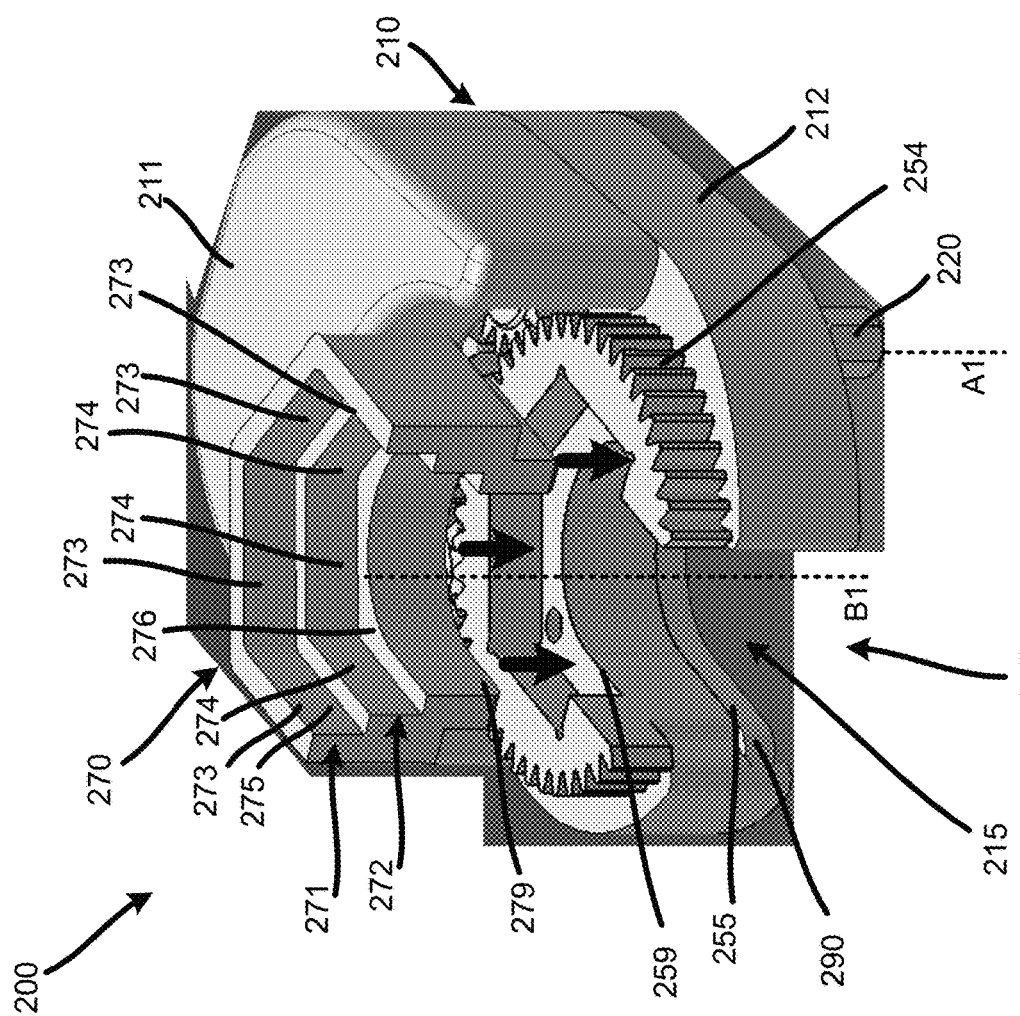
FIG. 2A(1)

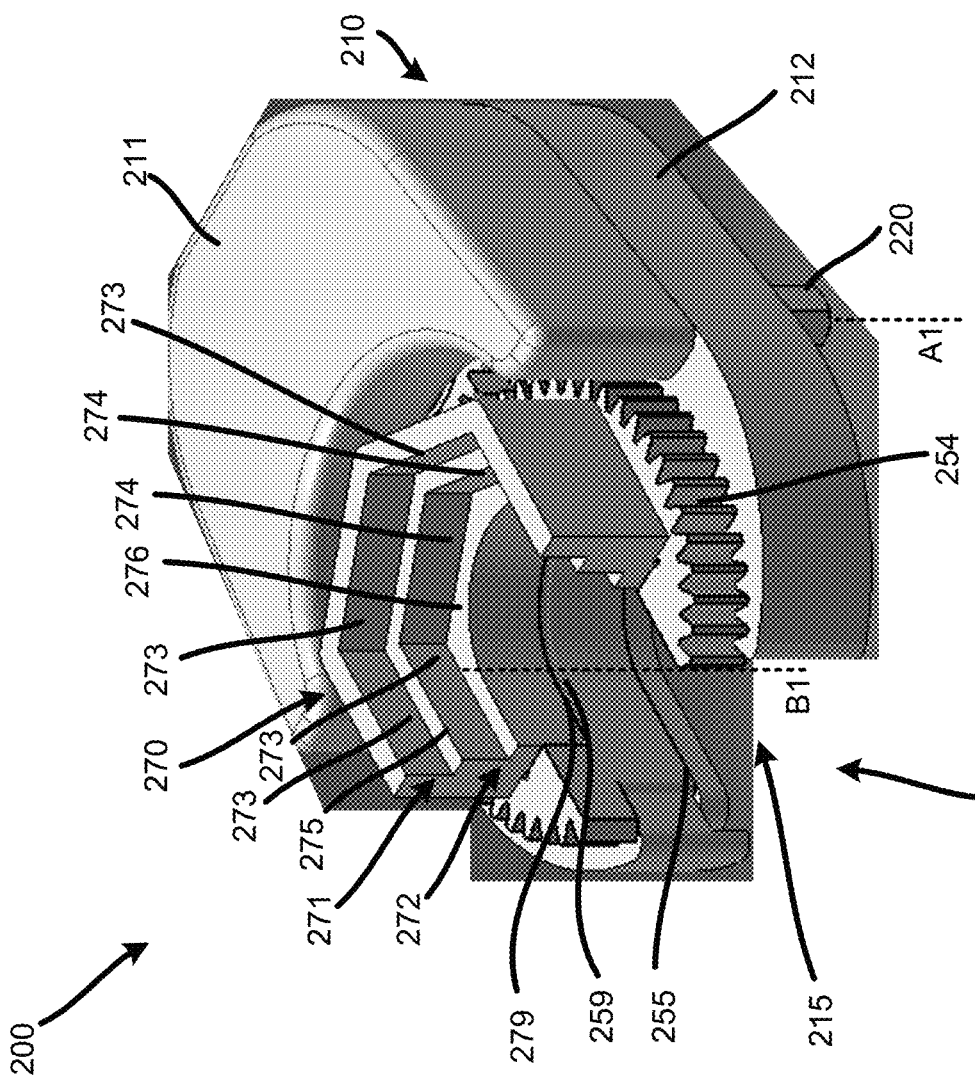
FIG. 2A(2)

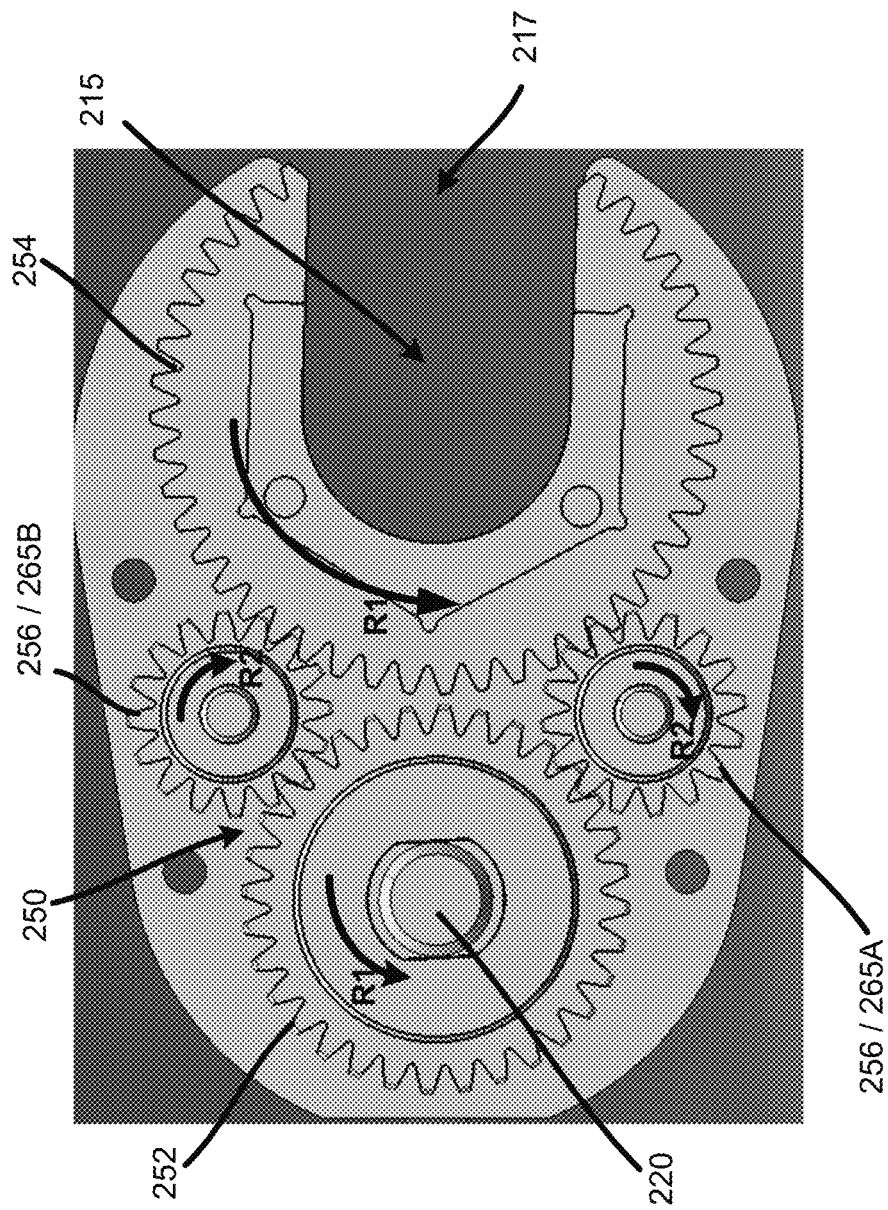
FIG. 2E(1)

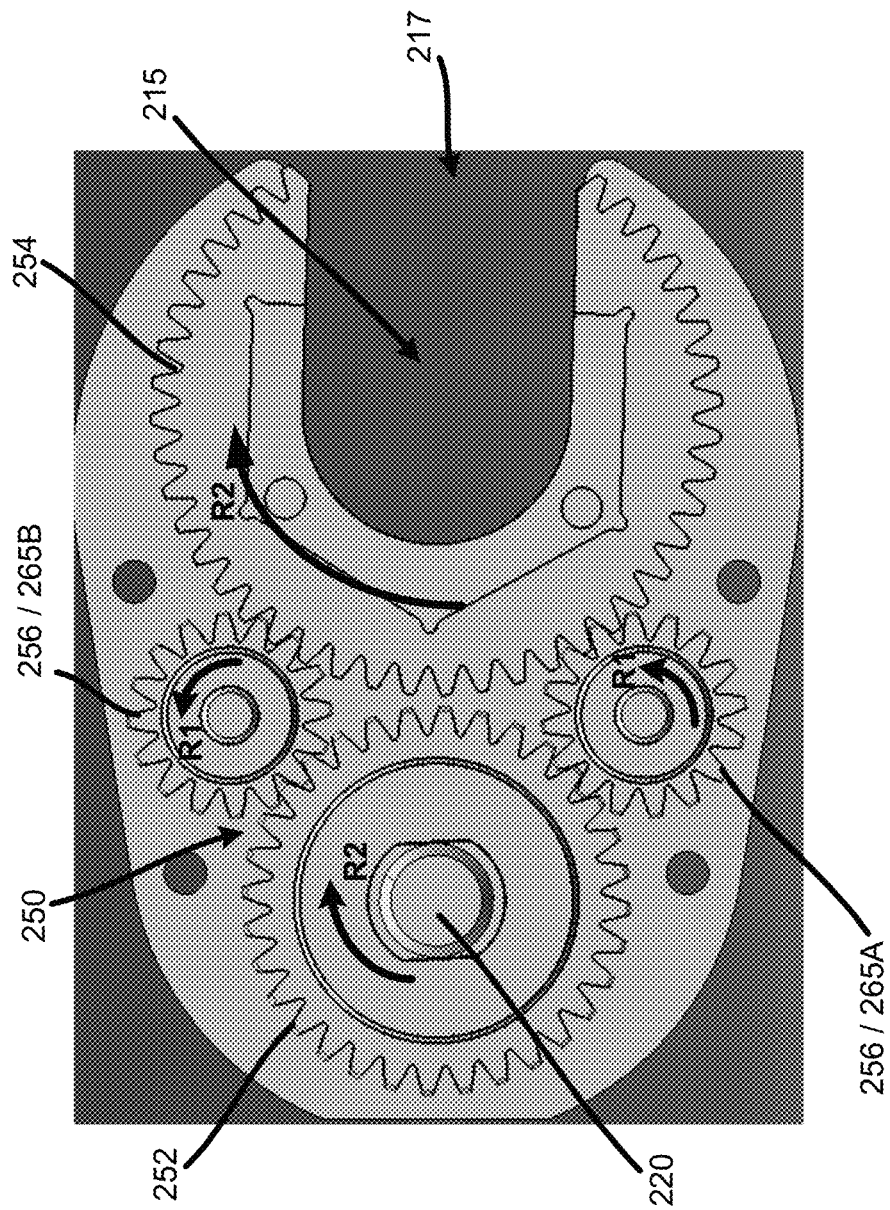
FIG. 2E(2)

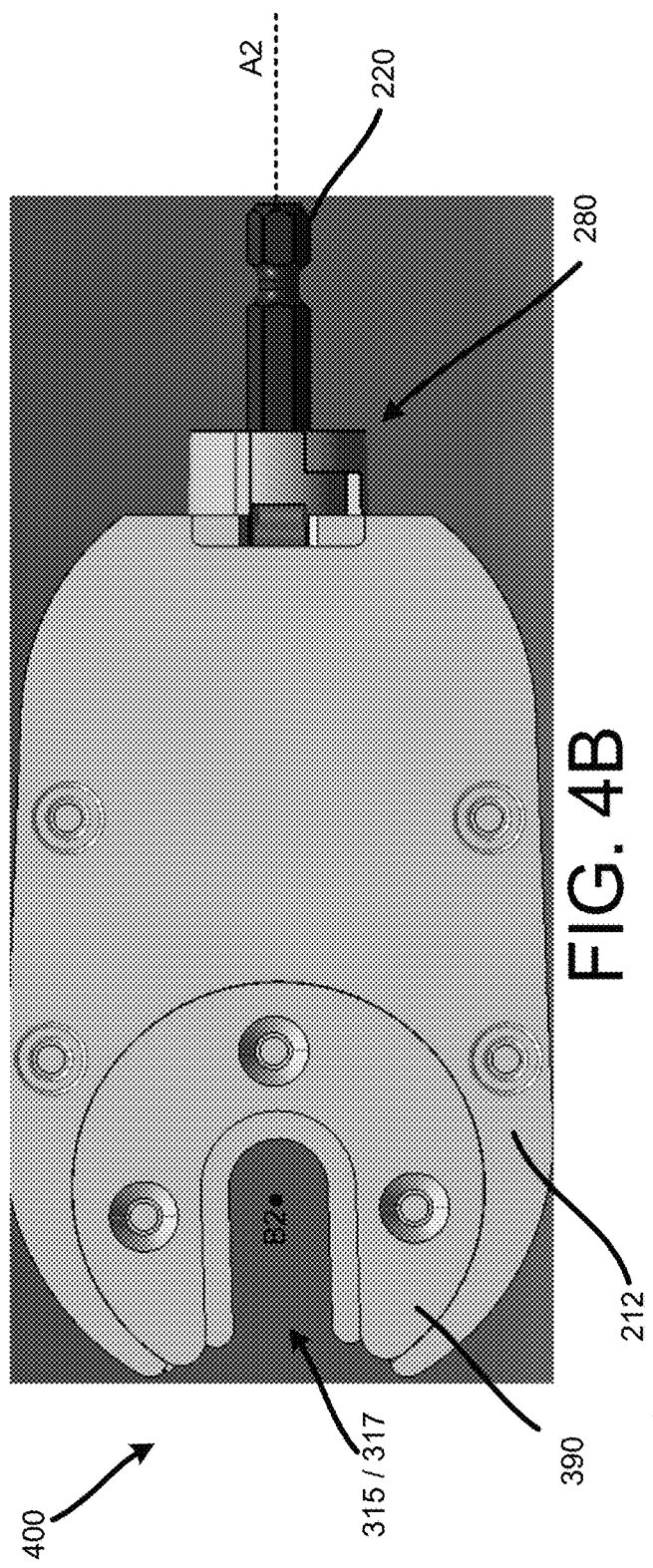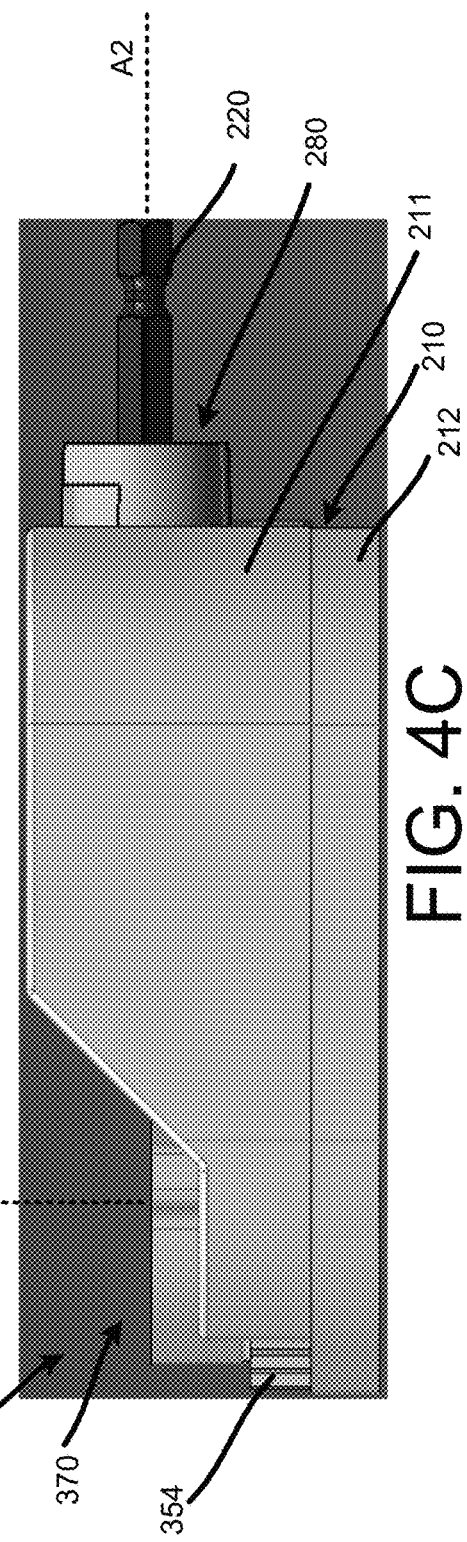

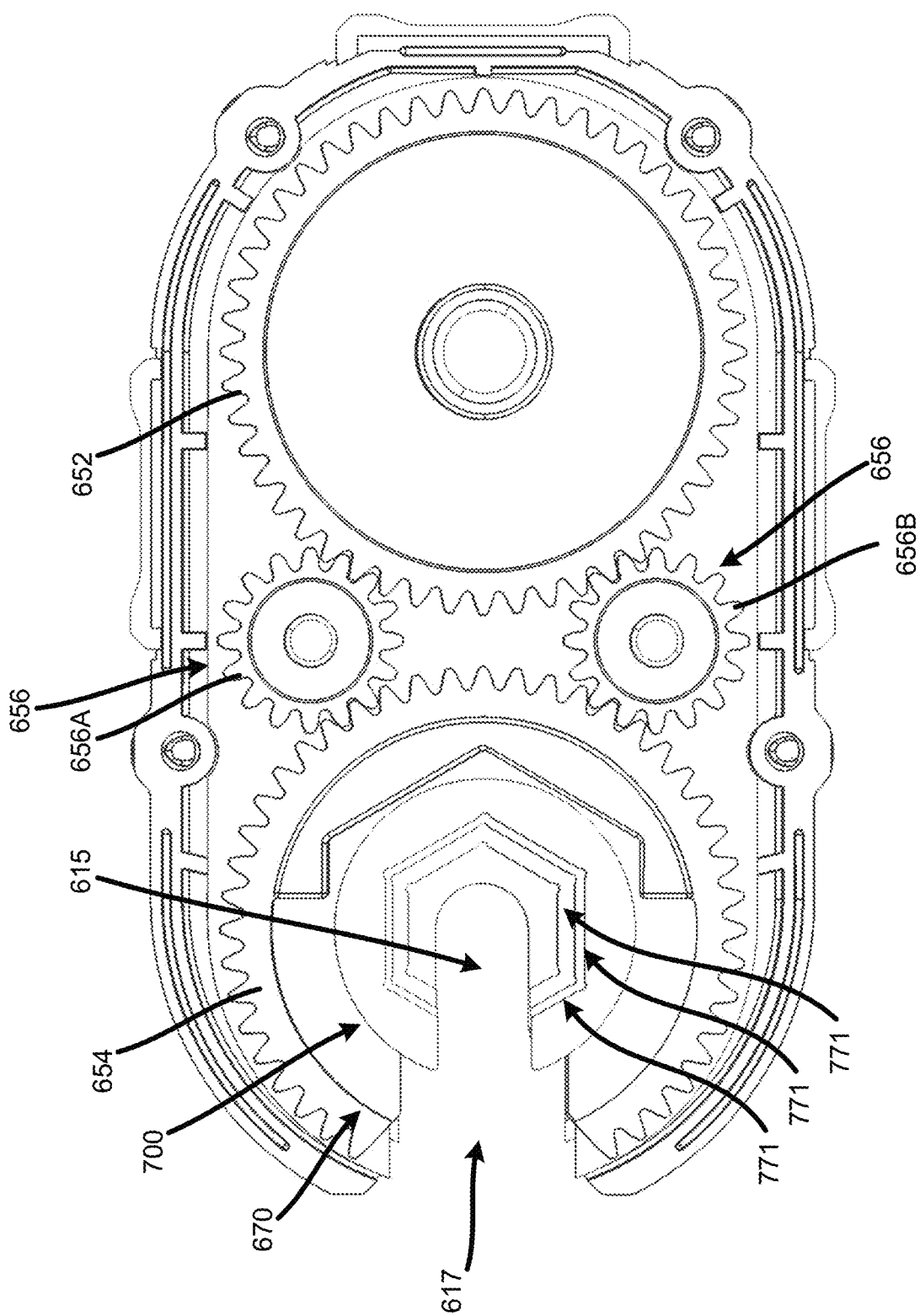

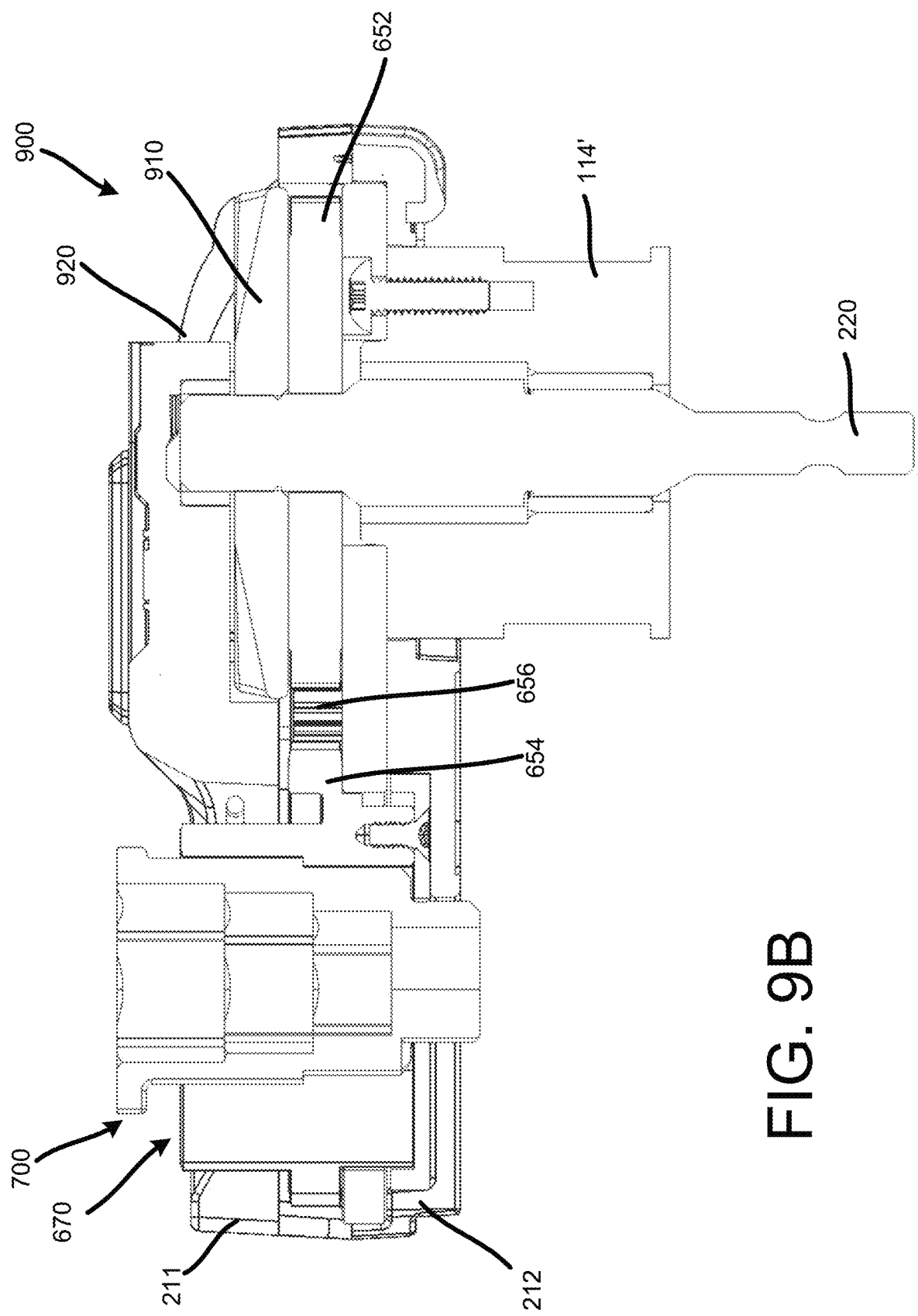

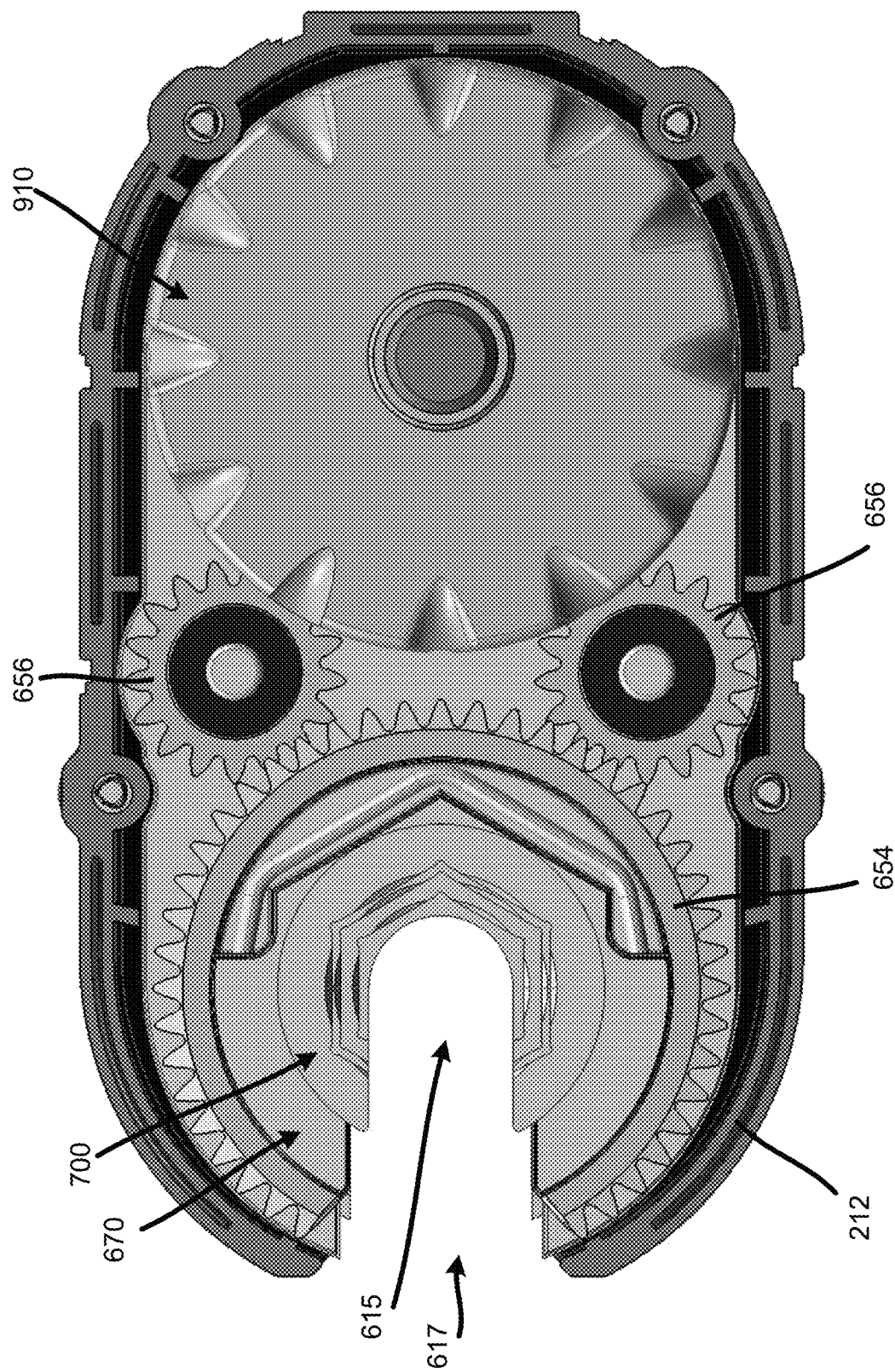

NUT RUNNER ACCESSORY FOR POWER TOOL

CROSS-REFERENCE TO RELATED APPLICATIONS

This application is a continuation-in part application of U.S. application Ser. No. 18/046,753, filed on Oct. 14, 2022, entitled "NUT RUNNER ACCESSORY FOR POWER TOOL," which claims priority to U.S. Provisional Patent Application No. 63/263,115, filed on Oct. 27, 2021, entitled "NUT RUNNER ACCESSORY FOR POWER TOOL," the disclosures of which are incorporated herein by reference in their entireties.

FIELD

This relates to a nut runner accessory for a power-driven tool, e.g., a rotary power tool such as a drill, a drill/driver, or an impact driver.

BACKGROUND

Manual movement of a nut along a threaded rod may be time consuming and fatiguing, whether by hand or with the assistance of a manually operated hand tool. In some situations, a condition of the threaded rod and/or the nut due to, for example, debris, rust, paint, and other types of degradation may complicate the threaded engagement of the nut and rod and/or manual movement of the nut along the threaded rod. Installation environments having limited access and/or workspace may preclude the use of hand tools, such as a wrench, to assist in the movement of the nut along the threaded rod. An accessory tool that can be coupled to existing power-driven tools to facilitate the movement of a nut along a threaded rod may provide time savings, may reduce user fatigue, and may provide for a more secure coupling of elements by the threaded rod and nut.

SUMMARY

In some aspects, the techniques described herein relate to a nut runner accessory for a power-driven tool, the nut runner accessory including: a housing including an open ended slot at a first end portion of the housing; a gear assembly received in the housing; an input shaft coupled at a second end portion of the housing and configured to transmit a rotary force from a power-driven tool to an input gear of the gear assembly; a driver head provided at an output gear of the gear assembly at the first end portion of the housing, the driver head being configured to rotate together with the output gear in response to rotation of the input gear, wherein the output gear and the driver head define an open ended slot corresponding to the open ended slot formed at the first end portion of the housing; and an alignment device coupled in the housing and configured to selectively engage the gear assembly as input gear and the output gear rotate in response to the rotary force from the input shaft, wherein, in response to an external manipulation of the alignment device during rotation of the input gear and the output gear, the alignment device is configured to engage the gear assembly and restrict further rotation of the input gear and the output gear, with respective open end portions of the open ended slot defined by the driver head and output gear and the open ended slot at the first end portion of the housing in an aligned position.

In some aspects, the techniques described herein relate to a nut runner accessory, wherein the alignment device includes a button assembly that is manipulatable from an exterior of the housing, the button assembly including: a support frame coupled to the housing; a button movably positioned in an open portion of the support frame; a pin having a first end portion coupled to the button, and a second end portion that selectively engages a recess in one of the input gear or the output gear to restrict rotation of the input gear and the output gear.

In some aspects, the techniques described herein relate to a nut runner accessory, wherein the second end portion of the pin is configured to be engaged in the recess and to restrict rotation of the input gear and the output gear in response to a depression of the button as the input gear and the output gear rotate in response to the rotary force transmitted from the input shaft and a position of the recess is brought into alignment with a position of the second end portion of the pin.

In some aspects, the techniques described herein relate to a nut runner accessory, wherein a position of the recess is indexed with a position of the open ended slot defined by the driver head and output gear, such that engagement of the second end portion of the pin in the recess aligns the open ended slot defined by the driver head and the output gear with the open ended slot defined at the first end portion of the housing.

In some aspects, the techniques described herein relate to a nut runner accessory, wherein a shoulder portion of the support frame is fixed to the housing and extends across a portion of the support frame at the second end portion of the pin, with an opening formed in the shoulder portion corresponding to the second end portion of the pin.

In some aspects, the techniques described herein relate to a nut runner accessory, wherein, in response to depression of the button, the second end portion of the pin extends through the opening in the shoulder portion to engage the recess as the recess as the input gear and the output gear rotate and a position of the recess is aligned with a position of the second end portion of the pin.

In some aspects, the techniques described herein relate to a nut runner accessory, further including a biasing member positioned around an intermediate portion of the pin, with a first end portion of the biasing member abutting the button, and the second end portion of the biasing member abutting a portion of the support frame, wherein the biasing member biases the button to a disengaged position, and is compressed in response to depression of the button.

In some aspects, the techniques described herein relate to a nut runner accessory, wherein the open ended slot at the first end portion of the housing is stationary, and the open ended slot defined by the driver head and the output gear rotate in response to the rotary force transmitted from the input shaft to the gear assembly, and an aligned position of respective open end portions of the open ended slot at the first end portion of the housing and the open ended slot defined by the driver head and the output gear provides for insertion of a threaded rod and nut into an engagement portion of the nut runner accessory, and for removal of the threaded rod and nut from the engagement portion of the nut runner accessory.

In some aspects, the techniques described herein relate to a nut runner accessory for a power-driven tool, the nut runner accessory including: a housing including an open ended slot at a first end portion of the housing; a gear assembly received in the housing; an input shaft coupled at a second end portion of the housing and configured to transmit a rotary force from a power-driven tool to an input gear of the gear assembly; a driver head provided at an output gear of the gear assembly at the first end portion of the housing, the driver head being configured to rotate together with the output gear in response to rotation of the input gear, wherein the output gear and the driver head define an open ended slot corresponding to the open ended slot formed at the first end portion of the housing; and an alignment knob coupled to the housing and accessible from an exterior of the housing, wherein the output gear is configured to rotate in response to a manual manipulation of the alignment knob, and wherein respective open end portions of the open ended slot defined by the driver head and output gear and the open ended slot at the first end portion of the housing are brought into alignment in response to the manual manipulation of the alignment knob.

In some aspects, the techniques described herein relate to a nut runner accessory, wherein the manual manipulation of the alignment knob is a rotation of the alignment knob, and wherein an amount of rotation of the alignment knob corresponds to an amount of rotation of the output gear and driver head.

In some aspects, the techniques described herein relate to a nut runner accessory, wherein the alignment knob is partially received in the housing, and partially exposed to the exterior of the housing through an opening in the housing.

In some aspects, the techniques described herein relate to a nut runner accessory, wherein the alignment knob is fixed to or integrally formed with the input gear such that the alignment knob rotates together with the input gear and manipulation of the alignment knob causes corresponding rotation of the input gear.

In some aspects, the techniques described herein relate to a nut runner accessory, wherein the alignment knob is fixed to or integrally formed with the input shaft such that the alignment knob rotates together with the input shaft and the input gear coupled to the input shaft, and manipulation of the alignment knob causes corresponding rotation of the input shaft and the input gear coupled to the input shaft.

In some aspects, the techniques described herein relate to a nut runner accessory, further including at least one visual indicator provided on at least one of the alignment knob or the housing, wherein the at least one visual indicator provides a visual indication of alignment of respective open end portions of the open ended slot defined by the driver head and output gear and the open ended slot at the first end portion of the housing.

In some aspects, the techniques described herein relate to a nut runner accessory, wherein the alignment knob is coupled to the input shaft at an exterior of the housing.

In some aspects, the techniques described herein relate to a nut runner accessory for a power-driven tool, the nut runner accessory including: a housing including an open ended slot at a first end portion of the housing; a gear assembly received in the housing; an input shaft coupled at a second end portion of the housing and configured to transmit a rotary force from a power-driven tool to an input gear of the gear assembly; a driver head provided at an output gear of the gear assembly at the first end portion of the housing, the driver head being configured to rotate together with the output gear in response to rotation of the input gear, wherein the output gear and the driver head define an open ended slot corresponding to the open ended slot formed at the first end portion of the housing; and an alignment device coupled to the housing and configured to engage the gear assembly in response to an external manipulation of the alignment device, wherein respective open end portions of the open ended slot defined by the driver head and output gear and the open ended slot at the first end portion of the housing are brought into alignment in response to the manipulation of the alignment device.

In some aspects, the techniques described herein relate to a nut runner accessory, wherein the alignment device includes: a support frame coupled to the housing; a button movably positioned in an open portion of the support frame; a pin having a first end portion coupled to the button, and a second end portion that extends through an opening in a shoulder portion of the support frame in response to depression of the button while the input gear and the output gear rotate in response to the rotary force of the input shaft, to selectively engage a recess in one of the input gear or the output gear as a position of the recess is brought into alignment with the second end portion of the pin to restrict further rotation of the input gear and the output gear.

In some aspects, the techniques described herein relate to a nut runner accessory, wherein the position of the recess is indexed with a position of the open ended slot defined by the driver head and output gear, such that engagement of the second end portion of the pin in the recess aligns the open ended slot defined by the driver head and the output gear with the open ended slot defined at the first end portion of the housing.

In some aspects, the techniques described herein relate to a nut runner accessory, wherein the alignment device includes an alignment knob coupled to the input gear and accessible from an exterior of the housing, wherein the output gear is configured to rotate in response to a manual rotation of the alignment knob, and wherein an amount of rotation of the alignment knob corresponds to an amount of rotation of the output gear and the driver head such that respective open end portions of the open ended slot defined by the driver head and output gear and the open ended slot at the first end portion of the housing are brought into alignment in response to the rotation of the alignment knob.

In some aspects, the techniques described herein relate to a nut runner accessory, wherein the alignment knob is partially received in the housing, and partially exposed to the exterior of the housing through an opening in the housing.

The details of one or more implementations are set forth in the accompanying drawings and the description below. Other features will be apparent from the description and drawings, and from the claims.

BRIEF DESCRIPTION OF THE DRAWINGS

FIG. 1C is a partial side view of the example second rotary power tool and the example accessory tool shown in FIG. 1B.

FIG. 2A(1) is a partially exploded top perspective view of an example nut runner accessory, in accordance with implementations described herein.

FIG. 2A(2) is an assembled top perspective view of the example nut runner accessory shown in FIG. 2A(1).

FIG. 2E(1) is a plan view of an example gear assembly of the example nut runner accessory shown in FIGS. 2A-2D, illustrating a first operational state of an example gear assembly of the example nut runner accessory, in accordance with implementations described herein.

FIG. 2E(2) is a plan view of the example gear assembly of the example nut runner accessory shown in FIGS. 2A-2D, illustrating a second operation state of the example gear assembly of the example nut runner accessory.

FIG. 4B is a bottom plan view of the example nut runner accessory shown in FIG. 4A.

FIG. 4C is a side view of the example nut runner accessory shown in FIG. 4A.

FIG. 6F is a plan view of an example gear assembly of the example nut runner accessory shown in FIGS. 6A and 6B.

FIG. 9B is a cross-sectional view, taken along line M-M of FIG. 9A.

FIG. 9C is a top view of the example nut runner shown in FIGS. 9A and 9B.

DETAILED DESCRIPTION

A nut runner accessory, in accordance with implementations described herein, can be coupled to a rotary power-driven power tool, such as, for example, a drill, a drill/driver, an impact driver, and other such rotary power-driven tools, to facilitate the movement of the nut along the threaded rod. The nut runner accessory can engage the nut, and can move, or spin the nut along the threaded rod in response to a force applied to the nut runner accessory by the power-driven tool. A nut runner accessory, in accordance with implementations described herein, can transmit a rotational force from the power-driven tool to in turn rotate the nut engaged with the threaded rod, to cause movement of the nut along the threaded rod in both a first longitudinal direction and a second longitudinal direction of the threaded rod, based on a rotational direction of the force transmitted by the power-driven tool. A nut runner accessory, in accordance with implementations described herein, may reduce the time to complete a particular task involving the movement of the nut on the threaded rod, thus enhancing utility and functionality of the power-driven tool to which the nut runner accessory is coupled. A nut runner accessory, in accordance with implementations described herein, includes an indexing feature, or a homing feature, or an alignment device. In some implementations, the indexing feature, or homing feature, or alignment device, facilitates alignment of an engagement portion, or a working portion, of the nut runner accessory with the nut on the threaded rod, to facilitate engagement of the nut runner accessory with the nut on the threaded rod, and/or to facilitate disengagement of the nut runner accessory from the nut on the threaded rod.

Figure 1A:
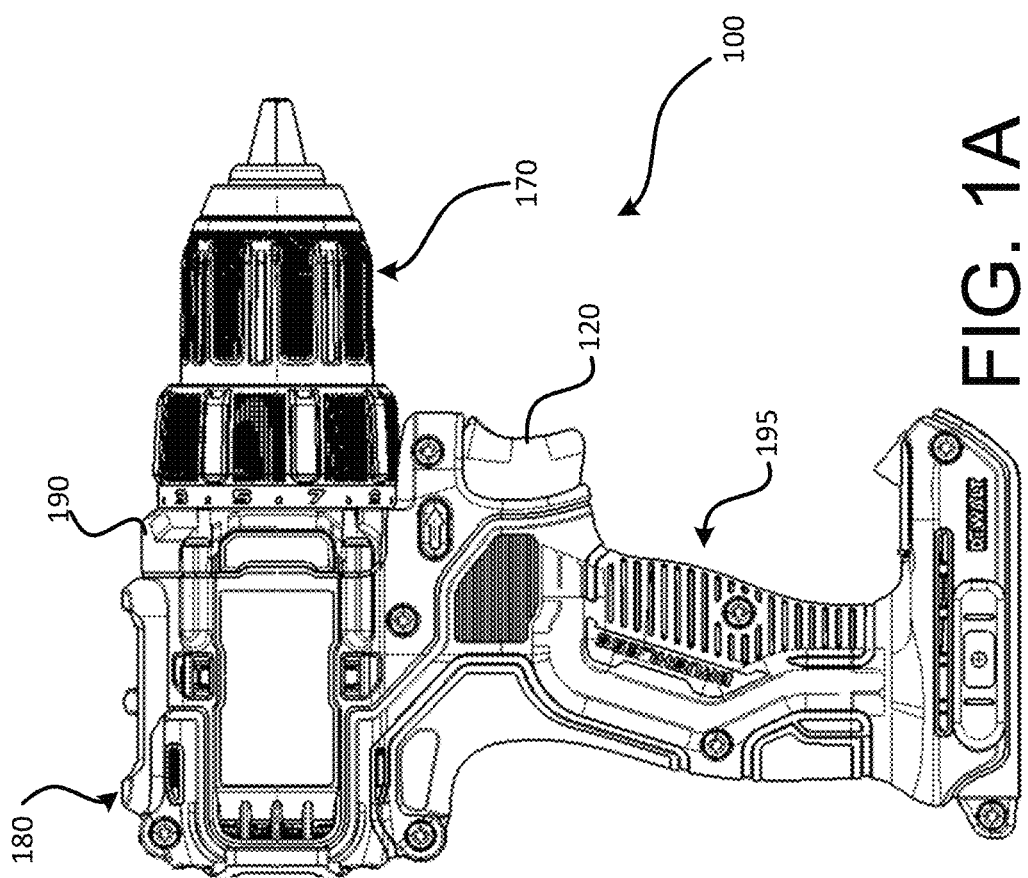
FIG. 1A is a side view of an example first rotary power tool for use with an example accessory tool.

FIG. 1A is a side view of a first example rotary power-driven tool 100 in the form of a drill or drill/driver for use with a nut runner accessory. The drill/driver shown in FIG. 1A includes a chuck assembly 170 that provides for coupling of output tools and/or accessories to an output device of the tool 100, including a nut runner accessory, in accordance with implementations described herein. The example power-driven tool 100 shown in FIG. 1A includes a housing 190, in which components such as, for example, a motor, a transmission, the output assembly (not shown in FIG. 1A) and the like are housed. In some examples, the transmission transmits a force generated by the motor to the output tool and/or accessory coupled at the chuck assembly 170 via the output assembly, to drive the output tool and/or accessory coupled at the chuck assembly 170 to perform an operation on a workpiece. The chuck assembly 170 is provided at an end portion of the housing 190, corresponding to a working end of the example power-driven tool 100. A trigger 120 for triggering operation of the tool 100 is provided at a handle portion 195 of the housing 190. One or more selection devices 180 accessible to a user at the outside of the housing 190 provide for user control of the example power-driven tool 100. For example, the one or more selection devices 180 can be manipulated by the user to turn the tool 100 on and off, to set an operation mode, to set an operational speed, an operational direction and the like.

Figure 1B:
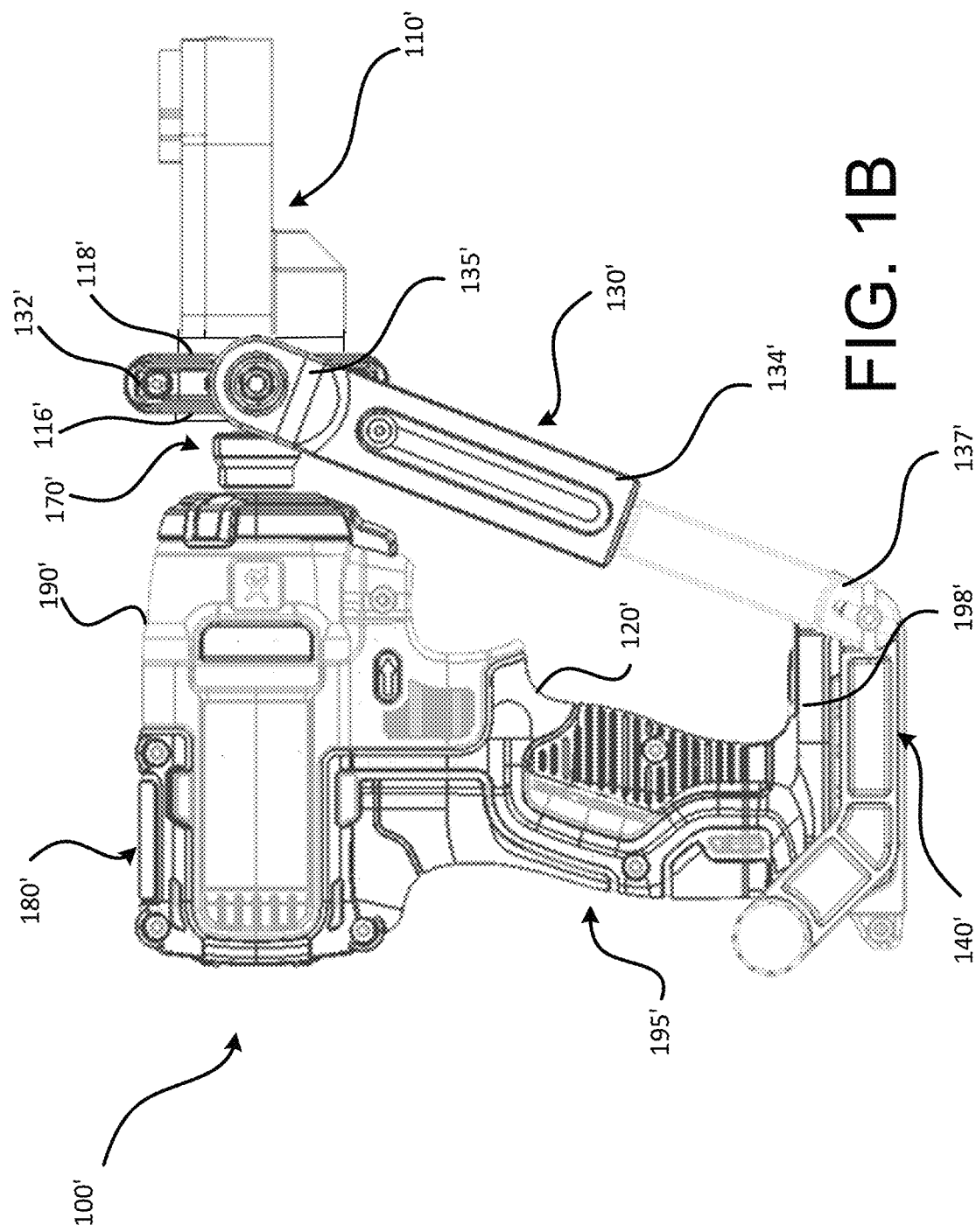
FIG. 1B is a side view of an example second rotary power tool, illustrating a coupling of an example accessory tool to the second rotary power tool.
Figure 1D:
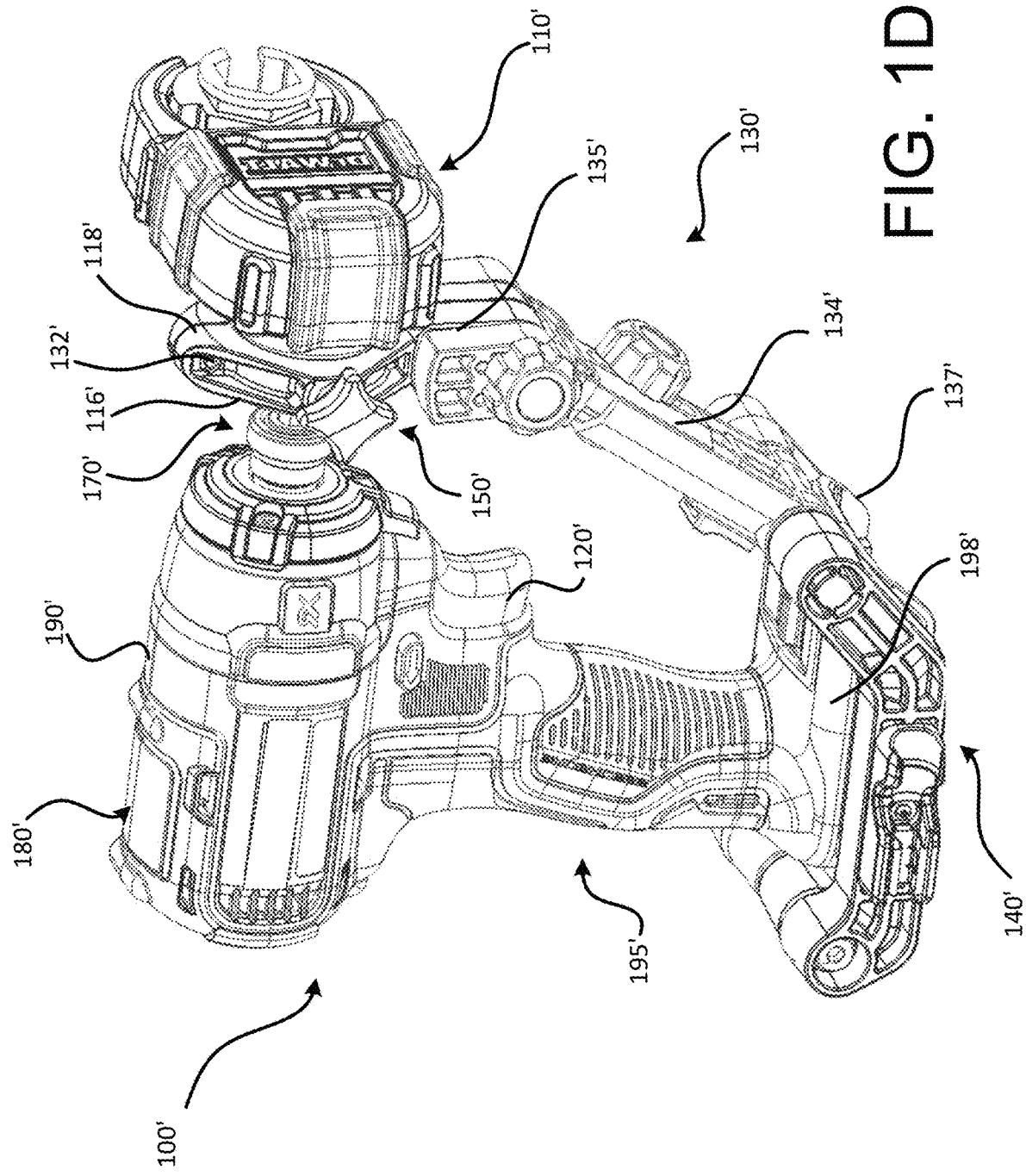
FIG. 1D is a perspective view of the example second rotary power, illustrating the coupling of an example accessory tool to the example second rotary power tool.
Figure 1E:
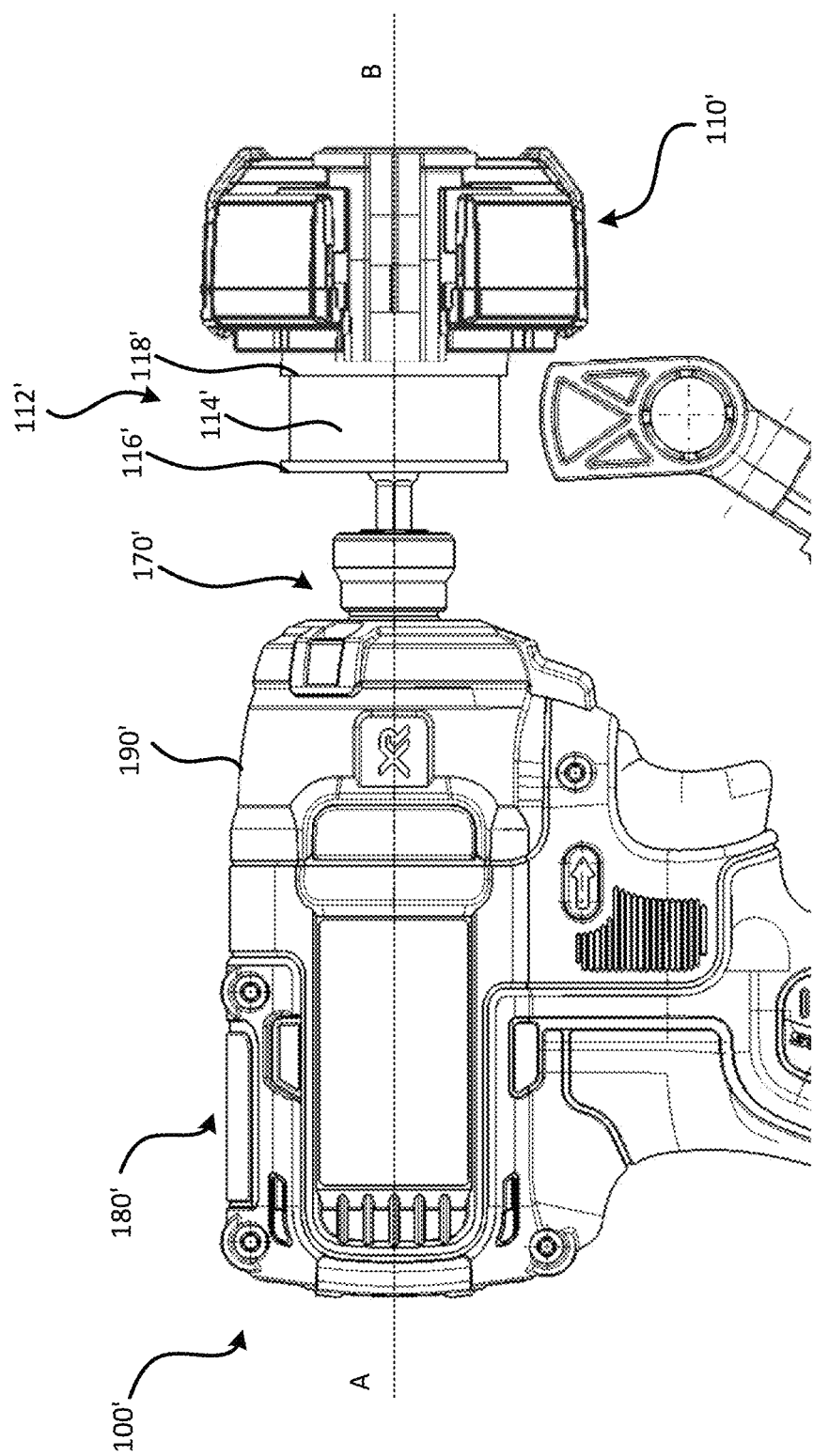
FIG. 1E is a partial side view of the example second rotary power tool and the example accessory tool shown in FIG. 1D.
Figure 1G:
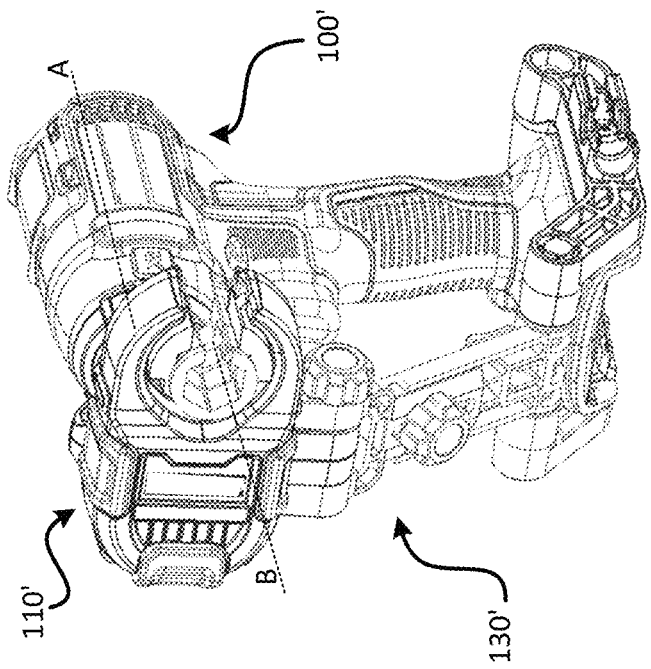
FIGS. 1F-1I illustrate example orientations of an example accessory tool with respect to an example rotary power tool.
Figure 1F:
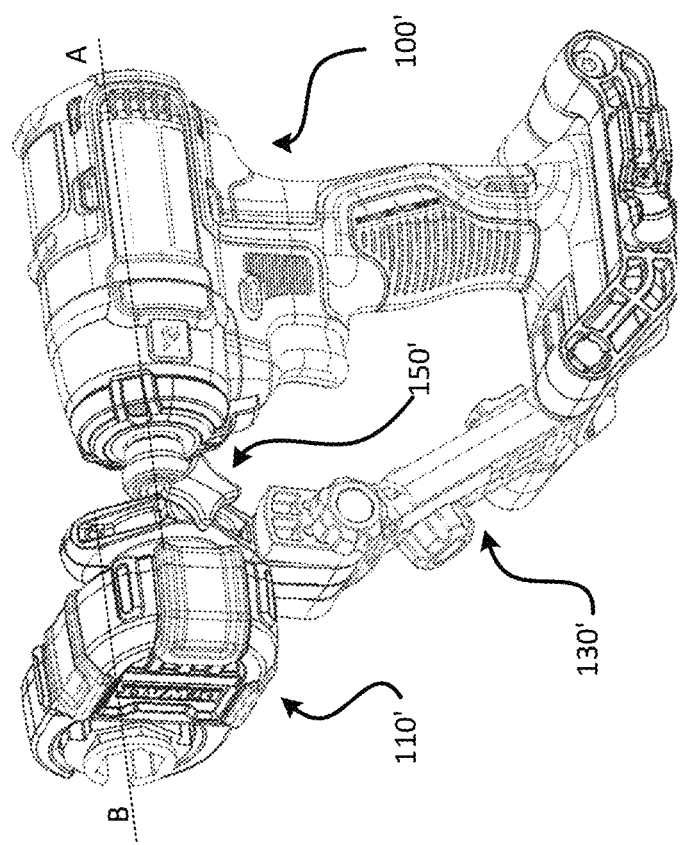
Figure 1I:
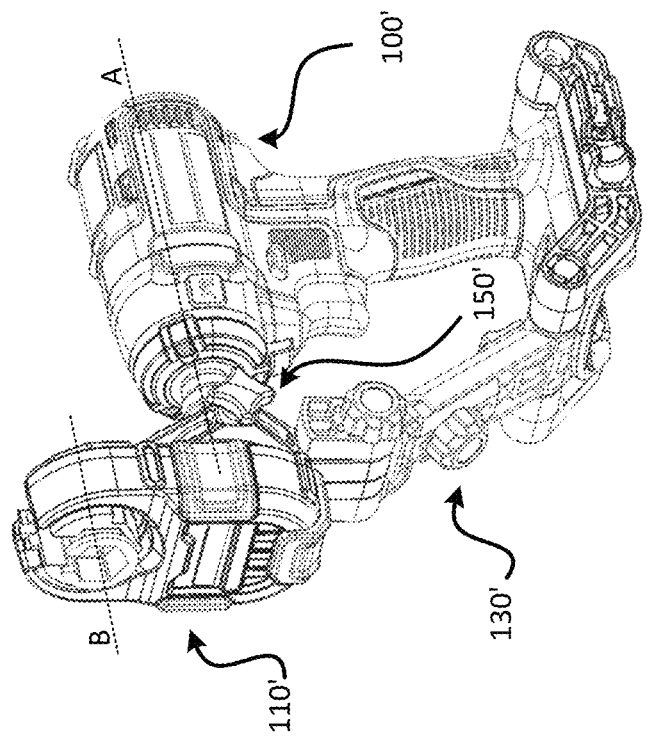
Figure 1H:
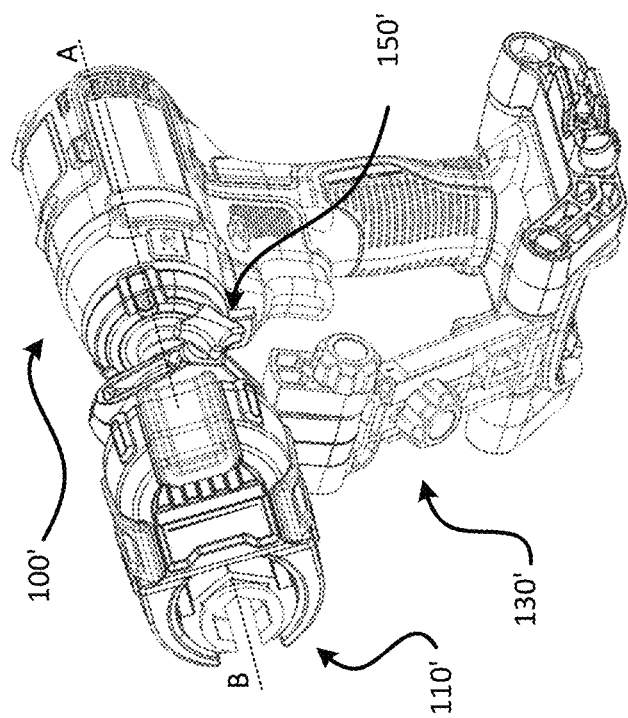

FIGS. 1B and 1C are side views of a second example of a power-driven tool 100' in the form of an impact driver for use with an accessory tool, such as one of the nut runner accessory tools described herein. In particular, FIGS. 1B and 1C illustrate the coupling of the example impact driver to a housing of an example accessory tool 110'. The example power-driven tool 100', in the form of an impact driver in the example shown in FIGS. 1B and 1C, includes a tool holder 170' that provides for coupling of output tools and/or accessories to an output device of the power-driven tool 100', including a nut runner accessory, in accordance with implementations described herein. The example power-driven tool 100' includes a housing 190', in which components such as, for example, a motor, a transmission, a rotary impact or Pott-style impact mechanism (not shown in FIGS. 1A-1C) and the like are housed. In some examples, the transmission and impact mechanism transmits a rotary impact force to an output tool and/or accessory tool coupled at the tool holder 170' to perform an operation on a workpiece. The tool holder 170' may comprise a quick-release hex receptacle and is provided at an end portion of the housing 190', corresponding to a working end of the example power-driven tool 100'. A trigger 120' for triggering operation of the tool 100' is provided at a handle portion 195' of the housing 190'. One or more selection devices 180' accessible to a user at the outside of the housing 190' provide for user control of the example power-driven tool 100'. For example, the one or more selection devices 180' can be manipulated by the user to turn the tool 100' on and off, to set an operation mode, to set an operational speed, an operational direction and the like.

The tool 100' may be provided with an angled brace assembly 130', similar to one of the braces described and shown in commonly owned U.S. Provisional Application No. 63/175,938, filed Apr. 16, 2021, titled "Power Tool Accessory System with Brace," commonly owned U.S. Provisional Application No. 63/217,874, filed Jul. 2, 2021, titled "Power Tool Accessory System with Brace," and commonly owned U.S. Provisional Application No. 63/263, 419, filed Nov. 2, 2021, titled "Power Tool Accessory System with Brace," each of which is incorporated by reference. The brace assembly 130' is illustrated in FIG. 1B, simply for purposes of discussion and illustration. Any of the brace assemblies described in the aforementioned patent applications may be applicable.

The brace assembly 130' may include a clamping assembly 140' configured to be removably and rigidly attached to a base portion 198' of the handle portion 195' of the housing 190'. A collar 132' is configured to be coupled to a rear end portion of a housing of an accessory tool 110' as shown in FIGS. 1B and 1C, such as, for example, a housing of one of the nut runner accessory tools described herein. An arm assembly 134' has a first end portion 135' pivotally coupled to the collar 132' and an opposite second end portion 137' coupled to the clamping assembly 140'. FIG. 1B illustrates the brace assembly 130' coupled to the power-driven tool 100' via the clamping assembly 140', and the collar 132' coupled between the first end portion 135' of the arm assembly 134' and the housing of the example accessory tool 110'.

FIG. 1C illustrates the example accessory tool 110' coupled to the example power-driven tool 100' at the tool holder 170'. As shown in FIG. 1C, in some examples, the housing of the accessory tool 110' may include an extension 112' for coupling of the accessory tool 110' to the example power-driven tool 100 shown in FIG. 1A and/or the example power-driven tool 100' shown in FIG. 1B. In some examples, the extension 112' may be substantially cylindrical. The extension 112' may include a coupling portion 114' between a first flange 116' and a second flange 118'. When coupling the brace assembly 130' to the housing of the example accessory tool 110', the collar 132' may be coupled on the coupling portion 114' and received between the first flange 116' and the second flange 118' to couple the housing of the accessory tool 110' to the brace assembly 130'. Further details of the brace assembly may be found in the aforementioned patent applications.

In the example shown in FIGS. 1B and 1C, an output axis B of the example accessory tool 110' is oriented substantially orthogonally an output axis A of the example power-driven tool 100' (corresponding to an input axis of the example accessory tool 110'). FIGS. 1D-1I illustrate an example in which the example accessory tool 110' is coupled to the example power-driven tool 100' such that the output axis B of the example accessory tool 110' is oriented substantially in parallel with the output axis A of the example power-driven tool 100' (and corresponding input axis of the example accessory tool 110'). In some situations, orientation of the output axis B of the example accessory tool 110' substantially in parallel with the output axis of the power-driven tool 100' may facilitate use of the accessory tool 110' and enhance user ergonomics. For example, in a situation in which one of the nut runner accessory tools described herein is coupled to the example power-driven tool 100' in this manner, alignment of the output axis B of the example accessory tool 110' substantially in parallel with the output axis A of the example power-driven tool 100' may cause the power-driven tool 100' (i.e., held by the user) to move in the direction of a nut being threaded onto a rod, providing a more ergonomic user experience in this particular example.

Features of the example power-driven tool 100' and the example brace assembly 130' shown in FIGS. 1D-1I are substantially similar to the features described above, and thus further duplicative detailed description thereof will be omitted.

In some examples, the brace assembly 130' may include an adjustment device 150'. User manipulation of the adjustment device 150' may provide for adjustment of an orientation, for example, a radial orientation, of the accessory tool 110' relative to the power-driven tool 100'. In particular, user manipulation of the adjustment device 150' may provide for adjustment of a radial position of a working portion of the accessory tool 110'. Various example radial orientations of the example accessory tool 110' with respect to the example power-driven tool 100' are shown in FIGS. 1F-1I. The examples shown in FIGS. 1F-1I are presented in a coupling of the example accessory tool 110' to the example power-driven tool 100' in which the output axis B of the example accessory tool 110' is oriented substantially in parallel with the output axis A of the example power-driven tool 100', simply for purposes of discussion and illustration. The principles described with respect to the adjustment of the radial orientation of the example accessory tool 110' may be similarly applied to an arrangement in which the output axis B of the example accessory tool 110' is oriented substantially orthogonally to the output axis A of the example power-driven tool 100'. Radial adjustment of the mounting position of the example accessory tool 110' in this manner may facilitate user access to workpieces in differing installation environments, access environments, and the like.

Figure 2B:
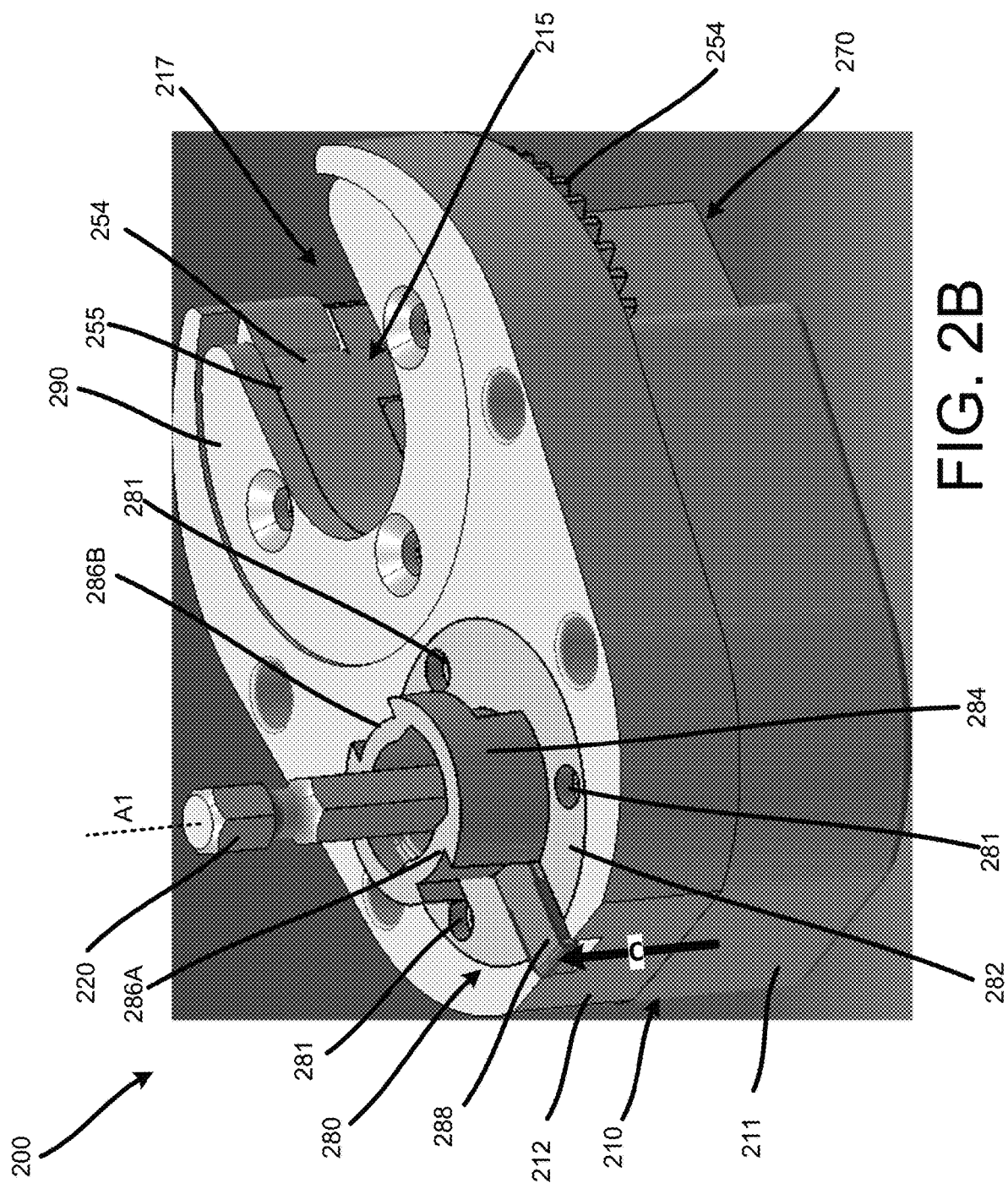
FIG. 2B is a bottom perspective view of the example nut runner accessory shown in FIGS. 2A(1) and 2A(2).
Figure 2C:
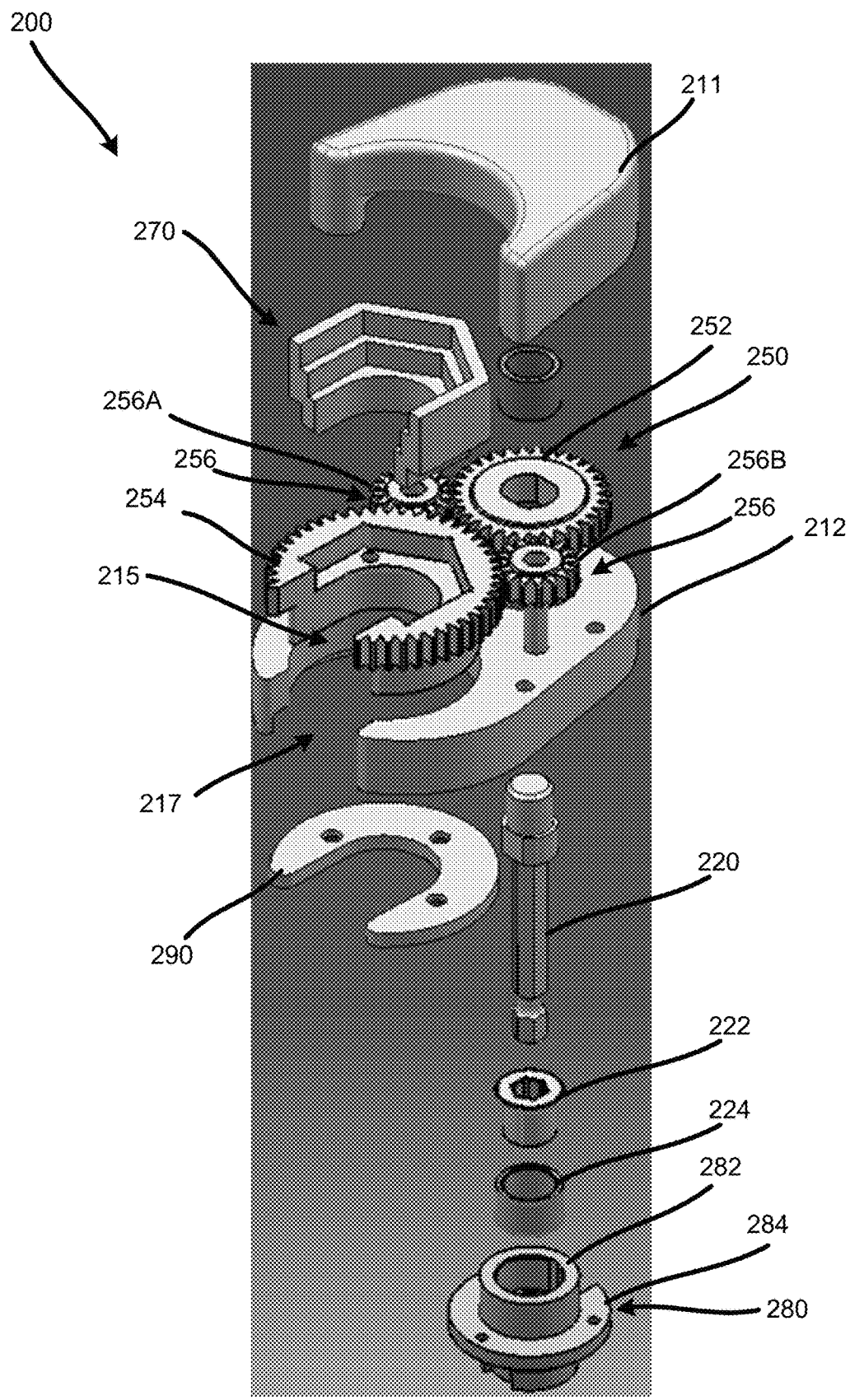
FIG. 2C is an exploded perspective view of the example nut runner accessory shown in FIGS. 2A and 2B, in accordance with implementations described herein.
Figure 2D:
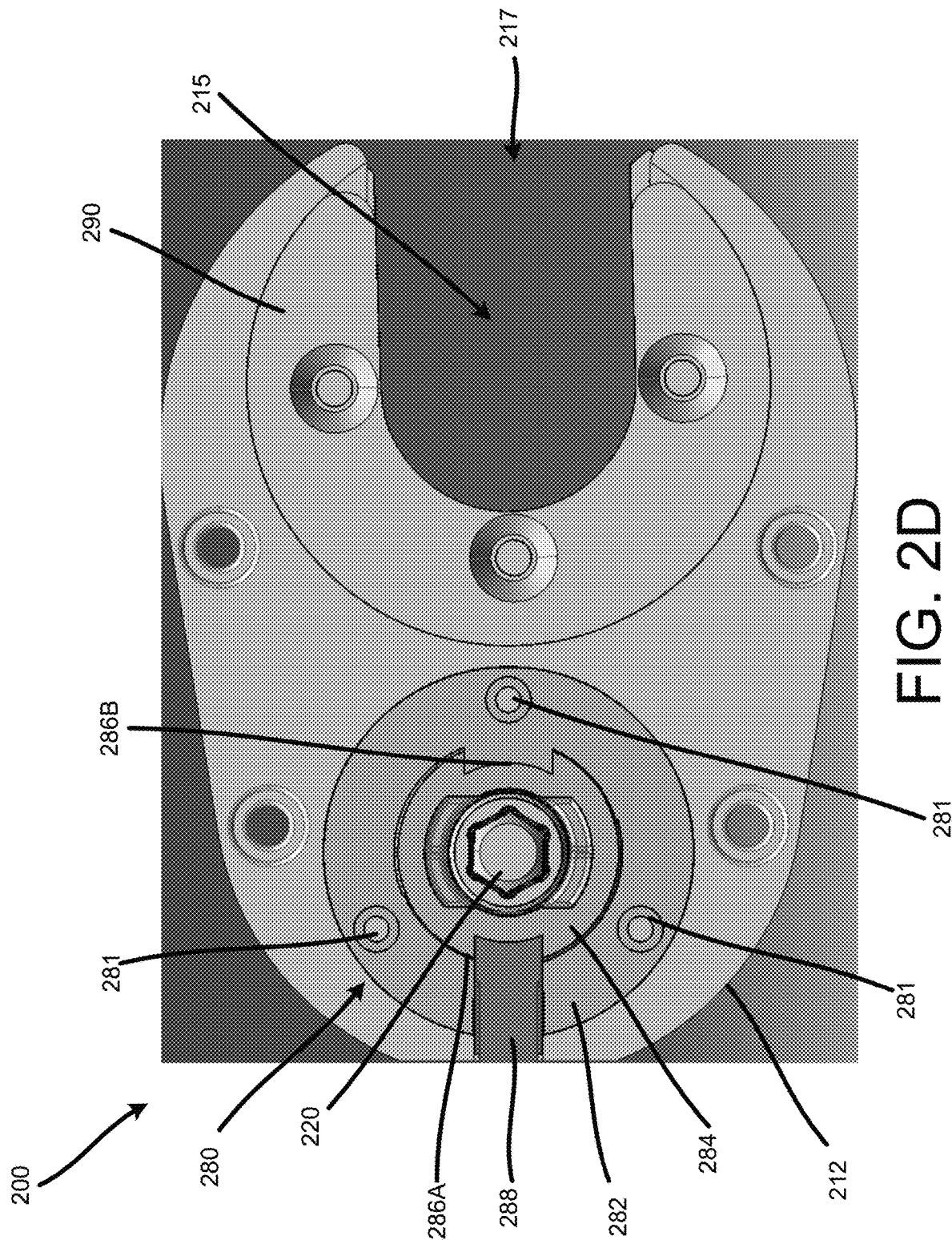
FIG. 2D is a bottom view of the example nut runner accessory shown in FIGS. 2A-2C, in accordance with implementations described herein.

FIG. 2A is a first assembled perspective view, and FIG. 2B is a second assembled perspective view, of an example nut runner accessory 200, in accordance with implementations described herein. FIG. 2C is an exploded perspective view of the example nut runner accessory 200. FIG. 2D is a plan view (for example, a bottom plan view in the example orientation shown in FIG. 2A) of the example nut runner accessory 200. FIG. 2E illustrates an example gear assembly 250 received in an example housing 210 of the example nut runner accessory 200, with a portion of the housing 210 removed so that a relative arrangement of gears of the example gear assembly 250 is visible. The example nut runner accessory 200 can be coupled to a power-driven tool such as the example power-driven tool 100 and/or the example power-driven tool 100' shown in FIGS. 1A-1I, to perform an operation on a workpiece, i.e., to move a nut along a threaded rod.

The example nut runner accessory 200 shown in FIGS. 2A-2E includes a housing 210 having a first housing portion 211 and a second housing portion 212. The example housing 210 (including the example first housing portion 211 and second housing portion 212) include a C-shaped contour, allowing the housing 210 to be positioned relative to an outer circumferential surface of a threaded rod, for the threading of a nut on the threaded rod. In some examples, the housing 210 includes an extension portion (similar to the extension 112' shown in FIG. 1C and/or FIG. 1E; not shown in FIGS. 2A-2E) that may facilitate the coupling of the nut runner accessory 200 to a brace assembly (not shown in FIGS. 2A-2E). A gear assembly 250 is housed in the housing 210. An input shaft 220 has a first end portion thereof fixed to the gear assembly 250. A second end portion of the input shaft 220 is configured to be coupled to the output assembly of an external source such as the example power-driven tool 100, or the example power-driven tool 100', or another power-driven tool not explicitly shown herein, via, for example, the chuck assembly 170/170' of the power-driven tool 100/100'. With the input shaft 220 coupled to the power-driven tool 100/100' via the chuck assembly 170/170', a force generated by the motor of the power-driven tool 100/100' can be transmitted to the nut runner accessory 200 so that an operation can be carried out on a workpiece.

As shown in FIGS. 2C and 2E, the example gear assembly 250 includes an input gear 252 coupled to an output gear 254 by a pair of idler gears 256 (256A, 256B). The example output gear 254 has a C-shaped configuration, corresponding to the C-shaped contour of the housing 210, allowing the output gear 254 to be positioned relative to the outer circumferential surface of the threaded rod, for the threading of a nut on the threaded rod. The input shaft 220 may be coupled, for example, fixedly coupled to the input gear 252. This causes the input gear 252 to rotate together with the input shaft 220 in response to a force received from an external source, for example, generated by the motor of the power-driven tool 100/100' in a coupled state of the nut runner accessory 200 and the power-driven tool 100/100'. For example, as shown in FIG. 2E(1), the input gear 252 may rotate in a first rotational direction R1 in response to a first rotational force transmitted thereto from the motor of the power-driven tool 100/100' (for example, in a first operation mode of the tool 100/100' that generates a rotational force in the first rotational direction R1). In response to rotation of the input gear 252 in the first rotational direction R1, the idler gears 256 (256A, 256B), which are in meshed engagement with the input gear 252, rotate in a second rotational direction R2 (opposite the first rotational direction R1). In response to rotation of the idler gears 256 (256A, 256B) in the second rotational direction R2, the output gear 254, which is in meshed engagement with the idler gears 256 (256A, 256B), rotates in the first rotational direction R1. Similarly, as shown in FIG. 2E(2), the input gear 252 may rotate in the rotational direction R2 in response to a second rotational force transmitted thereto from the motor of the power-driven tool 100/100' (for example, in a second operation mode of the tool 100/100' that generates a rotational force in the first rotational direction R2). In response to rotation of the input gear 252 in the second rotational direction R2, the idler gears 256 (256A, 256B) rotate in the first rotational direction R1, and the output gear 254 rotates in the second rotational direction R2. In some implementations, the first and second modes of operation of the example power-driven tool 100 may correspond to operation of the motor of the power-driven tool 100 in a forward direction and a reverse direction.

In the example arrangement of gears 252, 254, 256 of the example gear assembly 250 shown in FIGS. 2A-2E, a diameter of each of the idler gears 256 is less than a diameter of the input gear 252, and a diameter of the output gear 254 is larger than the diameter of the input gear 252, simply for purposes of discussion and illustration. The input gear 252, the output gear 254, and the idler gears 256 may have other relative sizes and/or combinations of sizes. For example, in some implementations, a diameter of the output gear 254 may be substantially the same as a diameter of the input gear 252, resulting in an approximately 1:1 gear ratio. In the example arrangement shown in FIGS. 2A-2E, the larger diameter of the output gear 254 as compared to the smaller diameter of the input gear 252 causes the output gear 254 to rotate at a slower rotational speed than the input gear 252. Thus, the arrangement shown in FIGS. 2A-2E presents an example in which a rotational speed of the output gear 254 is reduced compared to the rotational speed of the input gear 252. In some situations, for example in a situation in which an output speed of the power-driven tool 100/100' is relatively high, this type of output speed reduction may be beneficial. For example, operation of the nut runner accessory 200 above an output speed of the power-driven tool 100/100' in the form of a drill driver (i.e., an arrangement in which a gear ratio is less than 1.0) may result in inconsistent engagement of the nut runner accessory 200 with a nut to be threaded onto/off of a threaded rod, unstable operation of the nut runner accessory 200, and the like. The relative sizes and arrangement of the example gears 252, 254, 256 of the example gear assembly 250 shown in FIGS. 2C and 2E are provided for purposes of discussion and illustration. A gear ratio associated with the example gear assembly 250 can be adjusted by adjusting the relative sizes or number of teeth of the example gears 252, 254, 256 to, for example, further reduce a rotational speed of the output gear 254 relative to the input gear 252, or to increase a rotational speed of the output gear 254 relative to the input gear 252, and the like.

In the example arrangement shown in FIGS. 2C and 2E, the example gear assembly 250 includes two idler gears 256A, 256B in meshed engagement between the input gear 252 and the output gear 254. In this manner, at least one of the two idler gears 256A, 256B will remain in meshed engagement between the input gear 252 and the output gear 254 as the output gear 254 rotates relative to the idler gears 256A, 256B. For example, as the C-shaped output gear 254 rotates, and the open portion of the C-shaped output gear 254 rotates past the first idler gear 256A, the second idler gear 256B maintains its meshed engagement with the output gear 254, so that the output gear 254 continues to be driven. Similarly, as the output gear 254 rotates, and the open portion of the C-shaped output gear 254 rotates past the second idler gear 256B, the first idler gear 256A maintains its meshed engagement with the output gear 254, so that the output gear 254 continues to be driven.

As shown in FIGS. 2A and 2C, a driver head 270 may be fixed to the output gear 254, to rotate together with the output gear 254 relative to the housing 210. The output gear 254, and driver head 270 fixed thereto, may be retained relative to the housing 210 by a plate 290. The plate 290 may be fixed to a bottom surface 255 of the output gear 254 such that the plate 290 rotates together with the output gear 254 and the driver head 270, while alignment of the output gear 254 (and driver head 270 fixed thereto) is maintained relative to the housing 210, but is allowed to rotate.

In the example shown in FIGS. 2A(1) and 2A(2), the example driver head 270 is a separate component from the output gear 254, with a base 279 of the driver head 270 received in a corresponding receptacle 259 defined in the output gear 254. The driver head 270 may be fixed to the output gear 254 by, for example, press-fitting, adhesive, and other fastening methods. In other implementations, the driver head 270 may be integrally formed with the output gear 254. In yet other implementations, the driver head 270 may be removably coupled with the output gear 254, e.g., by slip fit, friction fit, and/or a ball detent and recess. The driver head 270 has a C-shaped contour, corresponding to the C-shaped contour of the housing 210, the C-shaped contour of the plate 290, and the C-shaped contour of the output gear 254. The C-shaped contour of the housing 210 (including the first housing portion 211 and the second housing portion 212), the plate 290, the output gear 254 and the driver head 270 together define a U-shaped slot 215 of the nut runner accessory 200. The U-shaped slot 215 may allow the nut runner accessory 200 to be positioned around, i.e., partially surrounding, a threaded rod and a nut to be threaded onto/off of the threaded rod. In particular, an end portion 217 of the U-shaped slot 215 may allow the threaded rod and nut to be inserted into the U-shaped slot 215 for engagement with the nut runner accessory 200. Similarly, the end portion 217 of the U-shaped slot 215 may allow the threaded rod and nut to be removed from the U-shaped slot 215 for disengagement from the nut runner accessory 200.

The example driver head 270 shown in FIGS. 2A and 2C is a multi-sized driver head 270 that can engage multiple different sizes/configurations of nuts. In particular, the example driver head 270 shown in FIGS. 2A and 2C is a multi-size hexagonal driver head including two sets of stepped pockets 271 and 272 extending upward from the base 279, each facing the open end portion of the U-shaped slot 215, and each configured to engage a different size of hexagonal nut. Each pocket may extend around an entirety of a circumference of the central opening or may form only a portion of the circumference about the central opening (e.g., three or four side walls of a six-sided hex-shape).

The first stepped pocket 271 is defined by four side walls 273 and a base wall 275. The four side walls 273 are arranged to define four sides of a hexagonal shape having a first cross-sectional width. The base wall 275 defines an area on which a corresponding surface of a first nut having a first diameter is to be seated, with four sides of the first nut engaging the four side walls 273 of the first stepped pocket 271, such that the first nut can be engaged in the first stepped pocket 271. Similarly, the second stepped pocket 272 is defined by four side walls 274 and a base wall 276. The four side walls 274 are arranged to define four sides of a hexagonal shape having a second cross-sectional width. The base wall 276 defines an area on which a corresponding surface of a second nut is to be seated, with four sides of the second nut engaging the four side walls 274 of the second stepped pocket 272, such that the second nut can be engaged in the second stepped pocket 272.

Due to the stepped nature of the first stepped pocket 271 and the second stepped pocket 272, the first cross-sectional width of the first stepped pocket 271 is greater than the second cross-sectional width of the second stepped pocket 272. In this manner, the first stepped pocket 271 is configured to engage the first nut having a larger size or dimension (i.e., larger diameter) than the nut to be engaged by the second stepped pocket 272. The steps defined by the relative positioning of the base walls 275, 276 of the first and second stepped pockets 271, 272 seat and retain the respective nut in the appropriate stepped pocket 271, 272 for the size of the nut. Thus, the example multi-sized driver head 270 shown in FIGS. 2A and 2C including the first and second stepped pockets 271, 272 is configured to selectively receive and engage nuts having different sizes/cross-sectional widths for threading onto/off of a threaded rod by the nut runner accessory 200. The ability to receive and engage nuts having different size(s) and/or cross-sectional diameters in this manner enhances the utility and functionality of the nut runner accessory 200 and the power-driven tool 100/100' to which the nut runner accessory 200 is coupled.

The driver head 270 shown in FIGS. 2A and 2C is a hexagonal driver head 270 including two stepped pockets 271, 272 configured to engage two different sized nuts, simply for purposes of discussion and illustration. In some implementations, the driver head may include more, or fewer, stepped pockets. In some implementations, the stepped pockets may have configurations other than the four side walled configuration shown. For example, one or more of the stepped pockets can include more, or fewer walls, may be splined and/or have a starred contour, and the like. In addition, the driver head could have one or more pockets that have an adjustable diameter or width, e.g., using an adjustment mechanism similar to an adjustable head hand wrench.

As noted above, the example nut runner accessory 200 may be driven by a power-driven tool, such as the example power-driven tool 100 and/or the example power-driven tool 100' described above. In some examples, an end portion of the input shaft 220 can be coupled to the output assembly of the power-driven tool 100/100' via the chuck assembly 170/170', allowing a force generated by the motor of the tool 100/100' to be transmitted to the gear assembly 250 of the nut runner accessory 200. In some examples, an engagement structure 280 (see FIGS. 2B-2D) may be provided on the housing 210 of the nut runner accessory 200, surrounding the input shaft 220. The engagement structure 280 may engage a corresponding coupling device provided on the power-driven tool 100/100' and/or on an extension device coupled to the power-driven tool 100/100'. For example, in some implementations, L-shaped slots 286A, 286B formed on opposite sides of the engagement structure 280 may be configured to slidably engage corresponding protrusions defined on a coupling device and/or an extension device and/or a holding device provided on or coupled to the power-driven tool 100/100' to provide for axial, non-rotatable coupling therebetween. Engagement of the engagement structure 280 in this manner is described in U.S. patent application Ser. No. 16/858,896, which is incorporated herein by reference in its entirety.

In the example arrangement shown in FIGS. 2B and 2C, the engagement structure 280 includes a flange portion 282 extending outward, for example radially outward, from a cylindrical coupling member 284. Fasteners 281 may extend through the flange portion 282 and into the housing 210, to couple the cylindrical coupling member 284 to the housing 210. In the example shown in FIG. 2B, a first L-shaped slot 286A and a second L-shaped slot 286B are formed on a first end portion of the cylindrical coupling member 284 that is configured to engage or mate with a corresponding engagement structure or coupling device on the power-driven tool 100 and/or an extension device coupled thereto. A second end portion of the cylindrical coupling member 284 engages a coupling nut 222 and sleeve 224 surrounding a central portion of the input shaft 220, to fix the input shaft 220 to the engagement structure 280. A radially extending tab 288 is biased in the direction of the arrow C by, for example a leaf spring (not shown). With the complimentary slots and protrusions of the engagement structure 280 and the corresponding coupling device/engagement structure of the tool 100/100' engaged, the tab 288 may be biased into a corresponding recess in the mated coupling device/engagement structure. The biasing of the tab 288 into the recess of the mating coupling device/engagement structure may in turn retain the position of the protrusions of the mated coupling device/engagement structure in the L-shaped slots 286A, 286B, thus maintaining an axially aligned, non-rotatably coupling between the engagement structure 280 and the mated coupling device/engagement structure.

In use, a threaded rod can be received, or positioned in the U-shaped slot 215, and a nut engaged into one of the two example stepped pockets 271, 272 defined in the driver head 270 of the example nut runner accessory 200. With the input shaft 220 coupled to the output assembly of the power-driven tool 100/100', the input shaft 220 rotates in response to the force generated by the motor of the power-driven tool 100/100'. This causes the output gear 254 and the driver head 270 to rotate, thus threading the nut along the threaded rod. A force of the motor in a first rotational direction causes corresponding rotation of the driver head 270 and the nut in the first rotational direction, and movement of the nut along the threaded rod in a first axial direction. Similarly, a force of the motor in a second rotational direction causes corresponding rotation of the driver head 270 and the nut in the second rotational direction, and movement of the nut along the threaded rod in a second axial direction. The U-shaped slot 215 allows the nut runner accessory 200 to move along the axial length of the threaded rod as the nut is driven in this manner, allowing the nut to be driven along threaded rods of varying lengths.

In some situations, depending on a configuration of the driver head, the stepped pockets, installation position with respect to the housing, rotation speed and the like, operation of the nut runner accessory may be affected by a relative position of a center of rotation of the driver head and a center of mass of the driver head. That is, in some situations, an offset between the center of rotation of the driver head and the center of mass of the driver head may produce vibration during operation, and may result in inconsistent engagement and/or disengagement of the driver head with a nut to be threaded onto/off of a threaded rod. Accordingly, in some implementations, a nut runner accessory, in accordance with implementations described herein, may include counterweighting features. Counterweighting features may counteract imbalance generated during operation due to an offset between the center of rotation and the center of mass of the driver head, thus improving engagement with the nut to be threaded onto/off of the threaded rod, and enhancing functionality and utility of the nut runner accessory and power-driven tool to which it is coupled.

Figure 3A:
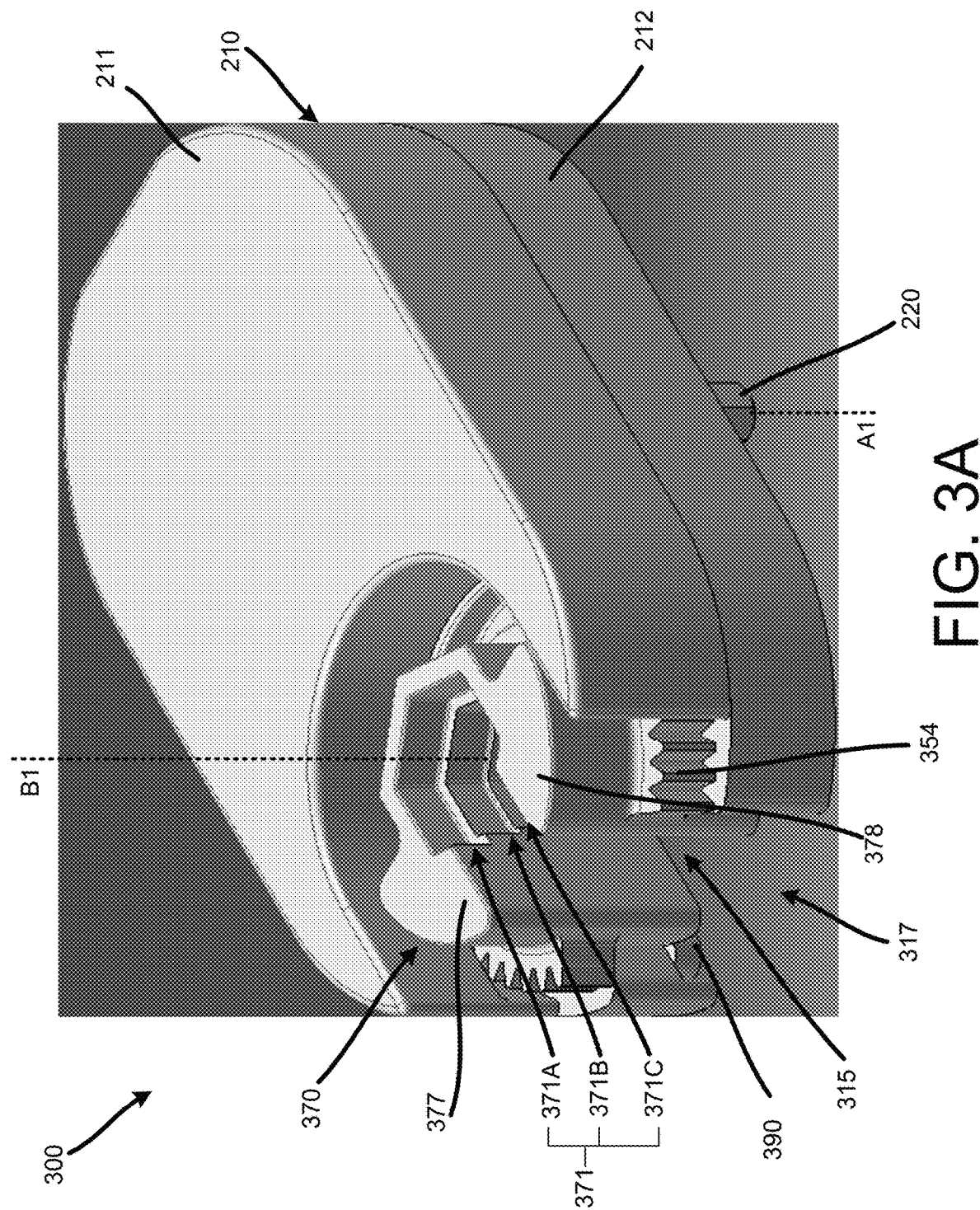
FIG. 3A is an assembled perspective view of a nut runner accessory, in accordance with implementations described herein.
Figure 3B:
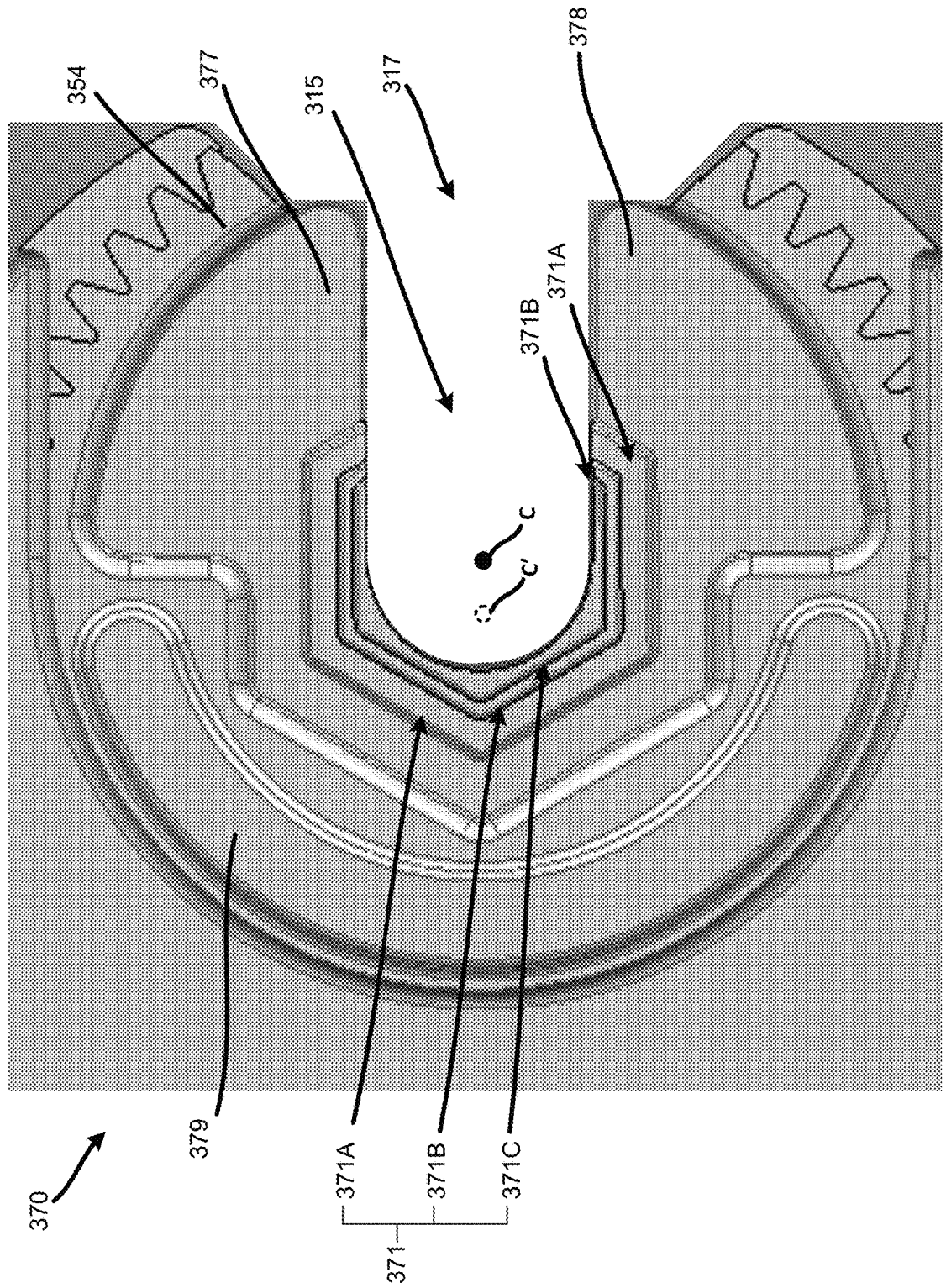
FIG. 3B is a top plan view of the example nut runner accessory shown in FIG. 3A.
Figure 3C:
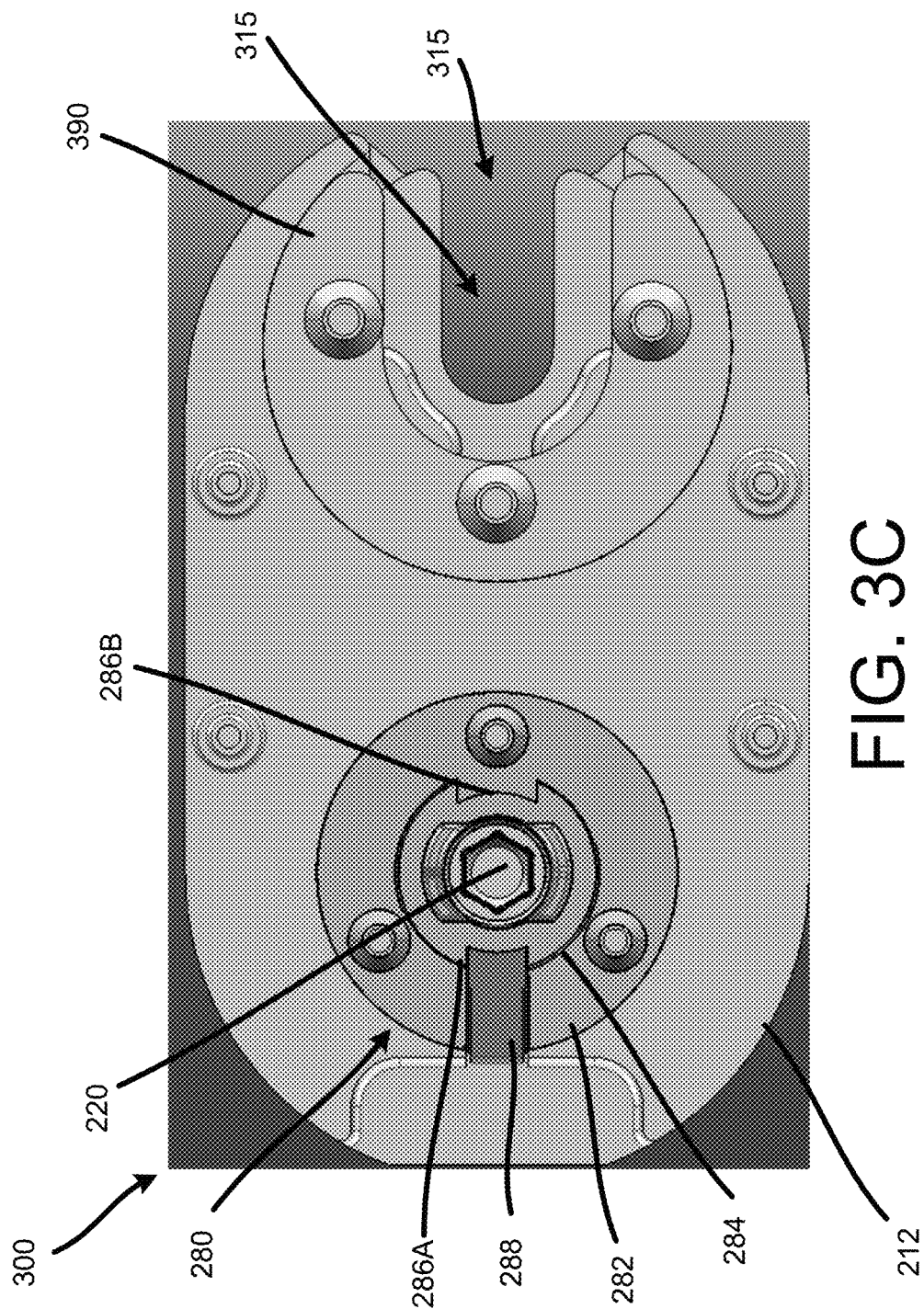
FIG. 3C is a bottom plan view of the example nut runner accessory shown in FIG. 3A.
Figure 3D:
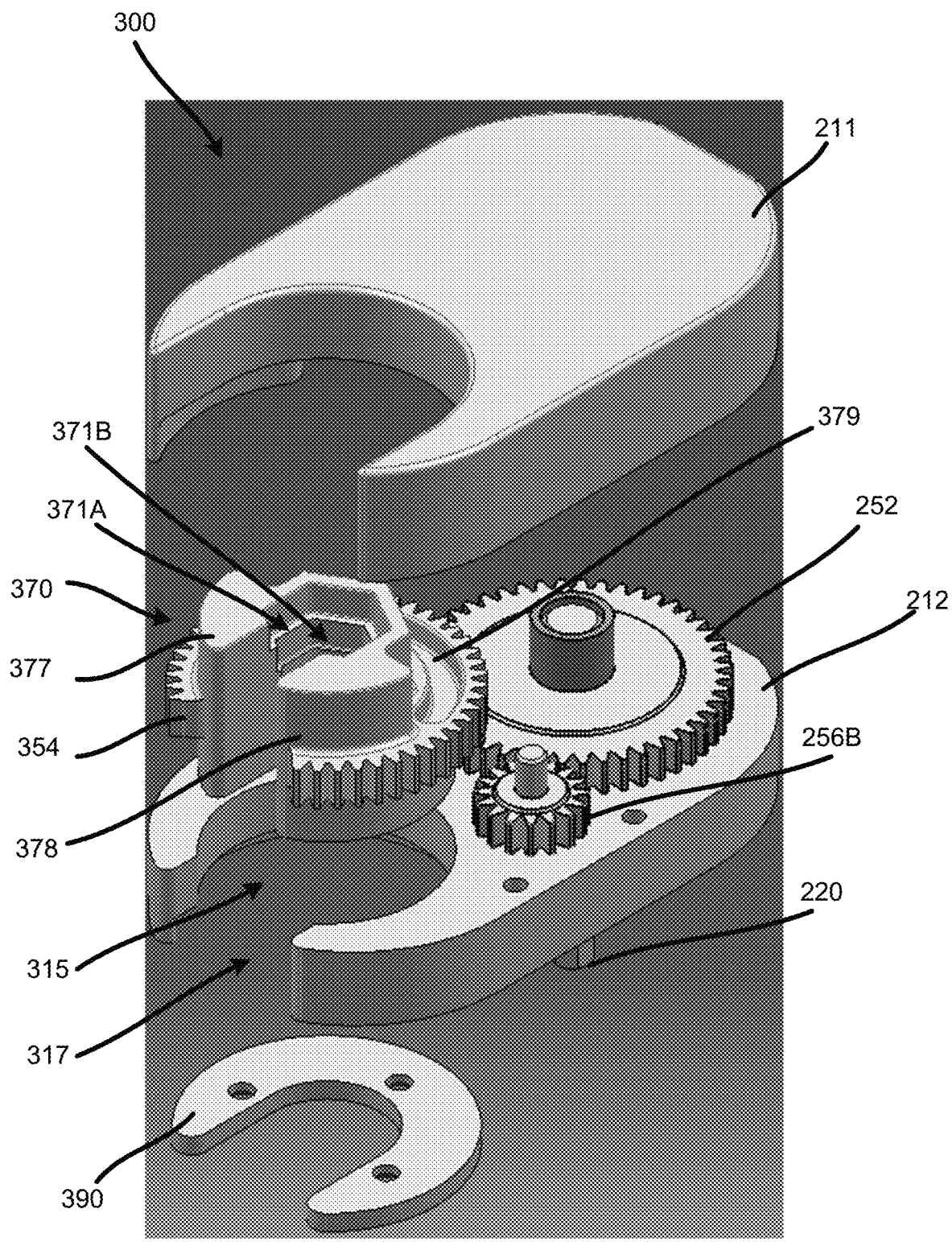
FIG. 3D and FIG. 3E are exploded perspective views of the example nut runner accessory shown in FIGS. 3A-3C.
Figure 3E:
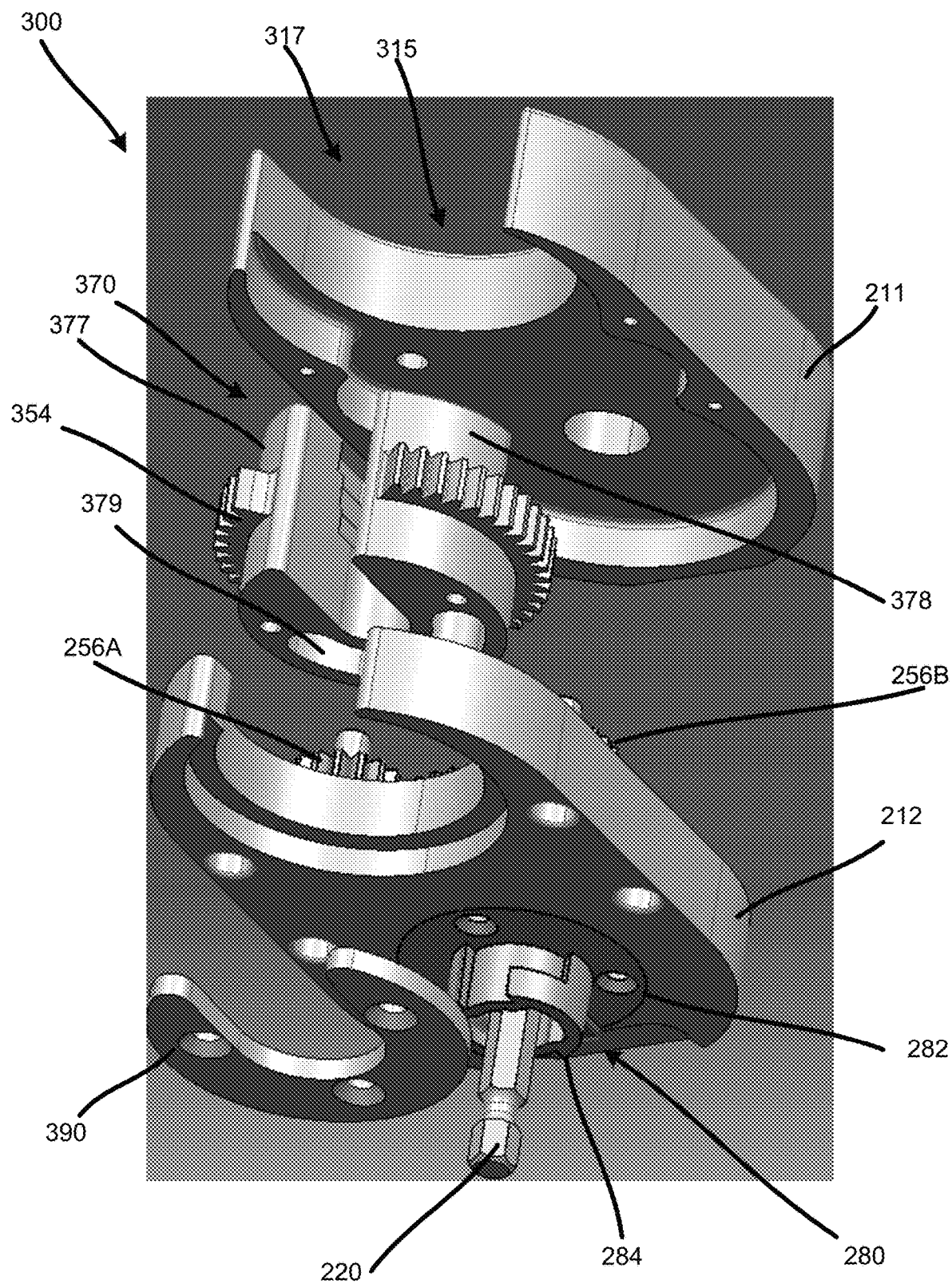

FIG. 3A is a top assembled perspective view of a nut runner accessory 300, in accordance with implementations described herein. FIG. 3B is a top plan view, and FIG. 3C is a bottom plan view of the example nut runner accessory 300 shown in FIG. 3A. FIG. 3D is a partially exploded top perspective view, and FIG. 3E is a partially exploded bottom perspective view, of the example nut runner accessory 300 shown in FIGS. 3A-3C.

The example nut runner accessory 300 shown in FIGS. 3A-3E includes the housing 210 as described above having the first and second housing portions 211, 212. The example nut runner accessory 300 includes the input shaft 220 configured to be coupled between the input gear 252 and the output assembly of the power-driven tool 100/100', as described above with respect to the example nut runner accessory 200 shown in FIGS. 2A-2E. The example nut runner accessory 300 shown in FIG. 3A includes a counterweighted driver head 370 including one or more counterweight features 377, 378, 379. In the example shown in FIGS. 3A-3E, the counterweighted driver head 370 includes a first counterweight feature 377, in the form of a mass provided at a first end portion of a plurality of stepped pockets 371 formed in the driver head 370, and a second counterweight feature 378 in the form of a mass at a second end portion of the plurality of stepped pockets 371. The example driver head 370 includes a third counterweight feature 379 in the form of a recess, or a removal of mass, at a periphery of the plurality of stepped pockets 371. The one or more counterweight features 377, 378, 379 may counteract imbalance generated during operation, to maintain engagement of a nut in one of the plurality of stepped pockets 371. That is, without the one or more counterweight features 377, 378, 379, a center of mass may be positioned at a point C', somewhat offset from a center of rotation of the driver head 370 positioned at a point C, as shown in FIG. 3B. In contrast, in the example nut runner accessory 300 including the example one or more counterweight features 377, 378, 379 the center of mass and the center of rotation of the counterweighted driver head 370 may coincide or approximately coincide, or be aligned or approximately aligned at the point C shown in FIG. 3B.

In the example implementation shown in FIGS. 3A-3E, the counterweighted driver head 370 is formed integrally with an output gear 354 that is driven by the input gear 252 via the idler gears 256. In this configuration, the third counterweight feature 379 may be formed as a recess defined along a periphery of the plurality of stepped pockets 371, in a surface portion of the output gear 354. In some examples, the counterweighted driver head 370 may be formed separately from, and coupled to, the output gear 354. Counterweighting of the driver head 370 may provide for stable engagement of the driver head 370 with a nut to be threaded onto a threaded rod, and may provide for consistent operation of the example nut runner accessory 300 driven by the example power-driven tool 100.

As shown in FIGS. 3A-3E, the example counterweighted driver head 370 can engage multiple different sizes/configurations of nuts. In particular, the example counterweighted driver head 370 shown in FIGS. 3A and 3D is a multi-size hexagonal driver head including three sets of stepped pockets 371A, 371B, 371C, each configured to engage a different size of hexagonal nut. In this example arrangement, each of the plurality of stepped pockets 371 is defined by four side walls and a base wall. The four side walls are arranged to define four sides of a hexagonal shape having a cross-sectional width corresponding to a nut to be engaged by the corresponding stepped pocket 371, and the base wall defines an area on which a corresponding surface of the nut is to be seated. The stepped nature of the plurality of stepped pockets 371 (i.e., a first stepped pocket 371A, a second stepped pocket 371B, and a third stepped 371C in this example arrangement) having different cross-sectional widths allow the counterweighted driver head 370 to selectively receive and engage nuts having different sizes/cross-sectional widths for threading onto/off of a threaded rod by the nut runner accessory 300. The counterweighted driver head 370 shown in FIGS. 3A and 3D is a hexagonal driver head 370 including three stepped pockets 371A, 371B, 371C configured to engage a corresponding three different sized nuts, simply for purposes of discussion and illustration. In some implementations, the counterweighted driver head 370 may include more, or fewer, stepped pockets, having the same or different configurations other than the four side walled configuration shown, including more, or fewer, walls, splined surfaces, a starred contour, and the like.

The example counterweighted driver head 370 has a C-shaped contour, corresponding to a C-shaped contour of the output gear 354 and a C-shaped contour of a plate 390 that is fixed to the output gear 354, and that is configured to rotate together with the output gear 354 and counterweighted driver head 370 while retaining the output gear 354 and counterweighted driver head 370 rotatably coupled to the housing 210. The aligned C-shaped contour of the counterweighted driver head 370, the output gear 354 and the plate 390 define a U-shaped slot 315 of the nut runner accessory 300. The U-shaped slot 315 may define an engagement portion of the nut runner accessory 300, allowing the nut runner accessory 300 to be positioned around, i.e., partially surrounding, a threaded rod and a nut to be threaded onto/off of the threaded rod. In particular, an end portion 317 of the U-shaped slot 315 may allow the threaded rod and nut to be inserted into the U-shaped slot 315 for engagement with the nut runner accessory 300. Similarly, the end portion 317 of the U-shaped slot 315 may allow the threaded rod and nut to be removed from the U-shaped slot 315 for disengagement from the nut runner accessory 300. Counterweighting provided by the one or more counterweight features 377, 378, 379 may reduce vibration and/or provide for stable engagement between the counterweighted driver head 370 and the nut during operation of the nut runner accessory 300, thus improving utility and functionality of the nut runner accessory 300 and the power-driven tool by which it is driven.

In the example nut runner accessory 200 described above with respect to FIGS. 2A-2E, and the example nut runner accessory 300 described above with respect to FIGS. 3A-3E, a rotational axis A1, or input axis of operation A1 at the input shaft 220 of the nut runner accessory 200, 300 is substantially aligned with, or arranged substantially in parallel to an output axis of operation B1 at the driver head 270, 370 of the nut runner accessory 200, 300. The positioning of the input axis of operation A1 results in a first orientation of the example nut runner accessory 200, 300 relative to the power-driven tool 100/100'. In some examples, a nut runner accessory, in accordance with implementations described herein, may be configured so that the input axis of operation is arranged at an angle with respect to the output axis of operation.

Figure 4A:
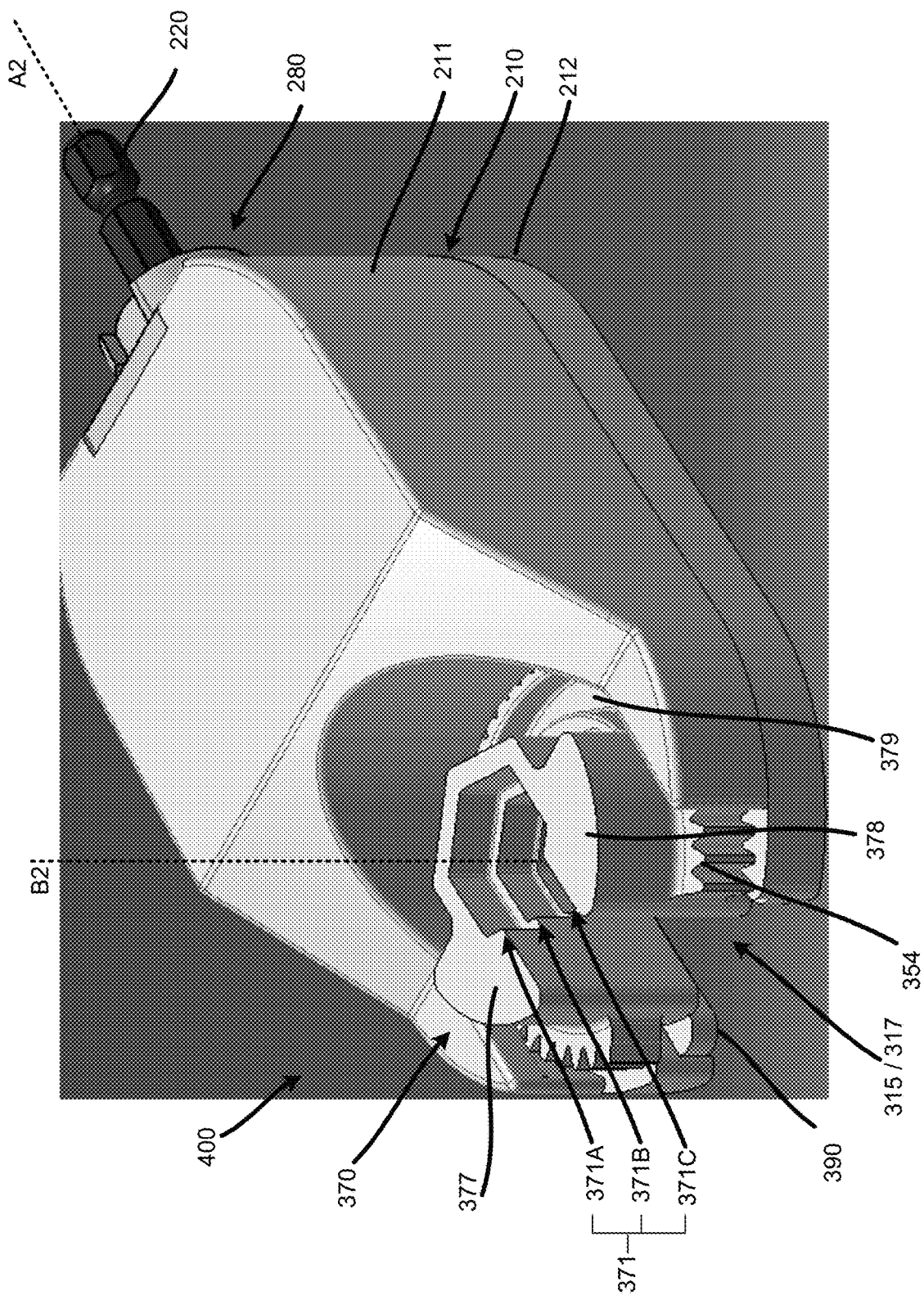
FIG. 4A is an assembled perspective view of an example nut runner accessory, in accordance with implementations described herein.
Figure 4D:
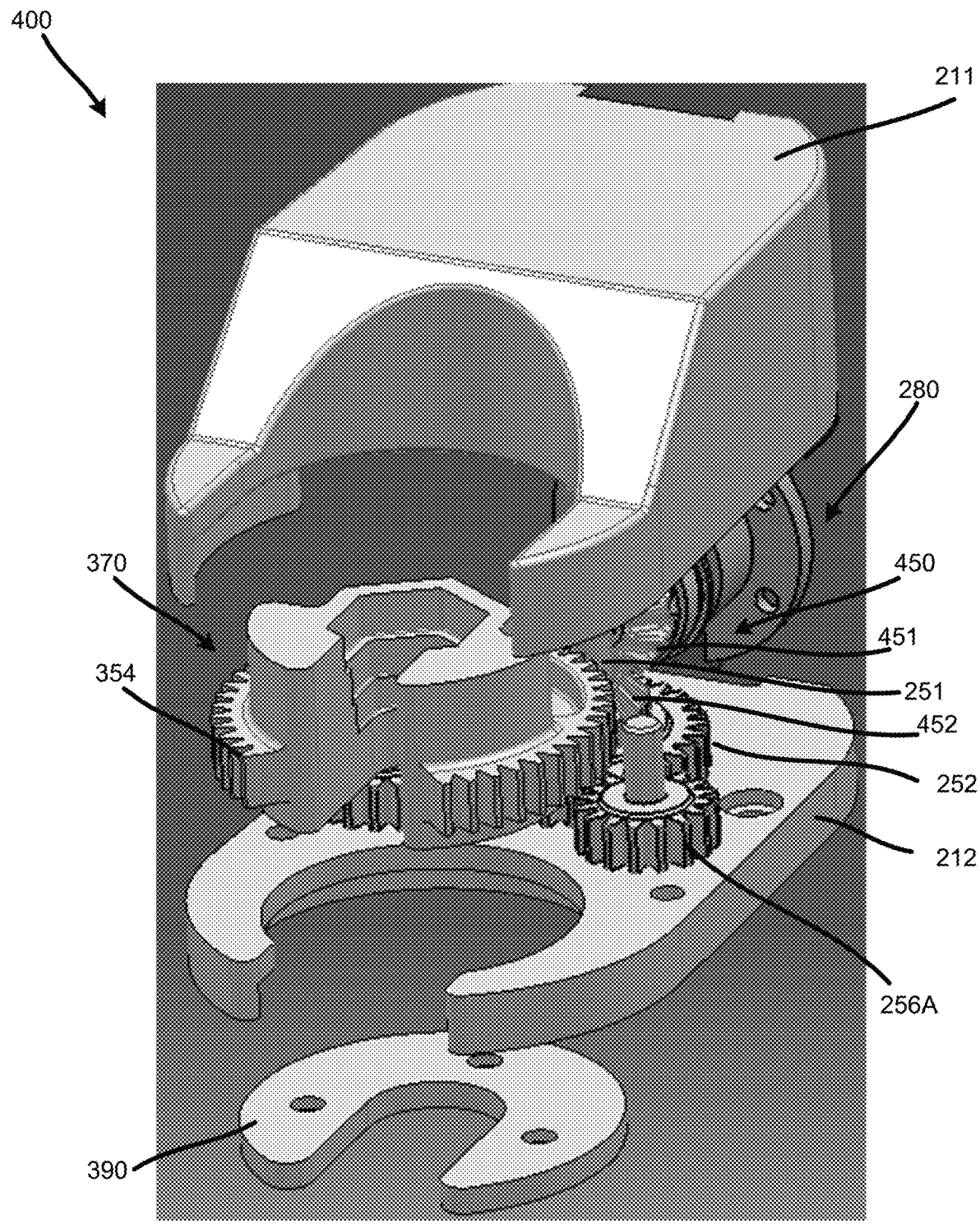
FIG. 4D and FIG. 4E are partially exploded perspective views of the nut runner accessory shown in FIGS. 4A-4C.

FIG. 4A is an assembled perspective view of an example nut runner accessory 400, in accordance with implementations described herein. FIG. 4B is a bottom plan view, and FIG. 4C is a side view, of the example nut runner accessory 400 shown in FIG. 4A. FIG. 4D is a partially exploded top perspective view, and FIG. 4E is a partially exploded bottom perspective view, of the nut runner accessory 400 shown in FIGS. 4A-4C.

The example nut runner accessory 400 shown in FIGS. 4A-4E includes the counterweighted driver head 370 described above with respect to FIGS. 3A-3E, simply for purposes of discussion and illustration. The nut runner accessory 400 can include other driver heads, such as, for example the driver head 270 described above with respect to FIGS. 2A-2E, or other driver heads.

In the example nut runner accessory 400 shown in FIGS. 4A-4E, the input shaft 220 is positioned along an input axis of operation A2 that is oriented at an angle with respect to the output axis of operation B2 of the nut runner accessory 400. In the example shown in FIGS. 4A-4E, the input axis of operation A2 is oriented substantially orthogonally to the output axis of operation B2. Orientation of the input axis of operation A2 at an angle relative to the output axis of operation B2 may allow for a different positioning of the power-driven tool 100/100' (by which the nut runner accessory 400 is driven) to provide a different orientation angle of the nut runner accessory 400 relative to a workpiece.

Figure 4E:
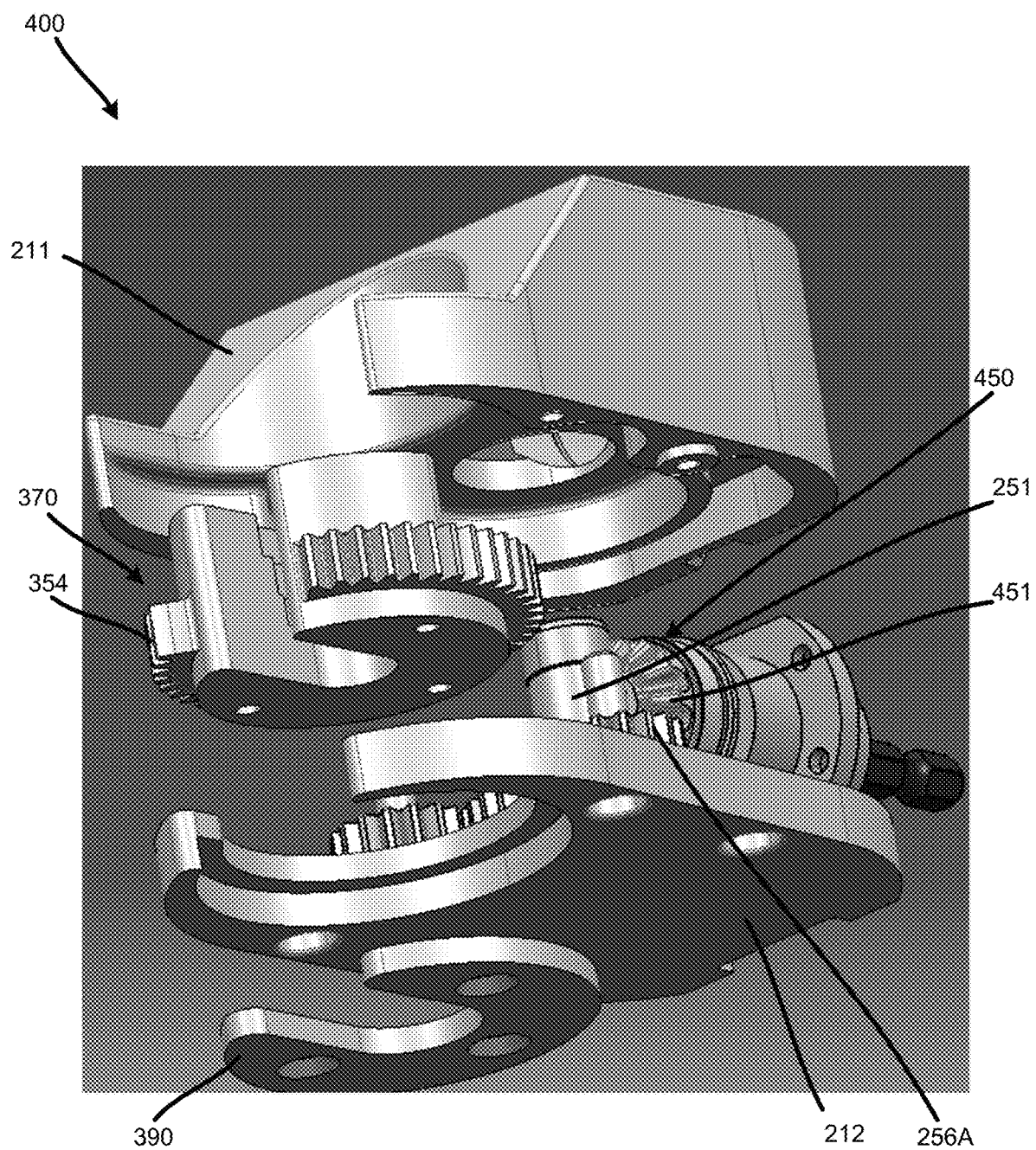

As shown in FIGS. 4D and 4E, in this example arrangement, the input shaft 220, now oriented along the input axis of operation A2, drives the input gear 252 of the gear assembly 250 via a set of bevel gears 450, that change the input axis of rotation so that the axis of rotation of the input gear 252 is parallel to the axis of rotation of the output gear 254 and the driver head 370. The set of bevel gears 450 includes a first bevel gear 451 fixed to the end of the input shaft 220, and a second bevel gear 452 in meshed engagement with the first bevel gear 451. The second bevel gear 452 is fixed to the shaft 251 to which the input gear 252 is also fixed, so that the input gear 252 rotates together with the second bevel gear 452 in response to rotation of the first bevel gear 451 fixed to the input shaft 220.

Figures 5A, 5B:
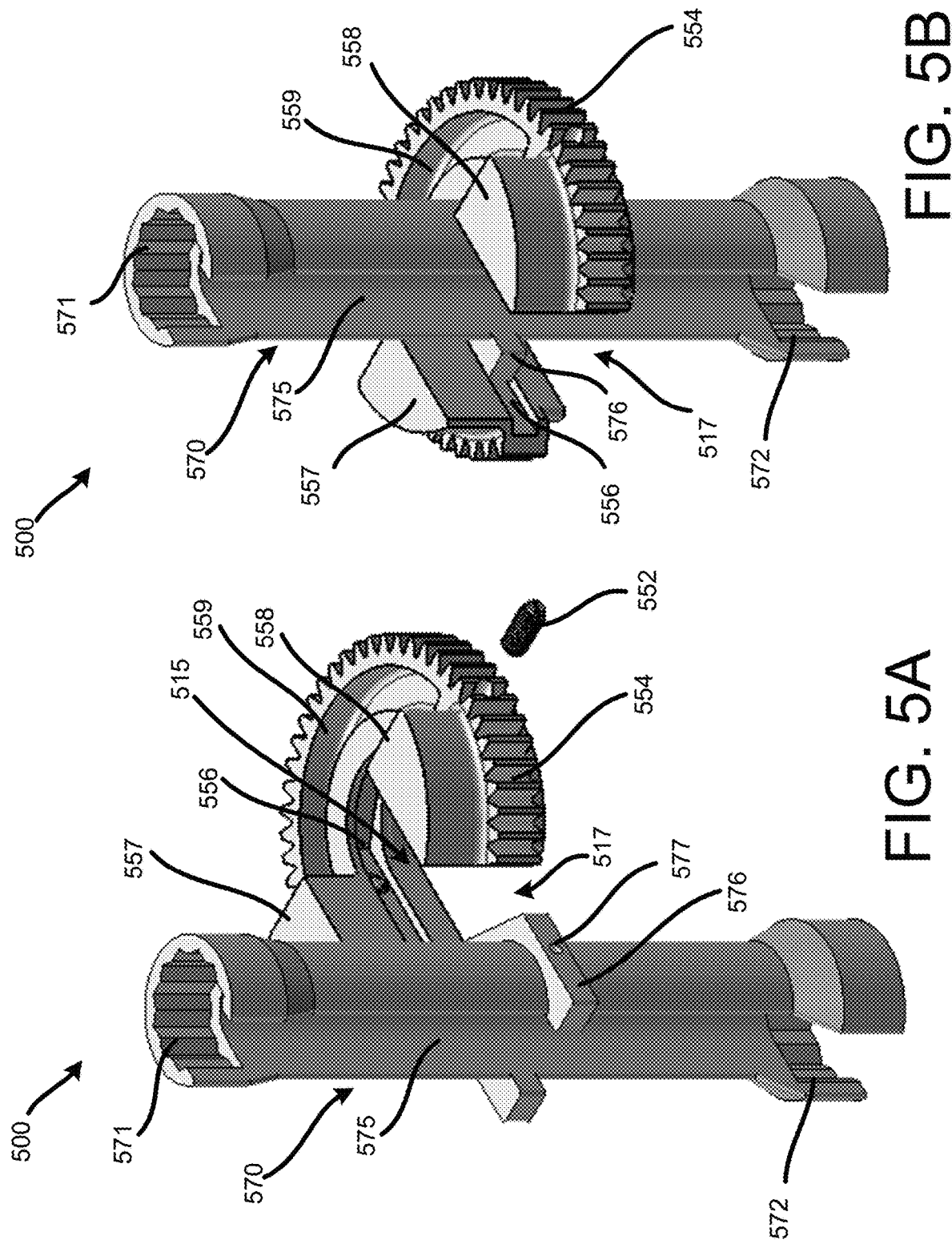
FIGS. 5A and 5B are perspective views of an example nut runner tool for a nut runner accessory, in accordance with implementations described herein.
Figure 5D:
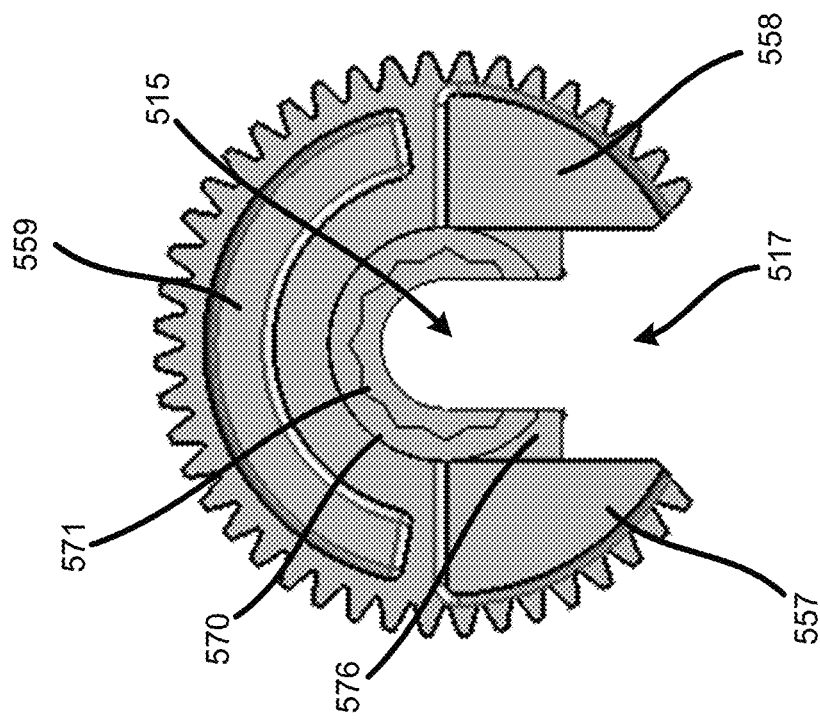
FIG. 5D is a top view of the example nut runner tool shown in FIG. 5B.
Figure 5C:
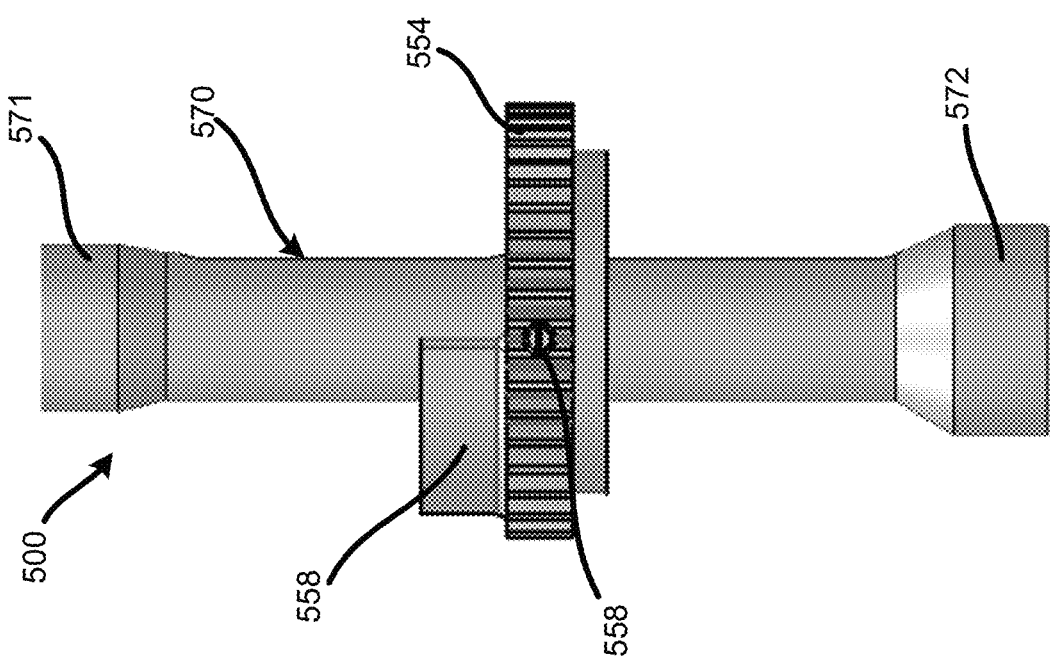
FIG. 5C is a side view.

FIG. 5A is a disassembled perspective view, and FIG. 5B is an assembled perspective view, of an example elongated split tube driver tool of a nut runner accessory, in accordance with implementations described herein. FIG. 5C is a side view, and FIG. 5D is a top view, of the assembled elongated split tube driver tool shown in FIGS. 5A and 5B. The example elongated split tube driver tool 500 shown in FIGS. 5A-5D can be used with the example nut runner accessory 200 described above with respect to FIGS. 2A-2E, and/or with the example nut runner accessory 300 described above with respect to FIGS. 3A-3D, and/or with the example nut runner accessory 400 described above with respect to FIGS. 4A-4E.

As shown in FIGS. 5A-5D, the example elongated split tube driver tool 500 includes an elongated split tube 570 that can be coupled into and removed from an output gear 554. The output gear 554 shown in FIGS. 5A-5D may replace the output gears 254, 354 described above with respect to the nut runner accessories 200, 300, 400, so that the output gear 554 is driven in response to the rotation of the input gear 252 and idler gears 256 as described above.

The elongated split tube 570 includes a first driver head 571 at a first end portion thereof, and a second driver head 572 at a second end portion thereof. The first driver head 571 and the second driver head 572 may be differently configured, including, for example, different cross-sectional diameters, different internal contours and the like, to accommodate the engagement of different sizes and/or types of nuts. In the example shown in FIGS. 5A-5D, the first and second driver heads 571, 572 have a splined, or starred, interior contour to facilitate the engagement of a nut therein, simply for purposes of discussion and illustration. An opening 575, or slit may extend along a longitudinal length of the elongated split tube 570, to allow for placement of the split tube 570 and first and second driver heads 571, 572 relative to a nut to be threaded onto/off of a threaded rod.

In the example shown in FIGS. 5A-5D, a flange 576 extends along an outer circumferential portion of the split tube 570. The split tube 570 may be received in a slot 515 defined by the C-shaped contour of the output gear 554, with the flange 576 received in a corresponding slot 556 formed in the output gear 554, to set a relative position of the elongated split tube 570 and the output gear 554. In particular, an end portion 517 of the slot 515 may allow the split tube 570 to be inserted into the slot 515 for engagement with the split tube driver tool 500. Similarly, the end portion 517 of the slot 515 may allow the threaded rod and nut to be removed from the slot 515 for disengagement from the split tube driver tool 500. In some examples, a shape and/or a contour of the flange 576 may correspond to a shape and/or a contour of the slot 556 in the output gear 554 to facilitate the coupling of the split tube 570 and the output gear 554. In some examples, the shape and/or contour of the flange 576 and the slot 556 may restrict or limit rotation of the split tube 570 received in the slot 515 of the output gear 554. For example, the flange 576 and the slot 556 may have a partial hexagonal shape and/or contour as shown in FIG. 5A. A fastener 552 such as, for example a set screw, may extend through the output gear 554 and into a corresponding recess 577 in the flange 576. Fixation of the split tube 570 relative to the output gear 554 in this manner causes the split tube 570 to rotate together with the output gear 554. The ability to easily remove and replace the split tube 570 allows for split tubes having numerous different sizes and/or configurations of driver heads to be easily attached to/detached from the tool 500, thus enhancing utility and functionality.

As shown in FIGS. 5A-5D, the example split tube driver tool 500 may include one or more counterweighting features to counteract imbalance generated during operation due to an offset between the center of rotation and the center of mass of the split tube driver tool 500, thus improving engagement with the nut to be threaded onto/off of the threaded rod, and enhancing functionality and utility. In the example shown in FIGS. 5A-5D, the example split tube driver tool 500 includes a first counterweight feature 557, in the form of a mass provided at a first end portion of the slot 515 formed in the output gear 554, and a second counterweight feature 558 in the form of a mass at a second end portion of the slot 515 formed in the output gear 554. The example split tube driver tool 500 includes a third counterweight feature 559 in the form of a recess, or a removal of mass, at a periphery of the slot 515 in which the split tube 570 is received. The one or more counterweight features 557, 558, 559 can be formed integrally with the output gear 554. The first, second and third counterweight features 557, 558, 559 shown in FIGS. 5A-5D are provided for purposes of discussion and illustration. The example split tube driver tool 500 can include more, or fewer counterweight features, arranged as shown, or differently. The one or more counterweight features may counteract imbalance generated during operation, to maintain engagement of a nut in one of the driver heads 571, 572.

Figure 6A:
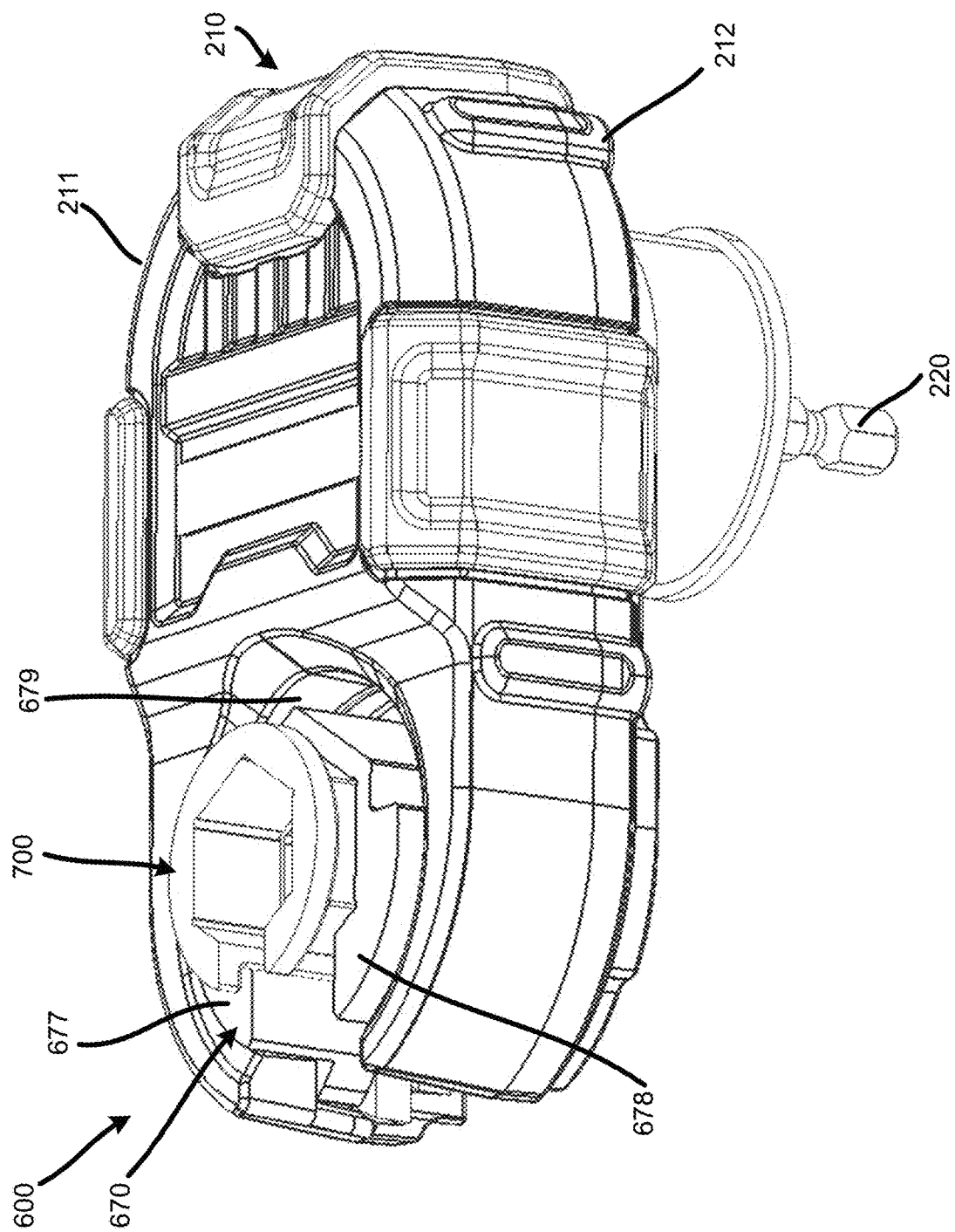
FIGS. 6A and 6B are perspective views of an example nut runner accessory, in accordance with implementations described herein.
Figure 6B:
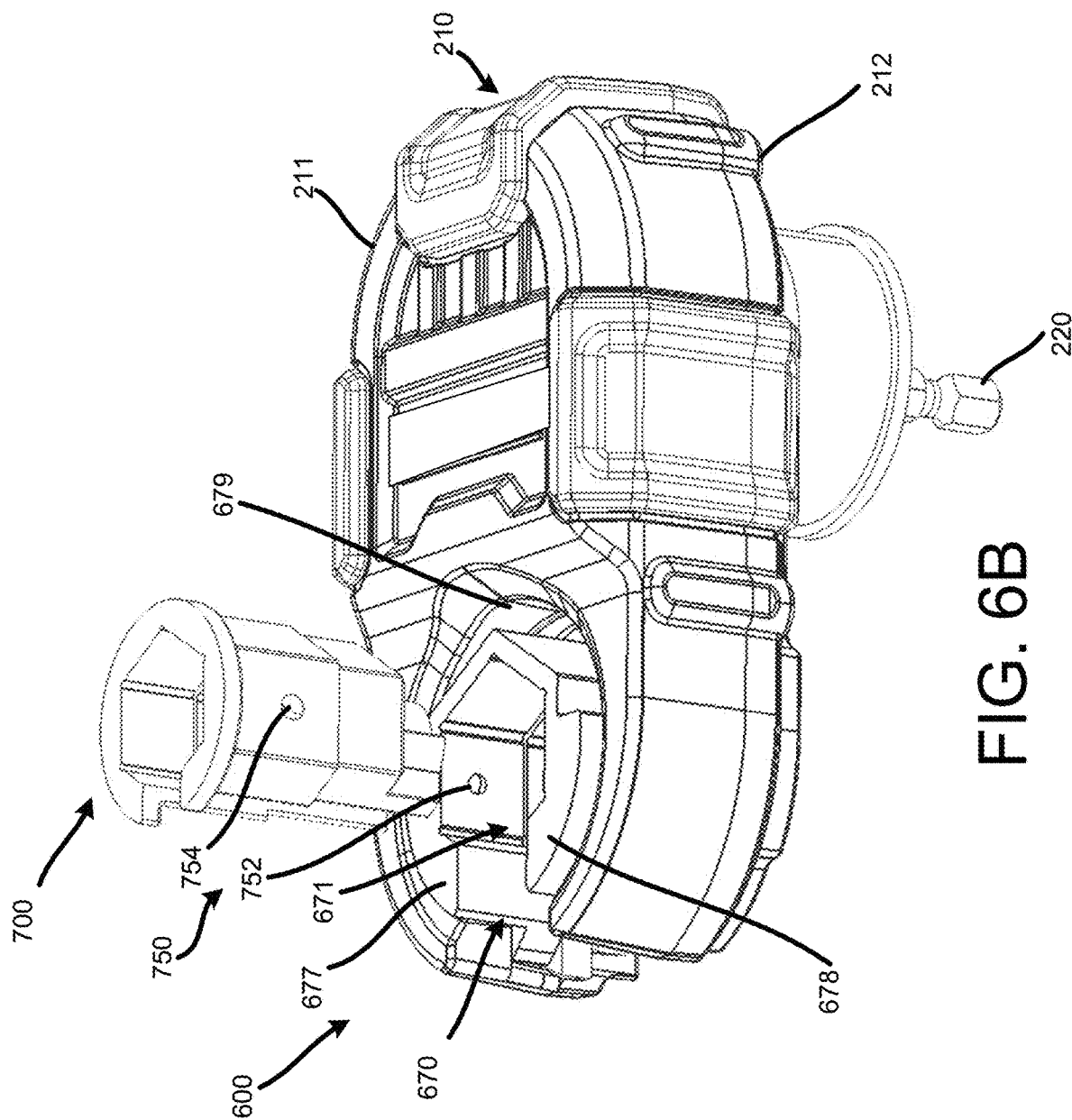
Figure 6C:
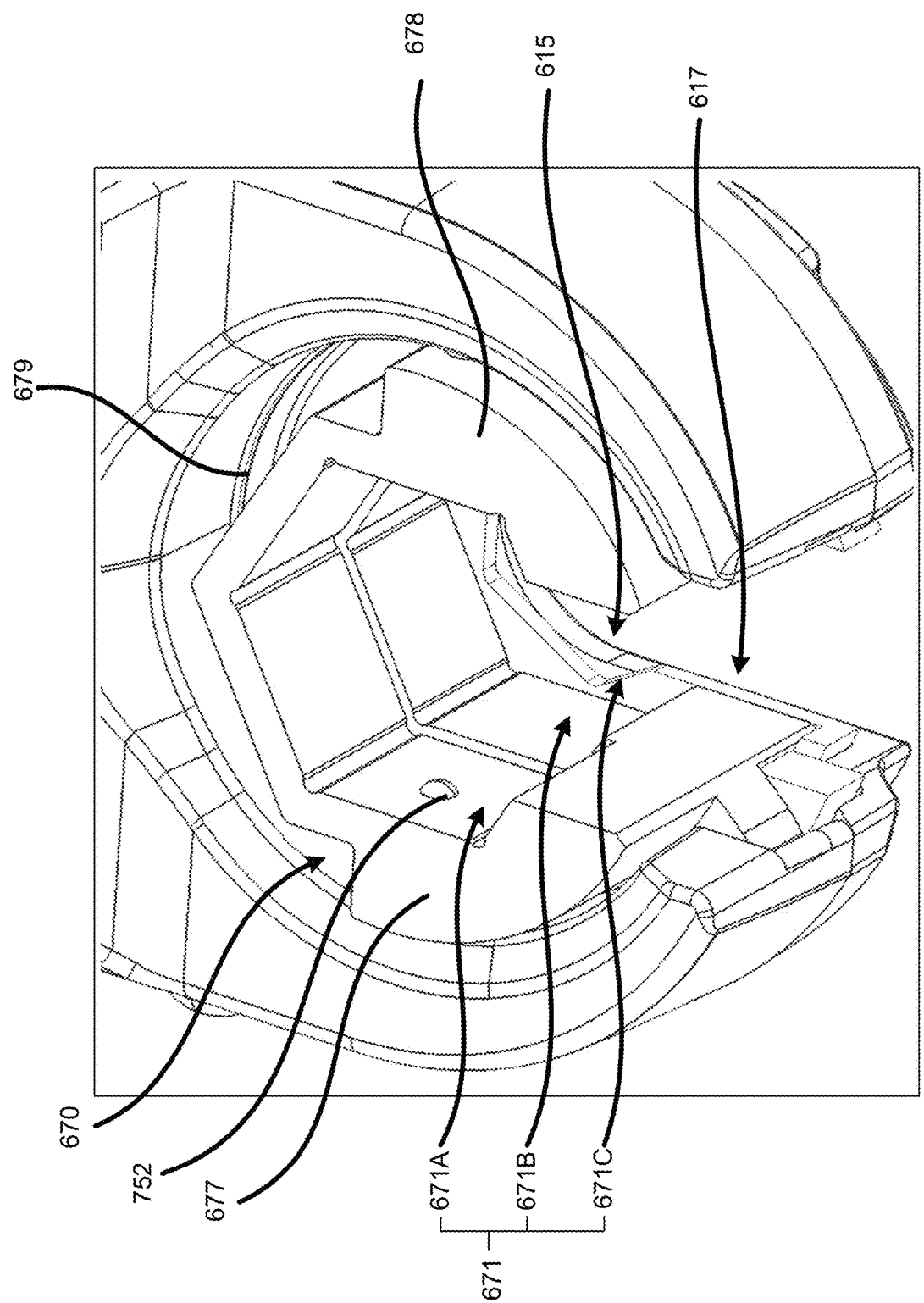
FIGS. 6C and 6D are close in views of a driver head portion of the example nut runner accessory shown in FIGS. 6A and 6B.
Figure 6D:
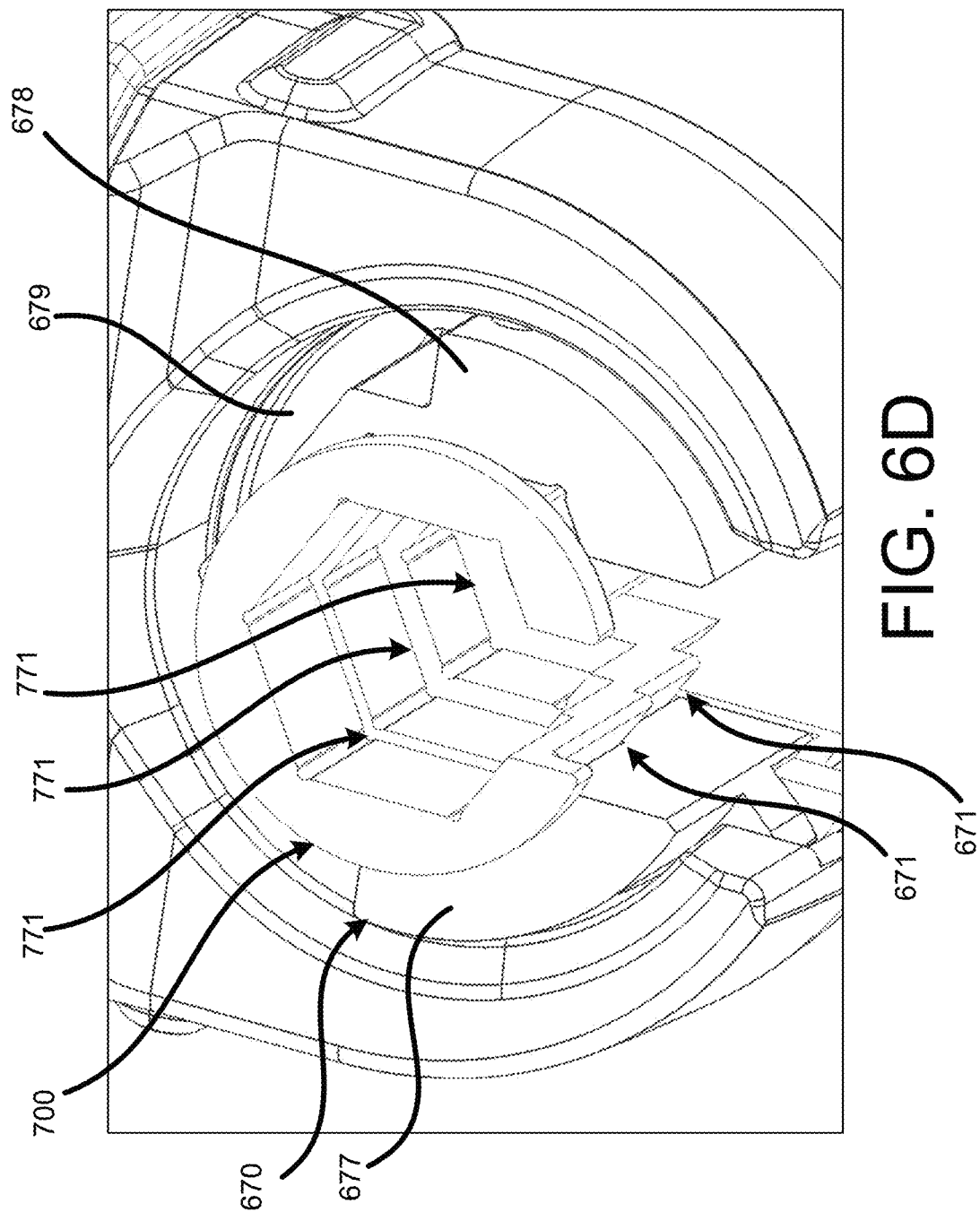
Figure 6E:
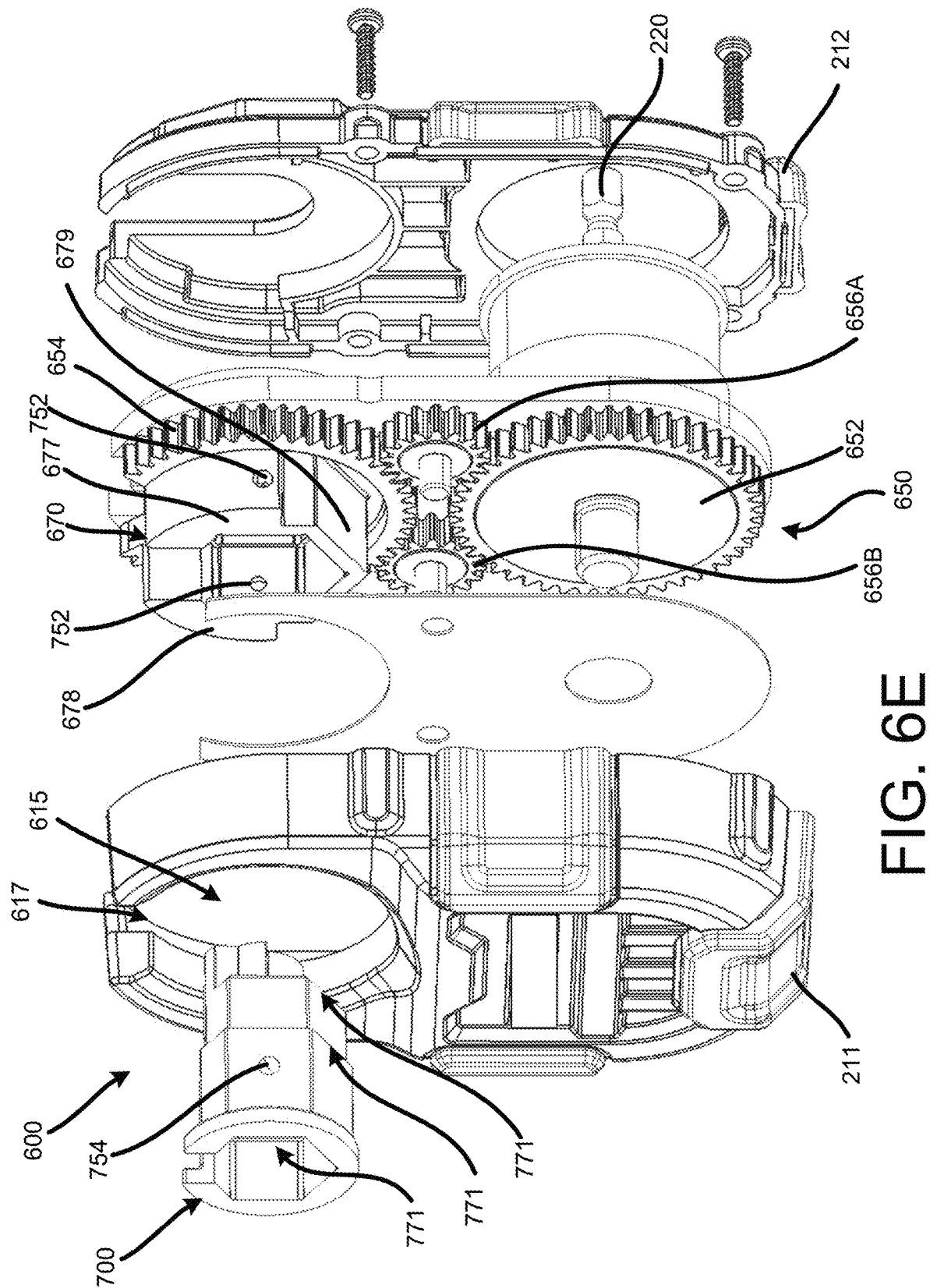
FIG. 6E is an exploded view of the example nut runner accessory shown in FIGS. 6A and 6B.
Figure 7B:
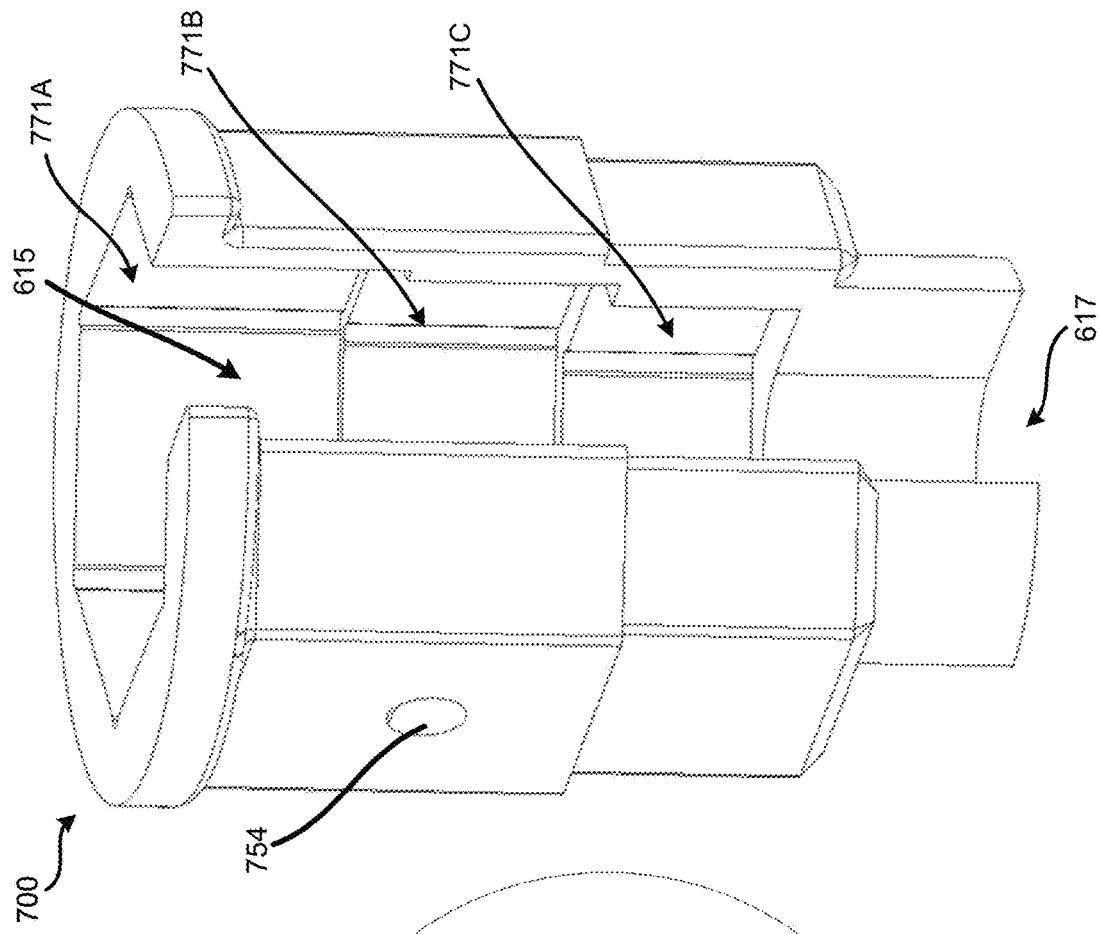
FIGS. 7A-7D illustrate an example insert shown in FIGS. 6A and 6B.
Figure 7A:
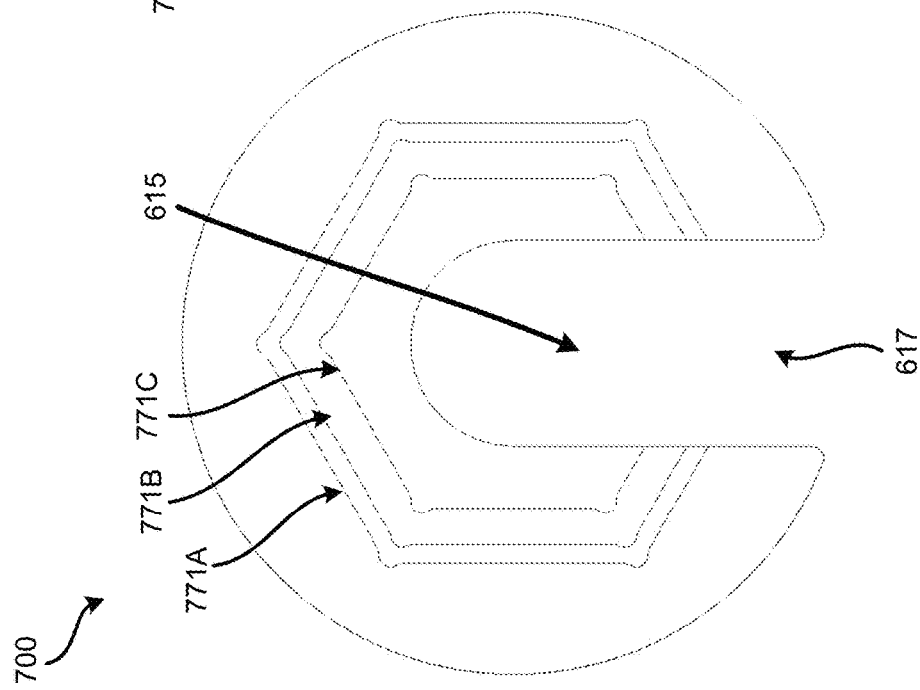
Figure 7D:
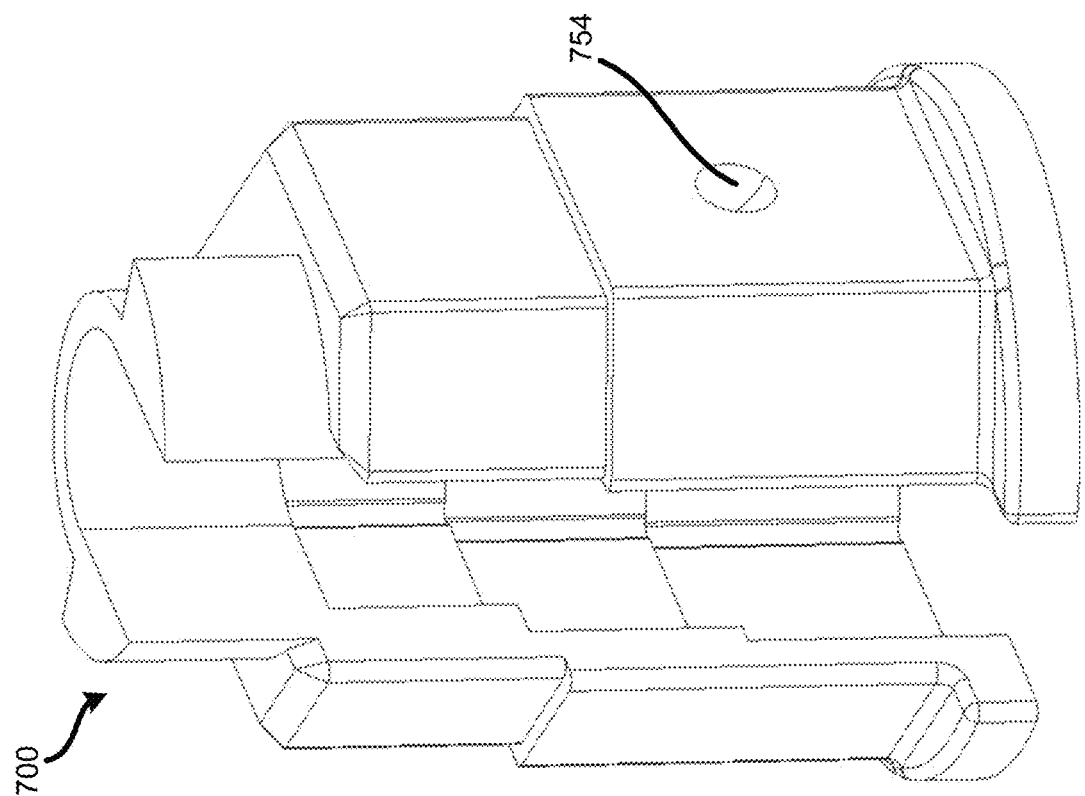
Figure 7C:
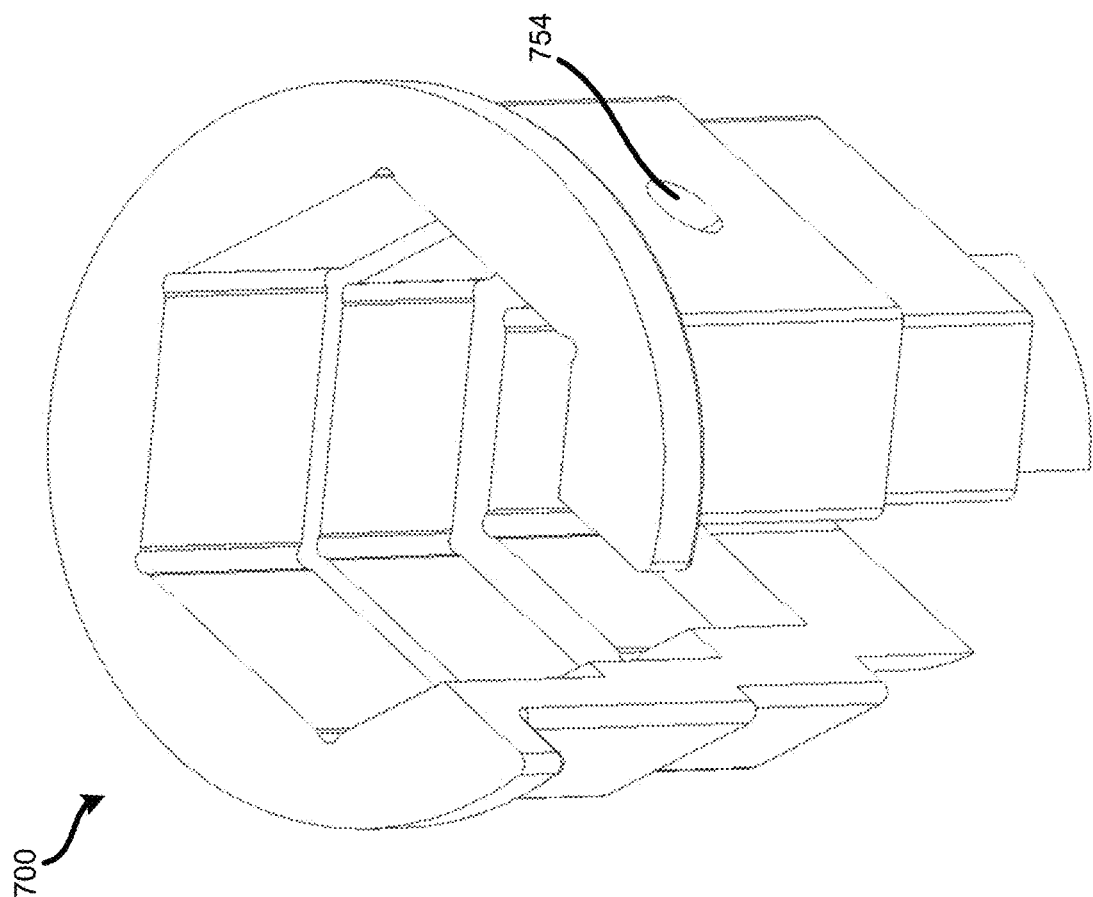

FIG. 6A is a top perspective view of an example nut runner accessory 600. FIG. 6B is a perspective view of the example nut runner accessory 600 shown in FIG. 6A, with an insert portion removed. FIG. 6C is a close in view of a driver head portion of the example nut runner accessory 600, with the insert portion removed. FIG. 6D is a close in view of the driver head portion of the example nut runner accessory 600, with the insert portion inserted. FIG. 6E is an exploded view of the example nut runner accessory 600. FIG. 6F is a plan view of an example gear assembly of the example nut runner accessory 600. FIGS. 7A-7D provide various views of the example insert portion. In particular, FIG. 7A is a top view, FIG. 7B is a front perspective view, FIG. 7C is a top perspective view, and FIG. 7D is a bottom perspective view of the example insert 700.

The example nut runner accessory 600 includes a housing 210 similar to the housing 210 as described above, including the first housing portion 211 and the second housing portion 212, with an input shaft 220 configured to be coupled to the output assembly of the power-driven tool 100/100', as described above with respect to the example nut runner accessory 200 shown in FIGS. 2A-2E and/or the nut runner accessory 300 shown in FIGS. 3A-3E. The example nut runner accessory 600 includes a driver head 670 including a plurality of stepped pockets 671. In the example shown in FIG. 6C, the driver head 670 includes a first stepped pocket 671A, a second stepped pocket 671B, and a third stepped pocket 671C, simply for purposes of discussion and illustration. The plurality of stepped pockets 671 may be formed similarly to the plurality of stepped pockets 271 formed in the driver head 270 of the example nut runner accessory 200 and/or the plurality of stepped pockets 371 formed in the driver head 370 of the example nut runner accessory 300. The example driver head 670 shown in FIGS. 6A-6F is a counterweighted driver head 670 including one or more counterweight features 677, 678, 679, similar to the counterweighted driver head 370 and including one or more counterweight features 377, 378, 379 similar to those shown in FIGS. 3A-3E. The principles to be described herein can be applied to a driver head with or without counterweight features. In the example shown in FIGS. 6A-6F, the counterweighted driver head 670 includes a first counterweight feature 677, in the form of a mass provided at a first end portion of the plurality of stepped pockets 671 formed in the driver head 670, and a second counterweight feature 678 in the form of a mass at a second end portion of the plurality of stepped pockets 671. The example driver head 670 includes a third counterweight feature 679 in the form of a recess, or a removal of mass, at a periphery of the plurality of stepped pockets 671. As with the counterweighted driver head 370 described above, the one or more counterweight features 677, 678, 679 of the counterweighted driver head 670 counteract imbalance generated during operation, to maintain engagement of a nut in one of the plurality of stepped pockets 671.

The example nut runner accessory 600 may include an insert 700 that is removably couplable to the driver head 670. In particular, the insert 700 may be removably couplable in the stepped pockets 671 formed in the driver head 670. The insert 700 may include a plurality of stepped pockets 771 configured to engage nuts of respective size/cross-sectional diameter. In the example shown in FIGS. 7A-7D, the insert 700 includes a first stepped pocket 771A, a second stepped pocket 771B, and a third stepped pocket 771C, simply for purposes of discussion and illustration. Cross-sectional dimensions of the stepped pockets 771 formed in the insert 700 may be less than the cross-sectional dimensions of the stepped pockets 671 of the driver head 670, such that the insertion of the insert 700 into the driver head 670 provides for engagement with nuts having different (for example, smaller) cross-sectional dimensions that that provided for by the stepped pockets 671 of the driver head 670. Thus, the ability to removably couple the insert 700 in the driver head 670 may further enhance the utility and functionality of the nut runner accessory 600 and/or the power-driven tool 100/100' to which it is coupled. Close in views of the uninstalled and installed states of the insert 700 are provided in FIGS. 6C and 6D, respectively.

In this example arrangement, the driver head 670 includes two stepped pockets 671, and the insert 700 includes three stepped pockets 771, simply for purposes of discussion and illustration. The driver head 670 can include more, or fewer stepped pockets 671. In another example, the driver head 670 may have only a single step or no steps at all. Similarly, the insert 700 can include more, or fewer stepped pockets 771. Additionally, the installation of one example insert 700 is illustrated, simply for purposes of discussion and illustration. In some examples, additional inserts 700 may be inserted, for example, into a previous insert 700 to provide for engagement with nuts having progressively smaller cross-sectional diameters.

In some examples, the counterweighted driver head 670 may be formed integrally with an output gear 654 of a gear assembly 650 of the nut runner accessory 600. In other examples, the counterweighted driver head 670 may be removably coupled to the output gear 654 of the gear assembly 650. The gear assembly 650 may include an input gear 652 that is coupled to and driven by the input shaft 220. The input gear 652 is coupled to the output gear 654 by a pair of idler gears 656 (i.e., a first idler gear 656A and a second idler gear 656B). The example output gear 654 has a C-shaped configuration, corresponding to the C-shaped contour of the housing 210, and the C-shaped contour of the driver head 670 and the insert 700. The C-shaped configuration of the output gear 654, combined with the corresponding portion of the housing 210, and the driver head 670, together form a U-shaped slot 615 defining an engagement portion of the nut runner accessory 300. The U-shaped slot allows for positioning of the nut runner accessory 600 relative to the outer circumferential surface of the threaded rod, for the threading of a nut on the threaded rod. In particular, an end portion 617 of the U-shaped slot 615 may allow the threaded rod and nut to be inserted into the U-shaped slot 615 for engagement with the nut runner accessory 600. Similarly, the end portion 617 of the U-shaped slot 615 may allow the threaded rod and nut to be removed from the U-shaped slot 615 for disengagement from the nut runner accessory 600. The transmission of force, from the input shaft 220, to the input gear 652, and to the output gear 654 via the idler gears 256, for the driving of the driver head 670 is substantially the same as previously described, and thus duplicative detailed description will be omitted.

In the example arrangement of gears 652, 654, 656 of the example gear assembly 650 shown in FIGS. 6A-6F, a diameter of or number of teeth on each of the idler gears 656 is less than a diameter of or number on the input gear 652, and less than a diameter of the output gear 654. In this example arrangement, the diameter of or number of teeth on the output gear 654 is substantially the same as the diameter of or number of teeth on the input gear 652, resulting in a substantially 1:1 gear ratio. Thus, the arrangement shown in FIGS. 6A-6F presents an example in which a rotational speed of the output gear 254 is substantially the same as the rotational speed of the input gear 252. The input gear 652, the output gear 654, and the idler gears 656 may have other relative sizes and/or combinations of sizes. In this example arrangement, the example gear assembly 650 includes two idler gears 656, i.e., a first idler gear 656A and a second idler gear 656B in meshed engagement between the input gear 652 and the output gear 654, so that at least one of the two idler gears 656 remains in meshed engagement with the output gear 654 rotates.

As described above, the multiple stepped pockets 671 allow the example counterweighted driver head 670 to engage multiple different sizes/configurations of nuts. In particular, the example counterweighted driver head 670 shown in FIGS. 6A-6F is a multi-size hexagonal driver head including multiple stepped pockets 671, each configured to engage a different size of hexagonal nut. In this example arrangement, the four side walls of each stepped pocket 671 define four full sides and two partial sides of a hexagonal shape having a cross-sectional width corresponding to a nut to be engaged by the corresponding stepped pocket 671. The base wall of each stepped pocket 671 defines an area on which a corresponding surface of the nut is to be seated. In other implementations, each stepped pocket 671 may include fewer or more full or partial sides of a hexagonal shape or another shape, such as square, rectangular, pentagonal, or other circular, non-circular, or polygonal shapes. The stepped nature of the plurality of stepped pockets 671 having different cross-sectional widths allows the counterweighted driver head 670 to selectively receive and engage nuts having different sizes/cross-sectional widths for threading onto/off of a threaded rod by the nut runner accessory 600. Installation of the insert 700 into the portion of the driver head 670 defining the stepped pockets 671 may expand the capability of the nut runner accessory 600, providing for engagement workpieces having greater variation in size/dimension. The example driver head 670 shown in FIGS. 6A-6F is a hexagonal driver head 670 including stepped pockets 671 configured to engage a corresponding different sized nuts, simply for purposes of discussion and illustration. In some implementations, the driver head 670 may include more, or fewer, stepped pockets 671, having the same or different configurations other than the four side walled configuration shown, including more, or fewer walls, splined surfaces, a starred contour, and the like.

In some examples, a retention device 750 may provide for retention of the insert 700 in the installed state within the stepped portion of the driver head 670. In particular, the retention device 750 may provide for axial retention of the insert 700 installed within the stepped portion of the driver head 670. In some examples, the retention device 750 may include a first retention portion 752 provided on the driver head 670, and a second retention portion 754 provided on the insert 700. In some examples, the first retention portion 752 may include, for example, a spring loaded ball positioned in the wall portion of one of the stepped pockets of the driver head 670. The ball may be radially biased, for example, radially inward toward a central portion of the stepped portion of the driver head 670. The second retention portion 754 may be formed in an outer wall portion of the insert 700. For example, the second retention portion 754 may be a recess, or depression, or divot, formed in a portion of the outer wall of the insert. A shape of the second retention portion 754 may correspond to a shape of the first retention portion 752, i.e., to a shape of the ball of the first retention portion 752. The second retention portion 754 may be formed in a portion of the outer wall of the insert corresponding to a position of the first retention portion 752 when the insert 700 is installed and properly seated in the stepped portion of the driver head 670. Insertion of the insert 700 into the stepped portion of the driver head 670 may exert a force on the first retention portion 752, i.e., outward radial movement of the ball and compression of the spring of the first retention portion 752 as the outer wall of the insert 700 moves along the corresponding inner wall portion of the stepped portion of the driver head 670. As the second retention portion 754 moves into place with respect to the first retention portion, the ball of the first retention portion 752 is forced into the recess of the second retention portion 754 due to the biasing action of the spring of the first retention portion 752, to engage the first and second retention portion s 752, 754 of the retention device 750. In this manner, the retention device 750 may retain an axial position of the insert 700 in the driver head 670 until the insert 700 is removed by the user.

The retention is described with respect to one first retention portion 752 and a corresponding second retention portion 754, simply for purposes of discussion and illustration. Multiple retention devices 750 each including a first retention portion 752 and a second retention portion 754 can be incorporated into the coupling of the insert 700 and the driver head 670. Similarly, the first retention portion 752 as described may instead be incorporated into the outer wall portion of the insert 700, and the second retention portion 754 as described can instead be incorporated into the inner wall portion of the stepped portion of the driver head 670.

In the example nut runner accessory tools described above, the components defining the U-shaped slots are illustrated in the corresponding figures such that the end portion each of the U-shaped slots is open, to facilitate insertion of the threaded rod and nut into the U-shaped slot for engagement with the nut runner accessory tool, and to facilitate removal of the threaded rod and nut from the U-shaped slot for disengagement from the nut runner accessory tool.

During operation of the nut runner accessory tools described above, some of the components, for example, the output gear, the driver head coupled therein, and the like, rotate relative to the housing of the accessory tool. In some situations, upon completion of operation of the accessory tool, the rotating components of the accessory tool may have rotated to a position in which the open portions of the rotating components are not aligned with the open end portion of the housing of the accessory tool, relying on the user to align these rotating components with an open end portion of the housing, so that the engagement portion of the accessory tool is open and available for insertion and removal of the threaded rod and nut. For example, in the example nut runner accessory 600 described above with respect to FIGS. 6A-6E, rotating components including the output gear 654 and the driver head 670 (and the insert 700, if coupled thereto), together with the corresponding (stationary) portion of the housing 210, define the engagement portion including the U-shaped slot 615 into which the threaded rod and nut are removably received. As the output gear 654 is driven (via the input gear 652 and the idler gears 656A, 656B driven by the power-driven tool 100/100' via the shaft 220), the output gear 654 and the driver head 670 (and the insert 700, if coupled thereto) rotate. Depending on a point at which the trigger 120/120' of the power-driven tool 100/100' is released and operation of the nut runner accessory 600 is terminated, a rotational position of the rotating components may be such that a closed portion of the output gear 654 and the driver head 670 (and insert 700, if coupled thereto) extends across the end portion 617 of the U-shaped slot 615. Although the corresponding (stationary) portion of the housing 210 at the end portion 617 of the U-shaped slot 615 may remain open, the closed portion(s) of the output gear 654 and the driver head 670 (and insert 700, if coupled thereto) at the end portion 617 will preclude insertion of the threaded rod and nut into the U-shaped slot 615, and will preclude removal of the threaded rod and nut from the U-shaped slot 615. In some instances, a user may operate the power-driven tool 100/100', feathering the trigger 120/120' in an effort to align the open portions of the output gear 654 and the driver head 670 (and the insert 700, if coupled thereto), with the open end portion of the housing 210 at the end portion 617 of the U-shaped slot 615. However, this may be ineffective, given the relatively high rotational speeds of the output gear 654. This situation may be similarly encountered during use of the nut runner accessories 200, 300, 400, 500 described above with respect to FIGS. 2A-5D.

In some implementations, one or more of the nut runner accessory tools described above may include an alignment device, or a homing feature. In some examples, the alignment device, or homing feature, is operable to return the nut runner accessory tool to an initial operating configuration, or a home configuration. In some examples, the alignment device, or homing feature, may allow the user to return the components of the nut runner accessory tool to an aligned position, such that the end portion of the U-shaped slot of the nut runner accessory tool is open, for insertion of the threaded nut and rod into the U-shaped slot defining engagement portion of the accessory tool, and removal of the threaded rod and nut from the U-shaped slot defining the engagement portion of the accessory tool. Alignment of the rotating components with the open end portion of the housing allows for engagement/disengagement of the nut runner accessory tool and the threaded rod/nut. In some examples, the alignment device is driven by the power-driven tool to which the nut runner accessory tool is coupled, under operation of the user. In some examples, the alignment device is manually operable by the user.

Figure 8A:
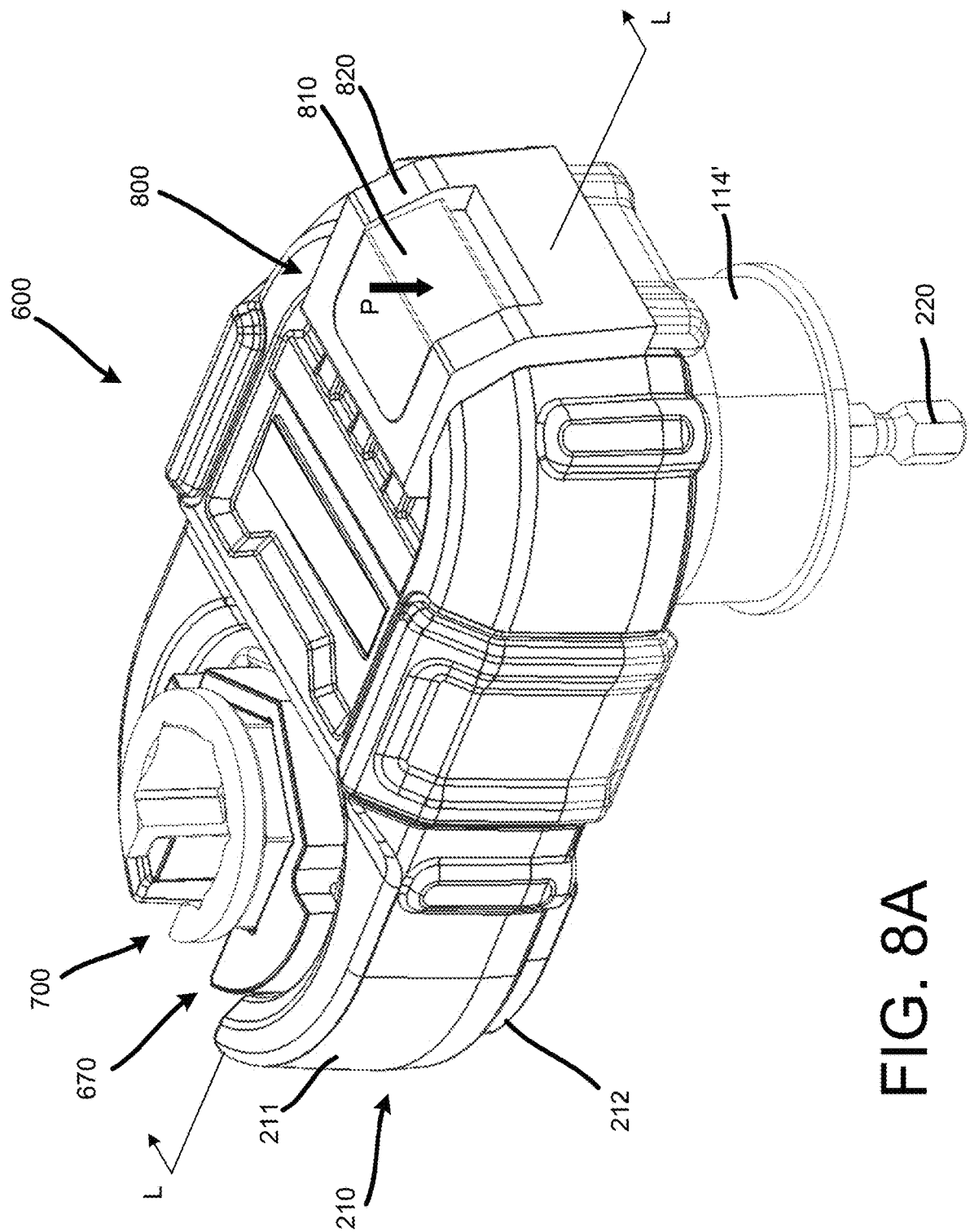
FIG. 8A is a top perspective view of an example alignment device, in accordance with implementations described herein.
Figure 8B:
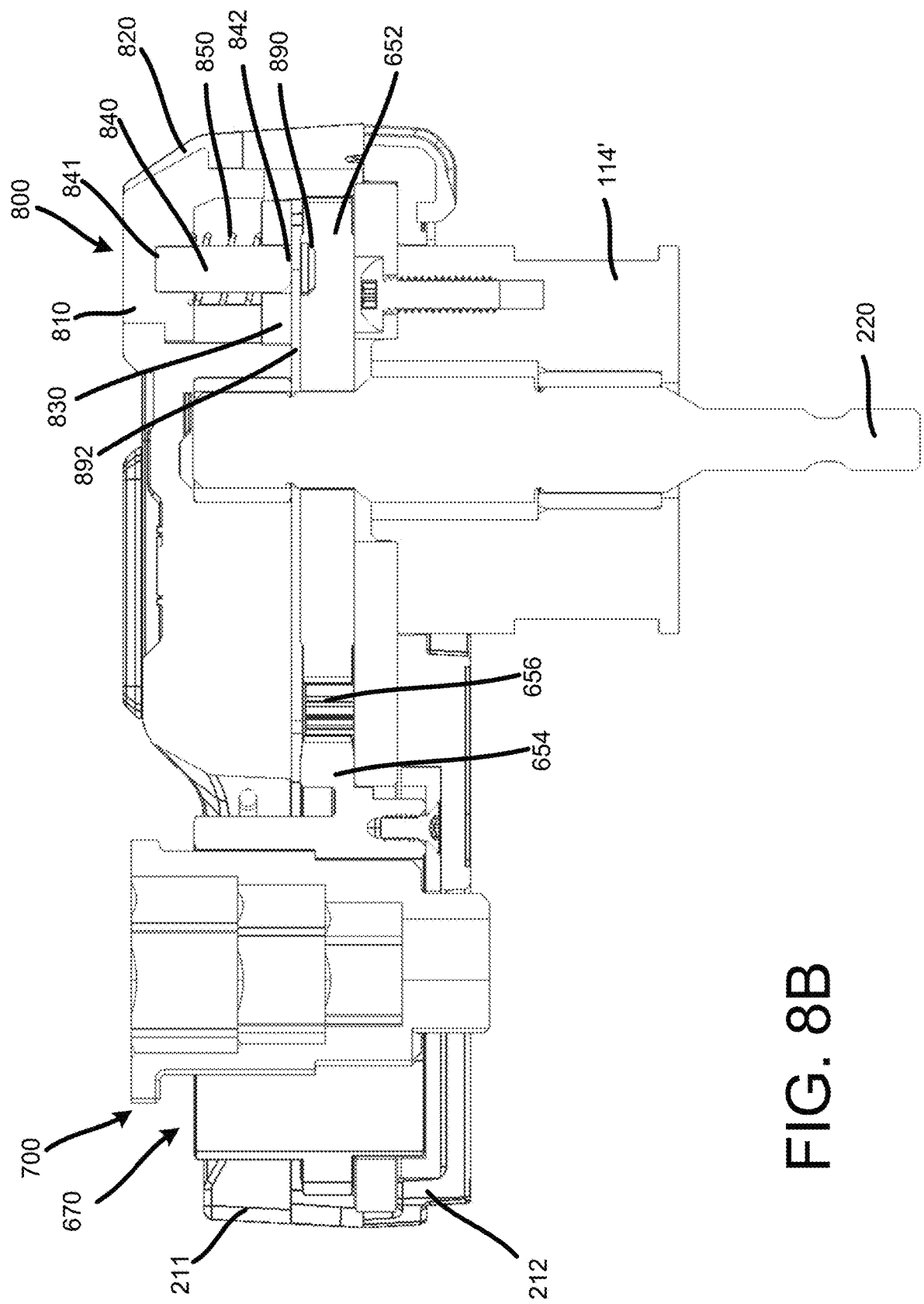
FIG. 8B is a cross-sectional view, taken along line L-L of FIG. 8A, illustrating the example alignment device in a disengaged state.
Figure 8C:
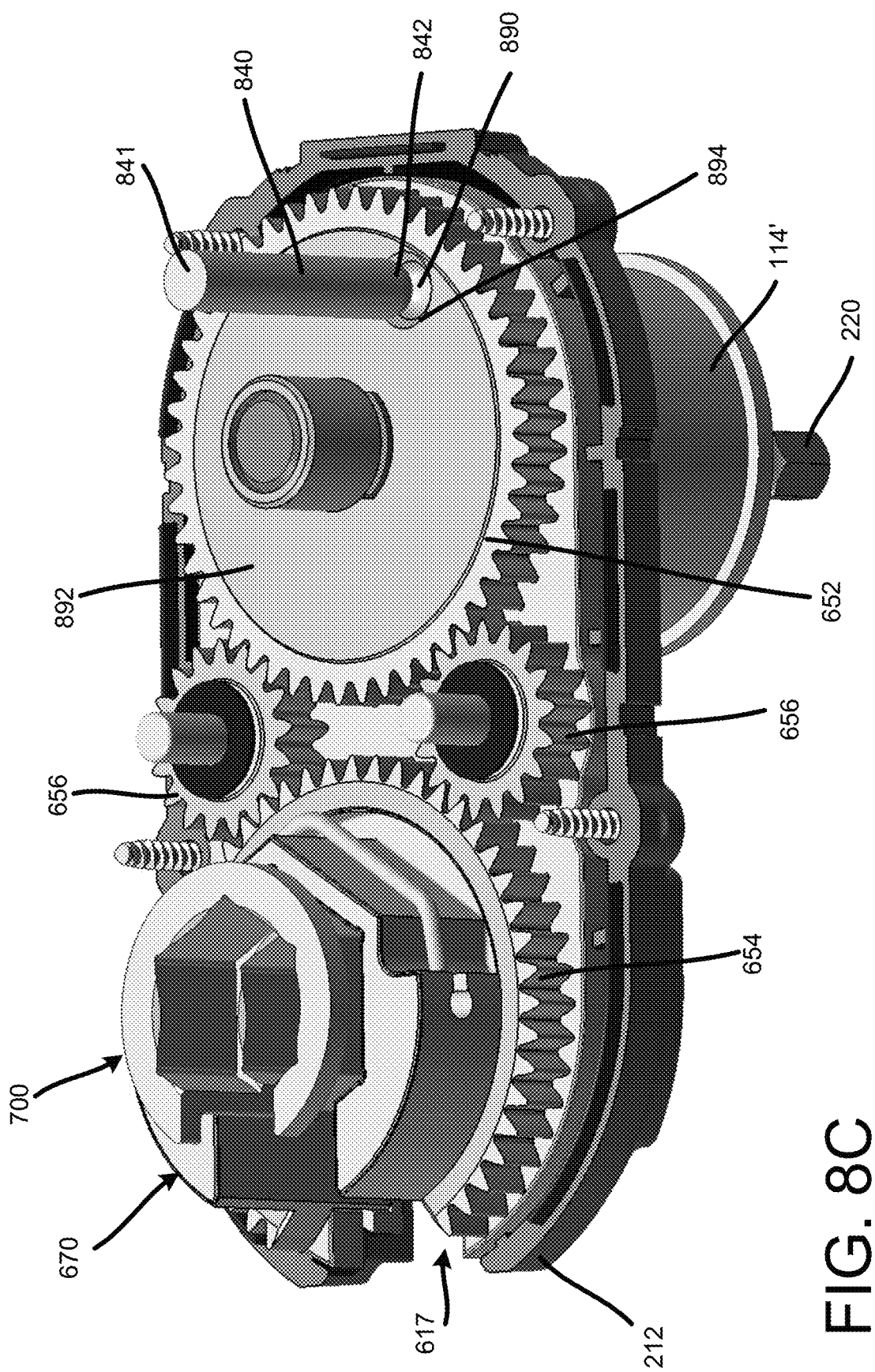
FIG. 8C is a top isometric view, illustrating the example nut runner accessory with the example alignment device in the disengaged state.
Figure 8D:
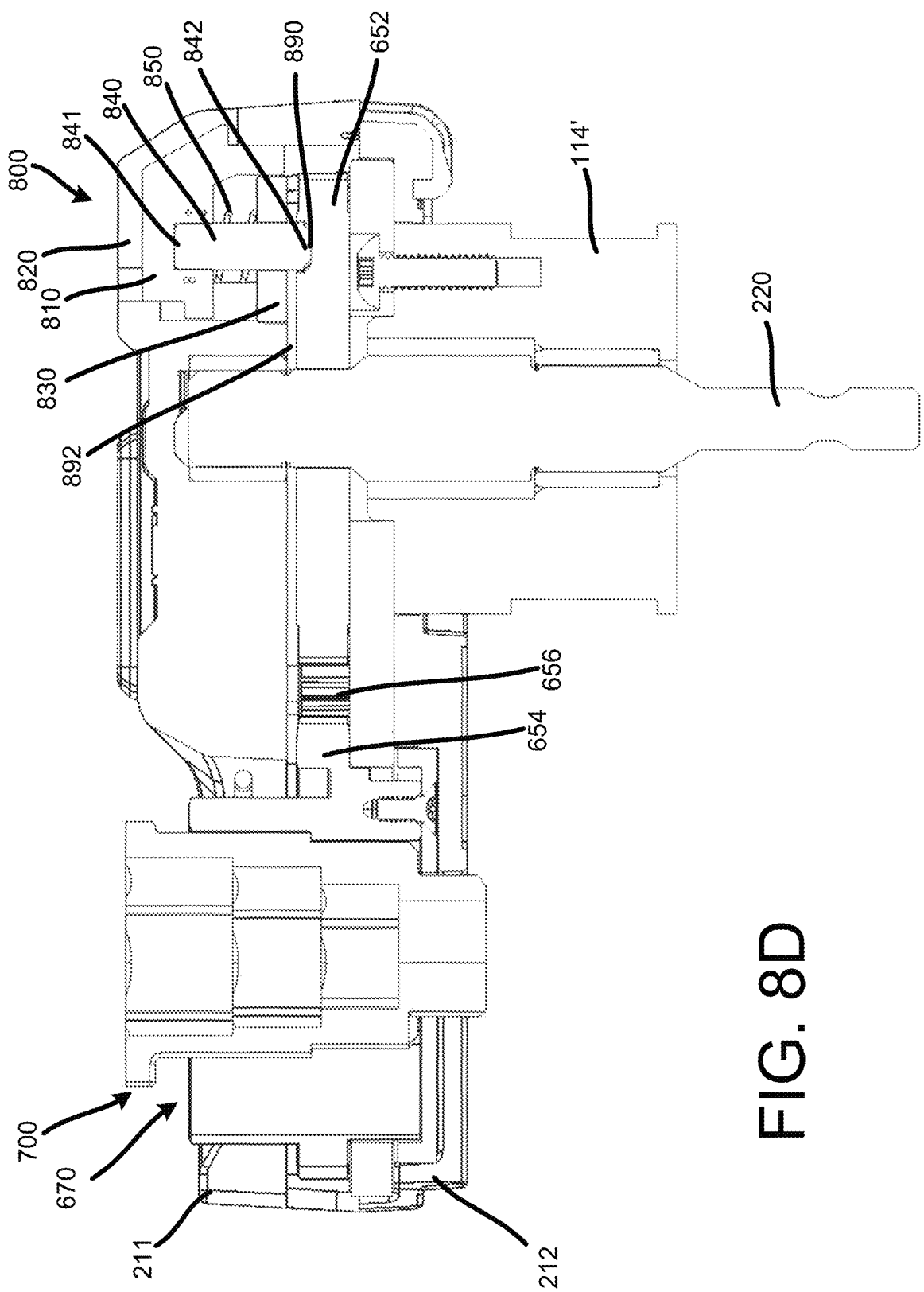
FIG. 8D is a cross-sectional view, taken along line L-L of FIG. 8A, illustrating the example alignment device in an engaged state.
Figure 8E:
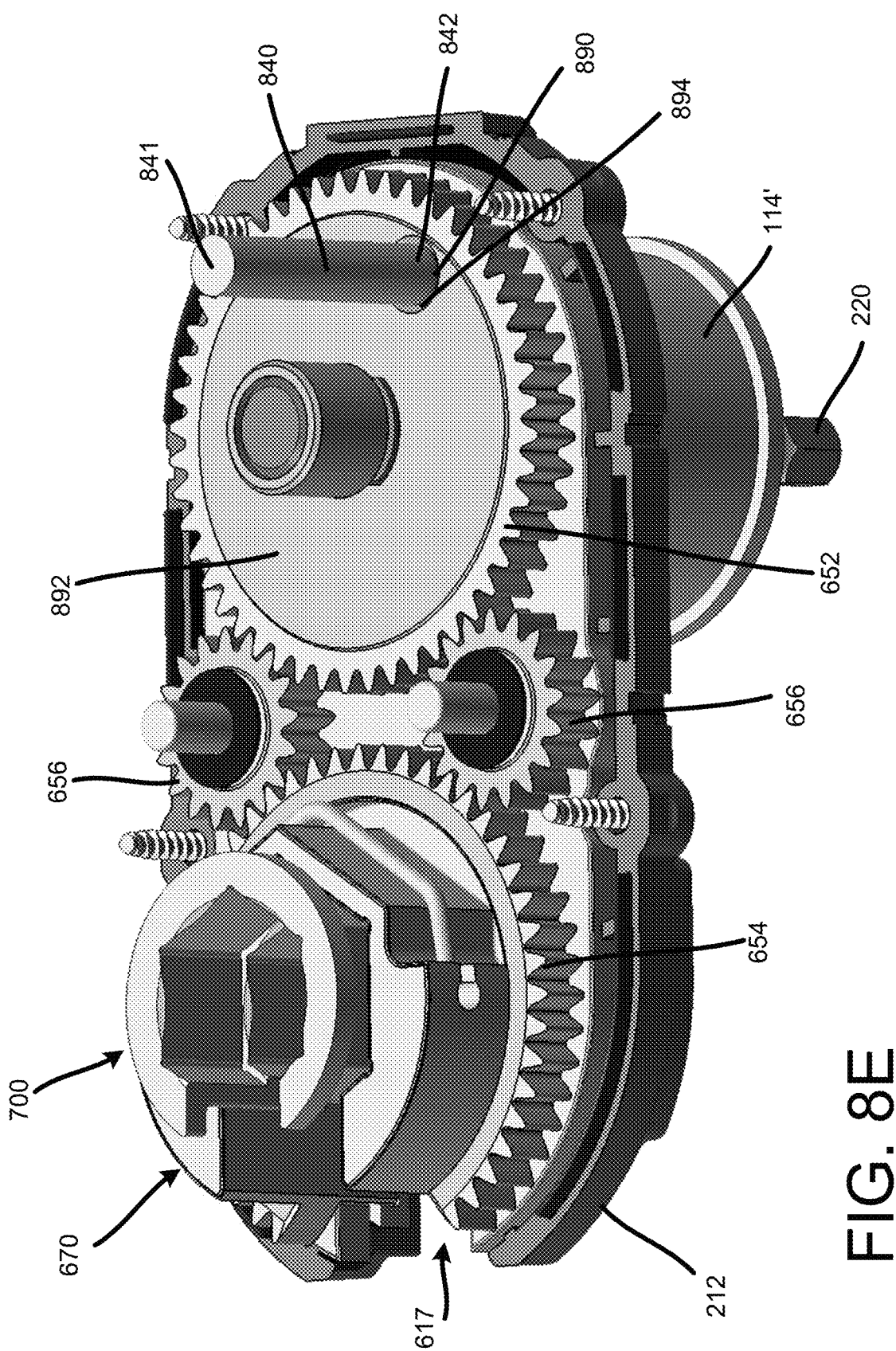
FIG. 8E is a top isometric view, illustrating the example nut runner accessory with the example alignment device in the engaged state.
Figure 8F:
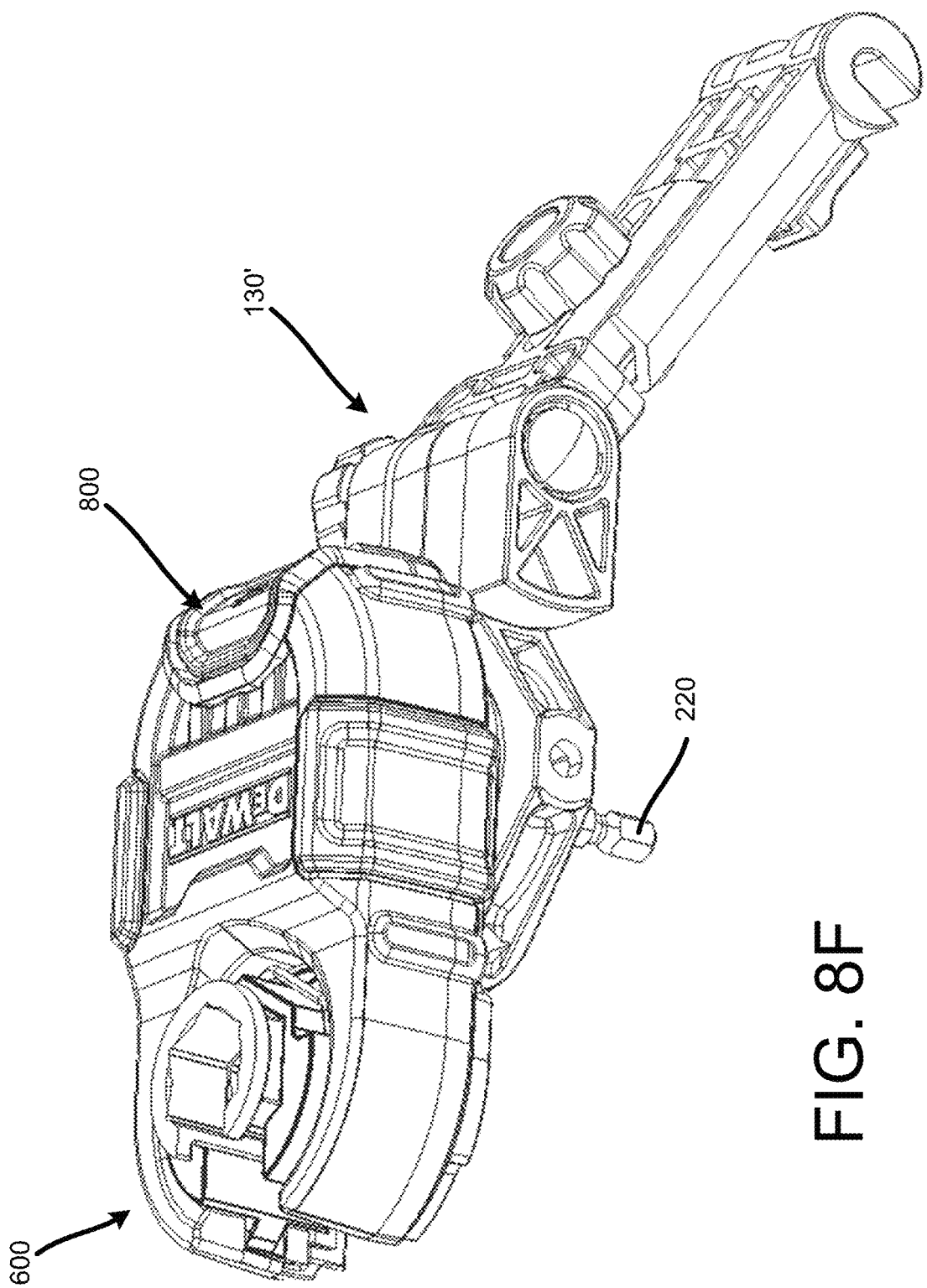
FIG. 8F illustrates the example nut runner accessory including the example alignment device shown in FIG. 8A, coupled to an example brace assembly.

FIGS. 8A-8F illustrate an example alignment device 800, in accordance with implementations described herein. In FIGS. 8A-8F the example alignment device 800 is incorporated into the example nut runner accessory 600 described above with respect to FIGS. 6A-6D, simply for purposes of discussion and illustration. The example alignment device 800 can be incorporated into any one of the example nut runner accessories 200, 300, 400, 500 described above with respect to FIGS. 2A-5D, and/or another accessory tool not explicitly shown/described herein. In particular, FIG. 8A is a top perspective view of the example alignment device 800 incorporated into the example nut runner accessory 600. FIG. 8B is a cross-sectional view, taken along line L-L of FIG. 8A, illustrating the example alignment device 800 in a disengaged state. FIG. 8C is a top isometric view of the example nut runner accessory 600 with the first housing portion 211 removed, and portions of the alignment device 800 removed, illustrating the disengaged state of the example alignment device 800. FIG. 8D is a cross-sectional view, taken along line L-L of FIG. 8A, illustrating the example alignment device 800 in an engaged state. FIG. 8E is a top isometric view of the example nut runner accessory 600 with the first housing portion 211 removed, and portions of the alignment device 800 removed, illustrating the engaged state of the example alignment device 800. FIG. 8F illustrates the example nut runner accessory 600 including the example alignment device 800, coupled to the example brace assembly 130' via the example coupling portion 114', simply for purposes of discussion and illustration. The principles described herein can be similarly applied to an accessory tool not necessarily coupled to the example brace assembly 130'.

In the example arrangement shown in FIGS. 8A-8F, the example alignment device 800 includes a button assembly that provides for the return of the rotating components of the example nut runner accessory 600 to the initial operating configuration, or the home configuration. In the initial operating condition, or home configuration, the rotating components of the example nut runner accessory 600 may be aligned such that open end portions thereof are aligned at corresponding positions. In the initial operating configuration, or home configuration, the end portion 617 of the U-shaped slot 615 is open, allowing the engagement portion of the example nut runner accessory 600 to be engaged with and/or disengaged from a nut on a threaded rod. In some examples, actuation, for example, depression, of a button 810 of the example alignment device 800, for example, during operation of the power-driven tool driving the example nut runner accessory 600, actuates a stopping mechanism that restricts rotation, for example, further rotation, of the rotating components of the example nut runner accessory 600, at the aligned position, corresponding to the initial operating configuration, or home configuration, of the example nut runner accessory 600. In some examples, the stopping mechanism is implemented through engagement of the alignment device 800 with one of the rotating components of the example nut runner accessory 600. Hereinafter, engagement of a component of the alignment device 800 with the input gear 652 of the example nut runner accessory 600 will be used to illustrate engagement of the alignment device with one of the rotating components of the example nut runner accessory 600, simply for purposes of discussion and illustration. The principles described herein can be applied to engagement of the alignment device 800 with another of the rotating components of the example nut runner accessory 600. As shown in FIGS. 8A-8F, in some examples, the alignment device 800 includes a button 810 that is accessible to the user, and manipulatable by the user, from an exterior of the housing 210 of the example nut runner accessory 600. In the example shown in FIGS. 8A-8F, the button 810 is mounted in a button support frame 820 coupled in the first housing portion 211 of the housing 210, simply for purposes of discussion and illustration. The button 810 is movably mounted relative to the support frame 820, which remains fixed to the housing 210 as the button 810 is depressed. An engagement pin 840 has a first end portion 841 that is fixed to the button 810, at an interior facing side of the button 810, and a second end portion 842 that extends down, through an opening in a shoulder portion 830 of the support frame 820. In some examples, the shoulder portion 830 is fixedly coupled to a corresponding portion of the housing 210. In this example arrangement, the second end portion 842 of the pin 840 is configured to selectively engage a recess 890 formed in the input gear 652 of the gear assembly 650, so as to selectively restrict rotation of the input gear 652 based on a position of the pin 840.

A biasing member 850, in the form of a coil spring in this example arrangement, is positioned around an intermediate portion of the pin 840. The biasing member 850 has a first end portion abutting the interior facing surface of the button 810, and a second end portion abutting the shoulder portion 830. In this example arrangement, the biasing member 850 biases the button 810 in an upward direction (in the example orientation shown in FIGS. 8A-8F), corresponding to the disengaged state of the alignment device 800 shown in FIGS. 8B and 8C. In FIG. 8C, the button 810, the button support frame 820/shoulder portion 830, and the biasing member 850 are removed, so that the position of the pin 840 relative to the input gear 652 is easily visible.

Depression of the button 810, for example, in the direction of the arrow P shown in FIG. 8A, causes downward movement of the pin 840 (and corresponding compression of the biasing member 850). Depression of the button 810 and movement of the button 810 of greater than or equal to a threshold distance in the direction of the arrow P causes the second end portion 842 of the pin 840 to engage the recess 890 in the input gear 652 as the input gear 652 rotates and the position of the recess 890 comes into correspondence with the second end portion 842 of the pin 840. That is, if the user wishes to return the example nut runner accessory 600 to the initial operating configuration, or home configuration, in which the end portion 617 of the U-shaped slot 615 is open, the user may operate the power-driven tool 100/100', feathering the trigger 120/120' while also continuing to exert a force on the button 810 in the direction of the arrow P, until a position of recess 890 is brought into alignment with the second end portion 842 of the pin 840, and the second end portion 842 of the pin 840 engages the recess 890 in the input gear 652 and restricts further rotation of the input gear 652.

In some examples, the recess 890 is formed in the input gear 652 at a position at which the restricted (further) rotation of the input gear 652 will align the open portions of the rotating components (i.e., the output gear 654, the driver head 670, and the insert 700, if coupled thereto) with the open portion of the housing 210, thereby defining the engagement portion including the U-shaped slot 615 having an open end portion 617. That is, the meshed engagement of the input gear 652 and the output gear 654 (via the idler gears 656) provides for the rotation of the output gear 654 coordinated with the rotation of the input gear 652, thus allowing for a position of the recess 890 formed in the input gear 652 to be indexed with a position of the open portion of the output gear 654.

In some examples, a plate 892 may be positioned on a surface of the input gear 652 in which the recess 890 is formed. The plate 892 may be fixed to the surface of the input gear 652, such that the plate 892 rotates together with the input gear 652. The plate 892 may include an opening 894, at a position corresponding to the recess 890 formed in the input gear 652, allowing the pin 840 to pass through the opening 894 and into the recess 890, for engagement in the recess 890. In some examples, the plate may provide a wear surface at the corresponding surface of the input gear 652.

Figure 9A:
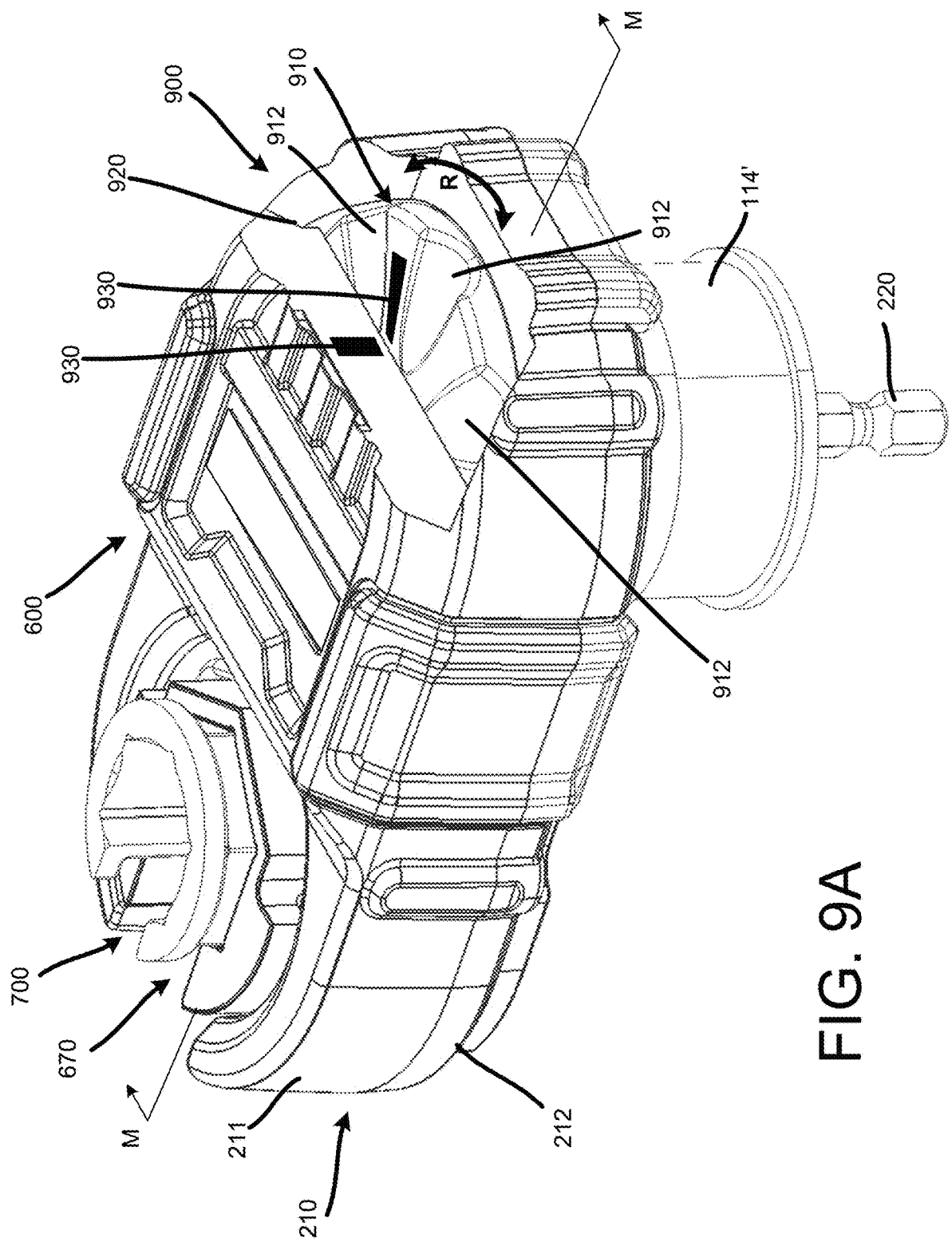
FIG. 9A is a top perspective view of an example alignment device, in accordance with implementations described herein.
Figure 9D:
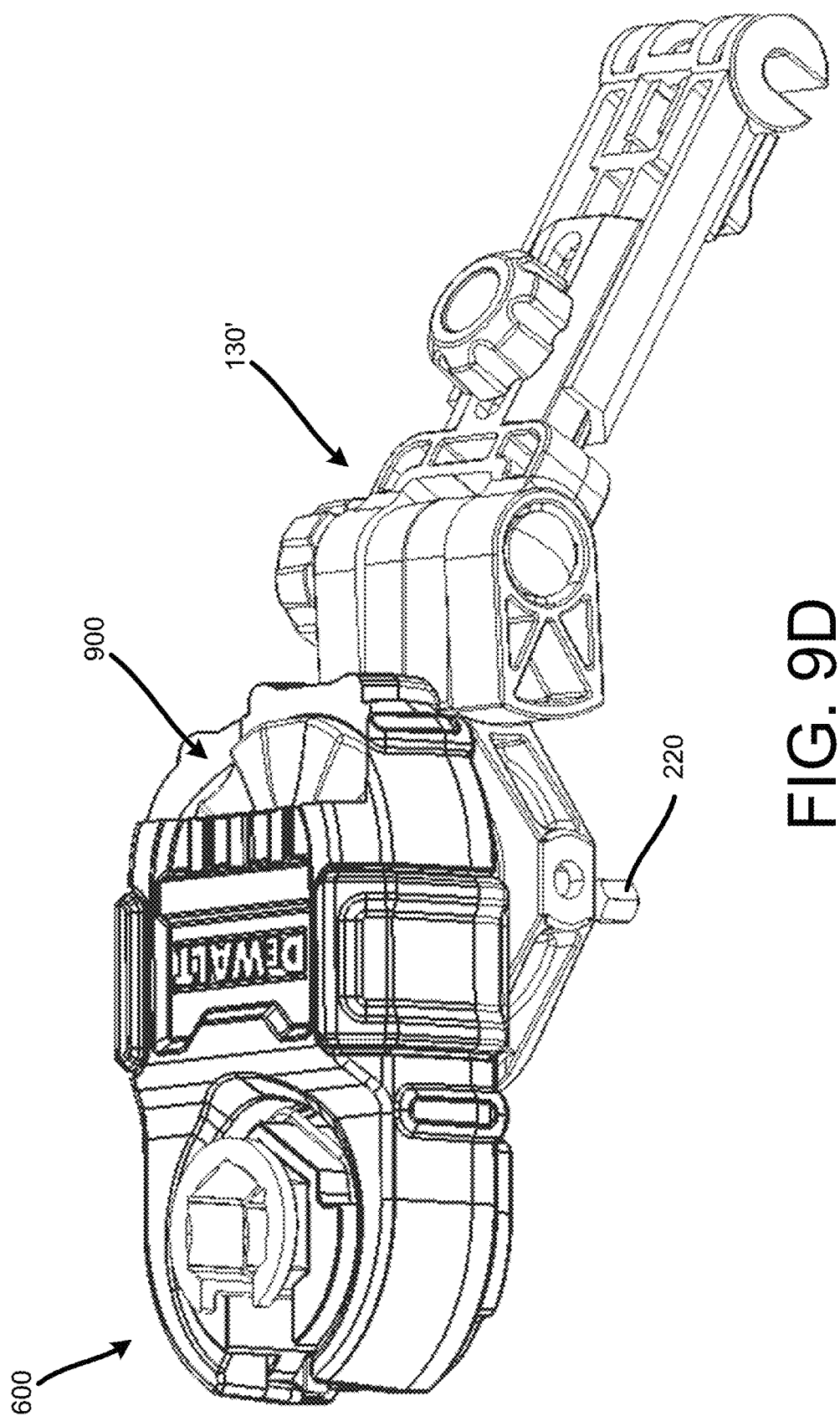
FIG. 9D illustrates the example nut runner accessory including the example alignment device shown in FIGS. 9A-9C, coupled to an example brace assembly.

FIGS. 9A-9D illustrate an example alignment device 900, in accordance with implementations described herein. In FIGS. 9A-9D the example alignment device 900 is incorporated into the example nut runner accessory 600 described above with respect to FIGS. 6A-6D, simply for purposes of discussion and illustration. The example alignment device 900 can be incorporated into any one of the example nut runner accessories 200, 300, 400, 500 described above with respect to FIGS. 2A-5D, and/or another accessory tool not explicitly shown/described herein. In particular, FIG. 9A is a top perspective view of the example alignment device 900 incorporated into the example nut runner accessory 600. FIG. 9B is a cross-sectional view, taken along line M-M of FIG. 9A. FIG. 9C is a top isometric view of the example nut runner accessory 600 with the first housing portion 211 removed. FIG. 9D illustrates the example nut runner accessory 600 including the example alignment device 900, coupled to the example brace assembly 130' via the example coupling portion 114', simply for purposes of discussion and illustration. The principles described herein can be similarly applied to an accessory tool not necessarily coupled to the example brace assembly 130'.

In the example arrangement shown in FIGS. 9A-9D the example alignment device 900 includes a knob 910 that provides for the return of the rotating components of the example nut runner accessory 600 to the initial operating configuration, or home configuration. In the initial operating condition, or home configuration, the rotating components of the example nut runner accessory 600 may be aligned such that open end portions thereof are aligned with an open end portion of the housing 210. In the initial operating configuration, or home configuration, the end portion 617 of the U-shaped slot 615 is open, defining an engagement portion that allows the example nut runner accessory 600 to be engaged with and/or disengaged from a nut on a threaded rod. In some examples, actuation, for example, rotation or turning of the knob 910, may allow the user to manually position the open end portions of the rotating components (i.e., the output gear 654, the driver head 670, and the insert 700, if coupled thereto) to correspond to the open end portion of the housing 210, returning to the initial operating configuration, or home configuration, of the example nut runner accessory 600.

As shown in FIGS. 9A-9D in some examples, the alignment device 900 includes a knob 910 that is at least partially contained within the housing 210, with a portion of the knob 910 exposed to an exterior of the housing 210 of the nut runner accessory 600. The exposed portion of the knob 910 is accessible to the user, and manipulatable by the user, from an exterior of the housing 210 of the example nut runner accessory 600. In the example shown in FIGS. 9A-9D at least a portion of the knob 910 is accessible to the user from an exterior of the housing 210 via an opening 920 in the first housing portion 211 of the housing 210, such that the knob 910 can be manually manipulated by the user.

As shown in FIGS. 9B and 9C, in some examples, the knob 910 is coupled to a surface of the input gear 652 such that the knob 910 and the input gear 652 rotate together. In some examples, the knob 910 is integrally formed with the input gear 652 such that the knob 910 and the input gear 652 rotate together. In some examples, the knob 910 is affixed or adhered to the input gear 652 such that the knob 910 and the input gear 652 rotate together. In some examples, the knob 910 is coupled a corresponding portion of the input shaft 220 such that the knob 910 and the input shaft 220 rotate together. In some examples, the knob 910 is integrally formed with the input shaft 220 such that the knob 910 and the input shaft 220 rotate together. In some examples, the knob 910 is affixed or adhered to the input shaft 220 such that the knob 910 and the input shaft 220 rotate together.

Manipulation, for example, rotation, of the knob 910, for example in the direction of the arrow R shown in FIG. 9A, also causes rotation of the input gear 652 together with the knob 910. To return the example nut runner accessory 600 to the original operating configuration, or the home configuration, the user may rotate the knob 910, which rotates the input gear 652 in a corresponding manner. This rotation of the input gear 652 (in response to rotation of the knob 910) in turn causes rotation of the output gear 654 (and the driver head 670, and the insert 700, if coupled thereto). The user may continue to manipulate, or rotate, the knob 910, until the open portions of the output gear 654 (and the driver head 670, and the insert 700, if coupled thereto) are aligned with the open end portion of the housing 210, and the example nut runner accessory 600 can be engaged with/disengaged from the nut and threaded rod.

In some examples, the housing 210 and/or the knob 910 may include one or more indexing marks, or visual indicators 930, to provide the user with a visual indication of an aligned position of the open portions of the output gear 654 (and the driver head 670, and the insert 700, if coupled thereto) with the open end portion of the housing 210, so that the end portion 617 of the U-shaped slot 615 is open. The one or more visual indicators 930 may be particularly useful in an installation environment in which the working end portion of the example nut runner accessory 600 is not easily visible to the user for disengagement and removal of the example nut runner accessory 600 from the nut/threaded rod. In the example shown in FIG. 9A, corresponding indexing marks, or visual indicators 930 are provided on the opening 920 formed in the housing 210, and on a corresponding portion of the knob 910, simply for purposes of discussion and illustration. In some examples, the knob 910 can include a series of recesses 912, or other surface treatment(s) to improve user contact with the manipulation surface of the knob 910, facilitate user manipulation of the knob 910, and the like.

FIGS. 10A-10F illustrate an example alignment device 1000, in accordance with implementations described herein. In FIGS. 10A-10F, the example alignment device 1000 is incorporated into the example nut runner accessory 600 described above with respect to FIGS. 6A-6D, simply for purposes of discussion and illustration. The example alignment device 1000 can be incorporated into any one of the example nut runner accessories 200, 300, 400, 500 described above with respect to FIGS. 2A-5D, and/or another accessory tool not explicitly shown/described herein.

Figure 10A:
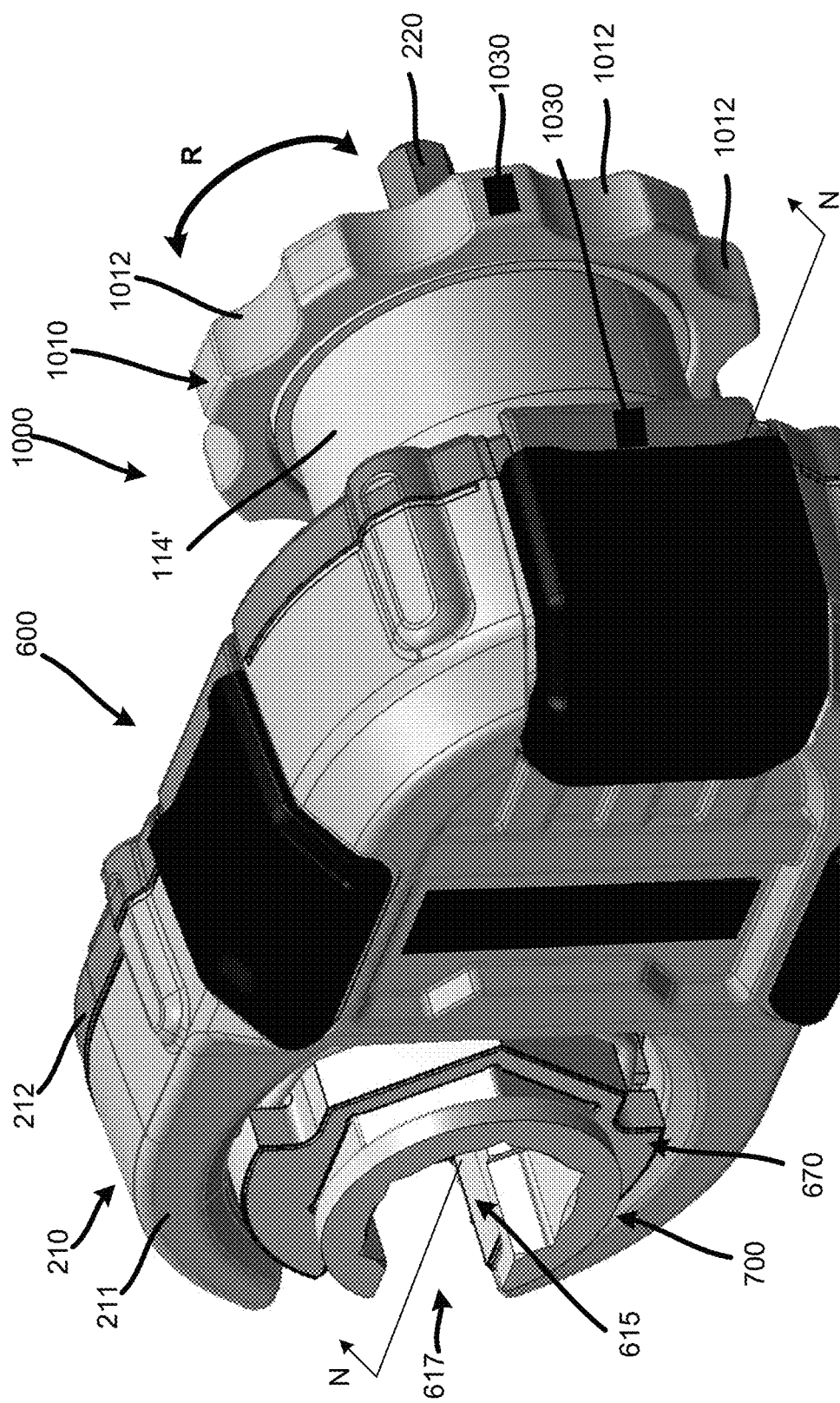
FIG. 10A is a first perspective view of an example nut runner accessory including an example alignment device, in accordance with implementations described herein.
Figure 10B:
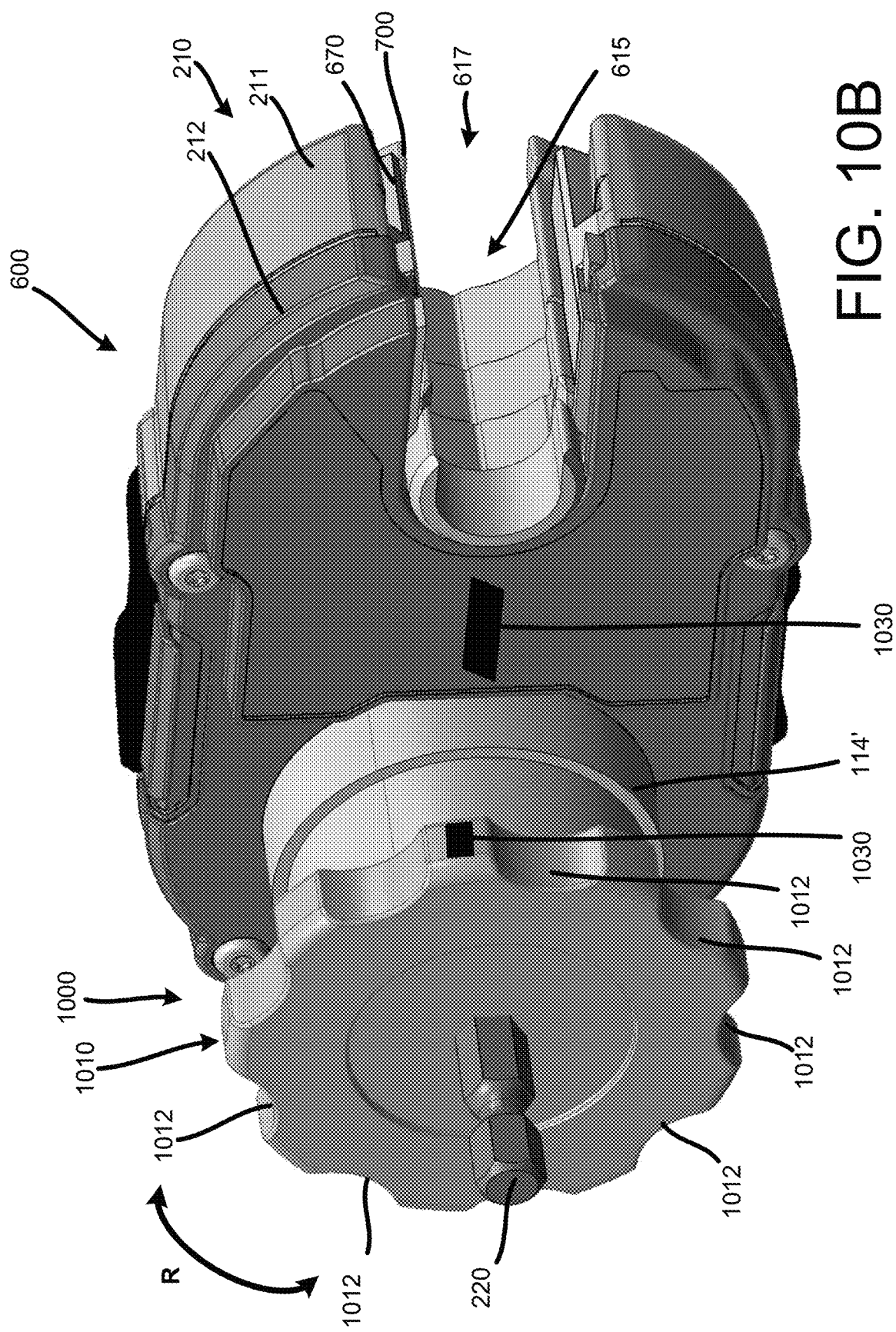
FIG. 10B is a second perspective view of the example nut runner accessory including the example alignment device shown in FIG. 10A.
Figure 10C:
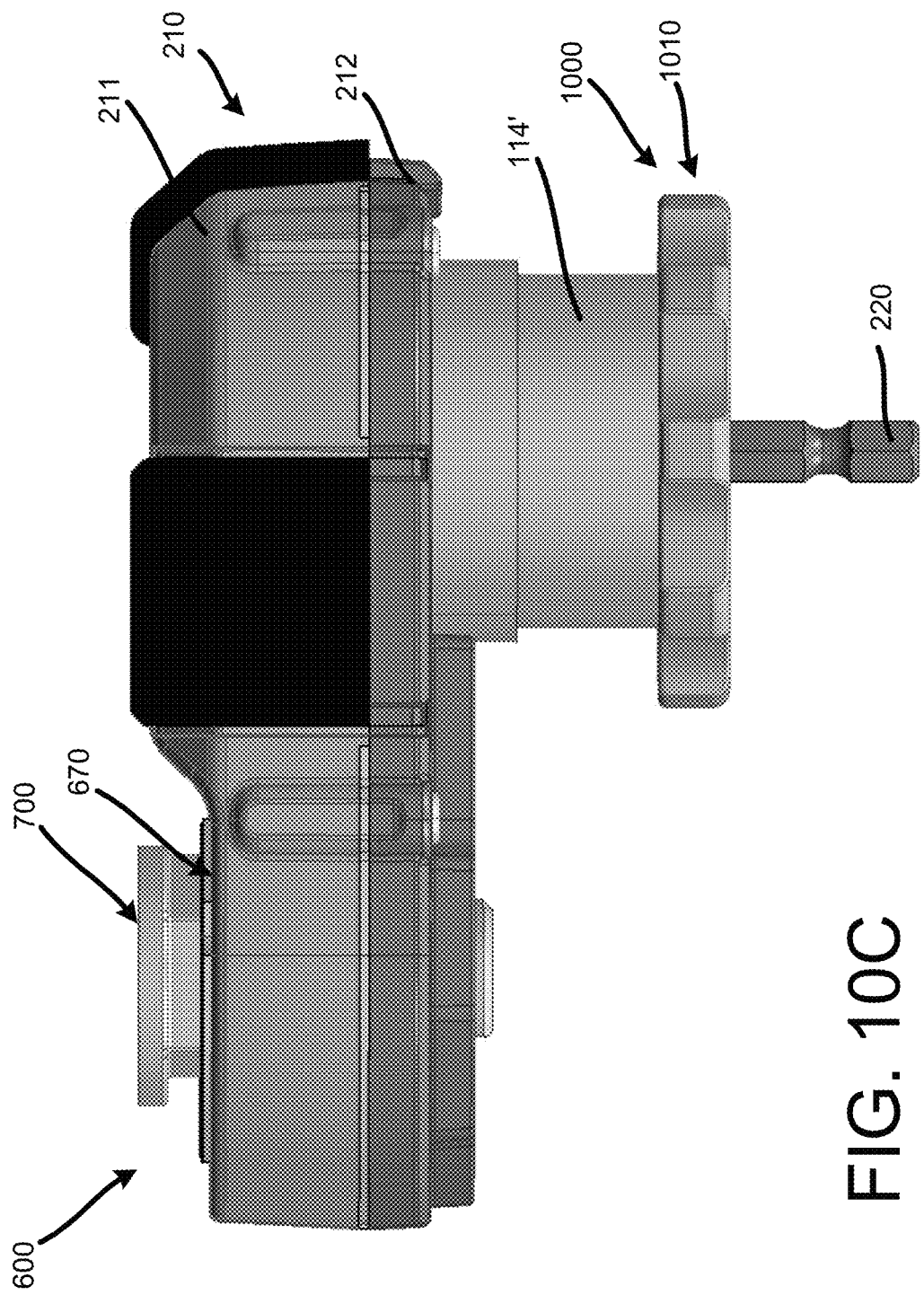
FIG. 10C of the example nut runner accessory including the example alignment device shown in FIGS. 10A and 10B.
Figure 10D:
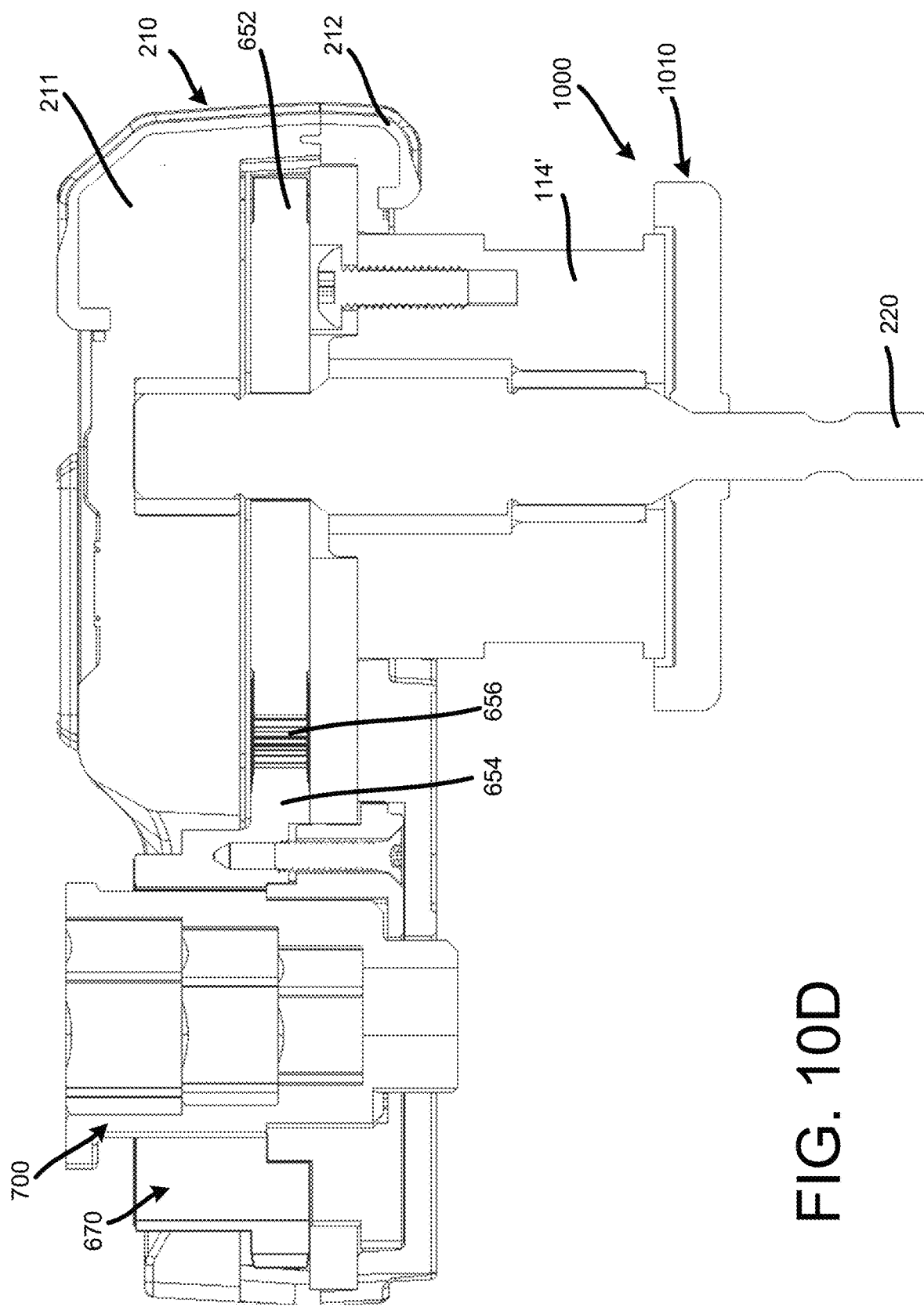
FIG. 10D is a cross-sectional view, taken along line N-N of FIG. 10C
Figure 10E:
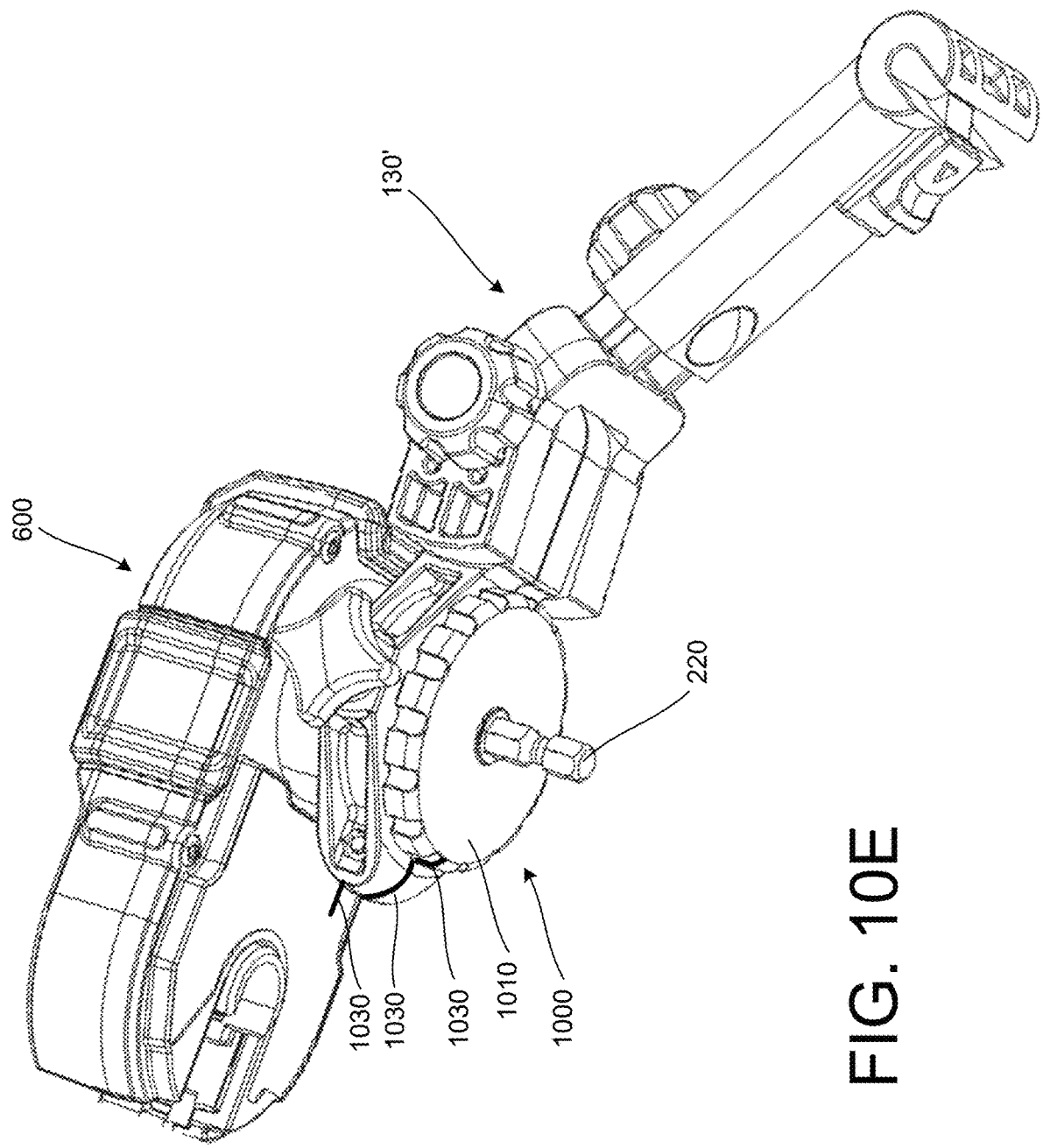
FIG. 10E illustrates the example nut runner accessory shown in FIGS. 10A-10D coupled to an example brace assembly.
Figure 10F:
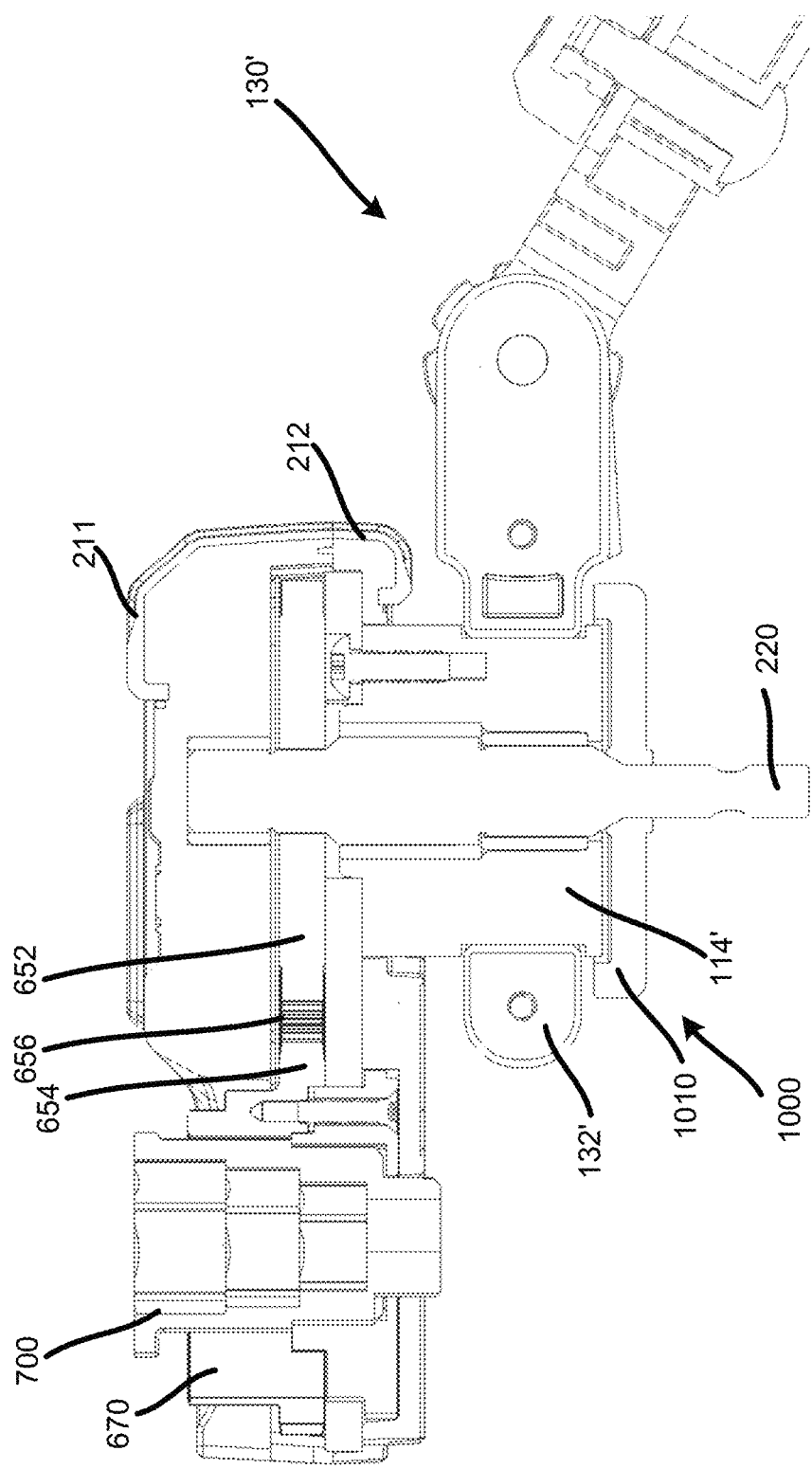
FIG. 10F is a cross-sectional view of the coupling of the example nut runner accessory coupled to the example brace assembly shown in FIG. 10E.

In particular, FIG. 10A is a first perspective view, FIG. 10B is a second perspective view, and FIG. 10C is a side view, of the example alignment device 1000 incorporated into the example nut runner accessory 600. FIG. 10D is a cross-sectional view, taken along line N-N of FIG. 10C. FIG. 10E illustrates the example nut runner accessory 600 including the example alignment device 1000, coupled to the example brace assembly 130' via the example coupling portion 114'. FIG. 10F is a cross-sectional view of the coupling of the example nut runner accessory 600 including the example alignment device 1000, with the example brace assembly 130'.

In the example arrangement shown in FIGS. 10A-10F, the example alignment device 1000 includes a knob 1010 that provides for the return of the rotating components of the example nut runner accessory 600 to the initial operating configuration, or home configuration. In the initial operating condition, or home configuration, the rotating components of the example nut runner accessory 600 may be aligned such that open end portions thereof are aligned at corresponding positions. In the initial operating configuration, or home configuration, the end portion 617 of the U-shaped slot 615 is open, allowing the example nut runner accessory 600 to be engaged with and/or disengaged from a nut on a threaded rod. In some examples, actuation, for example, rotation or turning of the knob 1010, may allow the user to manually position the open end portions of the rotating components (i.e., the output gear 654, the driver head 670, and the insert 700, if coupled thereto) to correspond to the open end portion of the housing 210, returning to the initial operating configuration, or home configuration, of the example nut runner accessory 600.

As shown in FIGS. 10A-10F, in some examples, the alignment device 1000 includes a knob 1010 that is fully exposed an exterior of the housing 210 of the nut runner accessory 600, such that the knob 1010 is accessible to the user, and manipulatable by the user, from an exterior of the housing 210 of the example nut runner accessory 600. In the example shown in FIGS. 10A-10F, the knob 1010 is provided at an end portion of the coupling portion 114' to which the collar 132' of the brace assembly 130' is coupled.

In some examples, the knob 1010 is coupled the input shaft 220, such that the knob 1010 and the input shaft 220 rotate together. In some examples, the knob 1010 is affixed or adhered to the input shaft 220 such that the knob 1010 and the input shaft 220 rotate together. In some examples, the knob 1010 is integrally formed with the input shaft 220 such that the knob 1010 and the input shaft 220 rotate together. Thus, manipulation, for example, rotation, of the knob 1010, for example in the direction of the arrow R, also causes rotation of the input gear 652 coupled to the knob 1010 via the input shaft 220. To return the example nut runner accessory 600 to the original operating configuration, or the home configuration, the user may rotate the knob 1010, which rotates the input gear 652 (via the input shaft 220) in a corresponding manner. This rotation of the input gear 652 (together with the rotation of the knob 1010 and the input shaft 220) in turn causes rotation of the output gear 654 (and the driver head 670, and the insert 700, if coupled thereto). The user may continue to manipulate, or rotate, the knob 1010, until the open portions of the output gear 654 (and the driver head 670, and the insert 700, if coupled thereto) are aligned with the open end portion of the housing 210, and the example nut runner accessory 600 can be engaged with/disengaged from the nut and threaded rod.

In some examples, the housing 210 and/or the collar 132' of the brace assembly 130' and/or the knob 1010 may include one or more indexing marks, or visual indicators 1030, to provide the user with a visual indication of an aligned position of the open portions of the output gear 654 (and the driver head 670, and the insert 700, if coupled thereto) with the open end portion of the housing 210, so that the end portion 617 of the U-shaped slot 615 is open. The one or more visual indicators 1030 may be particularly useful in an installation environment in which the working end portion of the example nut runner accessory 600 is not easily visible to the user for disengagement and removal of the example nut runner accessory 600 from the nut/threaded rod. In the examples shown in FIGS. 10A, 10B and 10E, example indexing marks, or visual indicators 1030 are provided on the housing 210, and on the collar 132' of the brace assembly 130', and on a corresponding portion of the visual indicators 1030, simply for purposes of discussion and illustration. In some examples, the knob 1010 can include a series of recesses 1012, or other surface treatment (s) to improve user contact with the manipulation surface of the knob 1010, facilitate user manipulation of the knob 1010, and the like.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example implementations.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A nut runner accessory for a power-driven tool, the nut runner accessory including:
a housing including an open ended slot at a first end portion of the housing;
a gear assembly received in the housing;
an input shaft coupled at a second end portion of the housing and configured to transmit a rotary force from a power-driven tool to an input gear of the gear assembly;
a driver head provided at an output gear of the gear assembly at the first end portion of the housing, the driver head being configured to rotate together with the output gear in response to rotation of the input gear, wherein the output gear and the driver head define an open ended slot corresponding to the open ended slot formed at the first end portion of the housing; and
an alignment device that includes a protrusion moveably coupled into the housing and configured to selectively engage the gear assembly as the input gear and the output gear rotate in response to the rotary force from the input shaft,
wherein, in response to an external manipulation of the alignment device during rotation of the gear assembly, the protrusion is configured to move in a direction parallel to a rotational axis of the input gear or a rotational axis of the output gear and engage a recess in one of the input gear or the output gear and restrict further rotation of the input gear and the output gear, with respective open end portions of the open ended slot defined by the driver head and the output gear and the open ended slot at the first end portion of the housing in an aligned position.

2. The nut runner accessory of claim 1, wherein the alignment device includes a button assembly that is manipulatable from an exterior of the housing, the button assembly including:
a support frame coupled to the housing;
a button movably positioned in an open portion of the support frame; and
the protrusion having a first end portion coupled to the button, and a second end portion that selectively engages the recess in one of the input gear or the output gear to restrict rotation of the input gear and the output gear.

3. The nut runner accessory of claim 2, wherein the second end portion of the protrusion is configured to be engaged in the recess and to restrict rotation of the input gear and the output gear in response to a depression of the button as the input gear and the output gear rotate in response to the rotary force transmitted from the input shaft and a position of the recess is brought into alignment with a position of the second end portion of the protrusion.

4. The nut runner accessory of claim 3, wherein a position of the recess is indexed with a position of the open ended slot defined by the driver head and output gear, such that engagement of the second end portion of the protrusion in the recess aligns the open ended slot defined by the driver head and the output gear with the open ended slot defined at the first end portion of the housing.

5. The nut runner accessory of claim 2, wherein a shoulder portion of the support frame is fixed to the housing and extends across a portion of the support frame at the second end portion of the protrusion, with an opening formed in the shoulder portion corresponding to the second end portion of the protrusion.

6. The nut runner accessory of claim 5, wherein, in response to depression of the button, the second end portion of the protrusion extends through the opening in the shoulder portion to engage the recess as the recess as the input gear and the output gear rotate and a position of the recess is aligned with a position of the second end portion of the protrusion.

7. The nut runner accessory of claim 2, further comprising a biasing member positioned around an intermediate portion of the protrusion, with a first end portion of the biasing member abutting the button, and the second end portion of the biasing member abutting a portion of the support frame, wherein the biasing member biases the button to a disengaged position, and is compressed in response to depression of the button.

8. The nut runner accessory of claim 1, wherein
the open ended slot at the first end portion of the housing is stationary, and the open ended slot defined by the driver head and the output gear rotate in response to the rotary force transmitted from the input shaft to the gear assembly, and
an aligned position of respective open end portions of the open ended slot at the first end portion of the housing and the open ended slot defined by the driver head and the output gear provides for insertion of a threaded rod and nut into an engagement portion of the nut runner accessory, and for removal of the threaded rod and nut from the engagement portion of the nut runner accessory.

9. A nut runner accessory for a power-driven tool, the nut runner accessory including:
a housing including an open ended slot at a first end portion of the housing;
a gear assembly received in the housing;
an input shaft coupled at a second end portion of the housing and configured to transmit a rotary force from a power-driven tool to an input gear of the gear assembly;
a driver head provided at an output gear of the gear assembly at the first end portion of the housing, the driver head being configured to rotate together with the output gear in response to rotation of the input gear, wherein the output gear and the driver head define an open ended slot corresponding to the open ended slot formed at the first end portion of the housing; and
an alignment knob coupled to the housing and accessible from an exterior of the housing,
wherein the output gear is configured to rotate in response to a manual manipulation of the alignment knob, and
wherein respective open end portions of the open ended slot defined by the driver head and output gear and the open ended slot at the first end portion of the housing are brought into alignment in response to the manual manipulation of the alignment knob.

10. The nut runner accessory of claim 9, wherein the manual manipulation of the alignment knob is a rotation of the alignment knob, and wherein an amount of rotation of the alignment knob corresponds to an amount of rotation of the output gear and driver head.

11. The nut runner accessory of claim 9, wherein the alignment knob is partially received in the housing, and partially exposed to the exterior of the housing through an opening in the housing.

12. The nut runner accessory of claim 11, wherein the alignment knob is fixed to or integrally formed with the input gear such that the alignment knob rotates together with the input gear and manipulation of the alignment knob causes corresponding rotation of the input gear.

13. The nut runner accessory of claim 11, wherein the alignment knob is fixed to or integrally formed with the input shaft such that the alignment knob rotates together with the input shaft and the input gear coupled to the input shaft, and manipulation of the alignment knob causes corresponding rotation of the input shaft and the input gear coupled to the input shaft.

14. The nut runner accessory of claim 9, further comprising at least one visual indicator provided on at least one of the alignment knob or the housing, wherein the at least one visual indicator provides a visual indication of alignment of respective open end portions of the open ended slot defined by the driver head and output gear and the open ended slot at the first end portion of the housing.

15. The nut runner accessory of claim 9, wherein the alignment knob is coupled to the input shaft at an exterior of the housing.

16. A nut runner accessory for a power-driven tool, the nut runner accessory including:
   a housing including an open ended slot at a first end portion of the housing;
   a gear assembly received in the housing;
   an input shaft coupled at a second end portion of the housing and configured to transmit a rotary force from a power-driven tool to an input gear of the gear assembly;
   a driver head provided at an output gear of the gear assembly at the first end portion of the housing, the driver head being configured to rotate together with the output gear in response to rotation of the input gear, wherein the output gear and the driver head define an open ended slot corresponding to the open ended slot formed at the first end portion of the housing; and
   an alignment device coupled to the housing and configured to engage the gear assembly in response to an external manipulation of the alignment device, wherein the alignment device includes at least one of (1) a protrusion that moves in a direction parallel to a rotational axis of the input gear or the output gear and selectively engages a recess in one of the input gear or the output gear to restrict rotation of the input gear and the output gear or (2) an alignment knob coupled to the housing and accessible from an exterior of the housing and configured to rotate the output gear in response to the external manipulation;
   wherein respective open end portions of the open ended slot defined by the driver head and output gear and the open ended slot at the first end portion of the housing are brought into alignment in response to the manipulation of the alignment device.

17. The nut runner accessory of claim 16, wherein the alignment device comprises:
   a support frame coupled to the housing; and
   a button movably positioned in an open portion of the support frame;
   wherein the protrusion includes a first end portion coupled to the button, and a second end portion that extends through an opening in a shoulder portion of the support frame in response to depression of the button while the input gear and the output gear rotate in response to the rotary force of the input shaft, to selectively engage the recess in the one of the input gear or the output gear as a position of the recess is brought into alignment with the second end portion of the protrusion to restrict further rotation of the input gear and the output gear.

18. The nut runner accessory of claim 17, wherein the position of the recess is indexed with a position of the open ended slot defined by the driver head and output gear, such that engagement of the second end portion of the protrusion in the recess aligns the open ended slot defined by the driver head and the output gear with the open ended slot defined at the first end portion of the housing.

19. The nut runner accessory of claim 16, wherein the alignment knob is coupled to the input gear and accessible from an exterior of the housing,
   wherein an amount of rotation of the alignment knob corresponds to an amount of rotation of the output gear and the driver head such that respective open end portions of the open ended slot defined by the driver head and output gear and the open ended slot at the first end portion of the housing are brought into alignment in response to the rotation of the alignment knob.

20. The nut runner accessory of claim 19, wherein the alignment knob is partially received in the housing, and partially exposed to the exterior of the housing through an opening in the housing.

* * * * *

UNITED STATES PATENT AND TRADEMARK OFFICE
CERTIFICATE OF CORRECTION

| | | |
|---|---|---|
| PATENT NO. | : 12,466,037 B2 | Page 1 of 1 |
| APPLICATION NO. | : 18/462959 | |
| DATED | : November 11, 2025 | |
| INVENTOR(S) | : Tucker et al. | |

It is certified that error appears in the above-identified patent and that said Letters Patent is hereby corrected as shown below:

In the Claims

In Column 29, Claim 1, Line 24, delete "into the" and insert -- to the --, therefor.

In Column 30, Claim 6, Line 8, delete "recess as the input" and insert -- input --, therefor.

Signed and Sealed this
Twenty-third Day of December, 2025

John A. Squires
*Director of the United States Patent and Trademark Office*